US012678356B2

(12) United States Patent
Furman et al.

(10) Patent No.: US 12,678,356 B2
(45) Date of Patent: Jul. 14, 2026

(54) PATIENT SUPPORT APPARATUS WITH ADAPTIVE USER INTERFACE

(71) Applicant: Stryker Corporation, Kalamazoo, MI (US)

(72) Inventors: Aaron Douglas Furman, Kalamazoo, MI (US); Daniel Brosnan, Kalamazoo, MI (US); Janani Gopalkrishnan, Portage, MI (US); Darren G. Schaaf, Portage, MI (US); Christopher Gentile, Sturgis, MI (US); Ross T. Lucas, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 545 days.

(21) Appl. No.: 17/695,152

(22) Filed: Mar. 15, 2022

(65) Prior Publication Data

US 2022/0202634 A1 Jun. 30, 2022

Related U.S. Application Data

(63) Continuation of application No. 16/019,994, filed on Jun. 27, 2018, now Pat. No. 11,304,865.
(Continued)

(51) Int. Cl.
*A61G 7/018* (2006.01)
*A61G 1/017* (2006.01)
(Continued)

(52) U.S. Cl.
CPC ............. *A61G 7/018* (2013.01); *A61G 1/017* (2013.01); *A61G 1/0275* (2013.01);
(Continued)

(58) Field of Classification Search
CPC ........ A61G 7/018; A61G 7/012; A61G 7/015; A61G 7/05; A61G 7/005; A61G 7/10;
(Continued)

(56) References Cited

U.S. PATENT DOCUMENTS 3,088,770 A * 5/1963 Ferneau ............... A61G 1/0562 280/5.22
4,037,871 A * 7/1977 Bourgraf .............. A61G 1/0293 5/110
(Continued)

FOREIGN PATENT DOCUMENTS

EP 1789278 A2 5/2007
EP 3058869 A1 8/2016
(Continued)

OTHER PUBLICATIONS amazon.com, "LINE2 Design Battery Powered Track Stair Chair 70019-Y-BAT Heavy Duty Emergency Lightweight Portable Folding Evacuation Chair", 2019, https://www.amazon.com/LINE2design-70019-Y-BAT-Emergency-Lightweight-Evacuation/dp/B07MDHF4CP, 8 pages.
(Continued)

*Primary Examiner* — Nicole Coy
(74) *Attorney, Agent, or Firm* — Howard & Howard Attorneys PLLC

(57) ABSTRACT

A patient support apparatus for patients. The patient support apparatus comprises a base and a litter supported by the base. The patient support apparatus also comprises powered devices that perform one or more predetermined functions on the patient support apparatus. A user interface is employed to control the powered devices. The user interface is designed to enable caregivers to cause operation of the powered devices with fewer buttons, while retaining functionality in using powered devices.

18 Claims, 33 Drawing Sheets

Related U.S. Application Data

(60) Provisional application No. 62/525,371, filed on Jun. 27, 2017.

(51) Int. Cl.
*A61G 1/02* (2006.01)
*A61G 1/056* (2006.01)
*A61G 5/00* (2006.01)
*A61G 5/04* (2013.01)
*A61G 5/06* (2006.01)
*A61G 7/08* (2006.01)
*A61G 7/16* (2006.01)

(52) U.S. Cl.
CPC ......... *A61G 1/0293* (2013.01); *A61G 1/0562* (2013.01); *A61G 5/061* (2013.01); *A61G 5/066* (2013.01); *A61G 7/08* (2013.01); *A61G 7/16* (2013.01); *A61G 5/006* (2013.01); *A61G 5/045* (2013.01); *A61G 2203/14* (2013.01); *A61G 2203/16* (2013.01); *A61G 2203/20* (2013.01); *A61G 2203/30* (2013.01); *A61G 2203/32* (2013.01); *A61G 2203/36* (2013.01); *A61G 2203/40* (2013.01); *A61G 2203/44* (2013.01)

(58) Field of Classification Search
CPC .......... A61G 7/1013; A61G 7/08; A61G 7/16; A61G 5/061; A61G 5/104; A61G 5/066; A61G 5/006; A61G 5/045; A61G 2203/30; A61G 2203/12; A61G 2203/70; A61G 2203/10; A61G 2203/32; A61G 2203/20; A61G 2203/40; A61G 2203/44; A61G 2203/36; A61G 2203/16; A61G 2203/14; A61G 1/0293; A61G 1/0237; A61G 1/0262; A61G 1/0275; A61G 1/00; A61G 1/017; A61G 1/0562; A61G 13/06; A61G 13/08; A61G 11/002; A61G 12/008; A47C 20/041; A47C 20/04; A47C 20/08; A47C 19/045; A47C 1/0242; A47C 31/008
See application file for complete search history.

(56) References Cited

U.S. PATENT DOCUMENTS 4,062,418 A * 12/1977 Misawa ............... B62D 55/075 280/5.22
4,105,242 A * 8/1978 Terbeek ................. A61G 5/006 280/30
4,260,035 A * 4/1981 Loveless ................ B62D 11/04 180/907
5,015,024 A * 5/1991 Bloemer .............. A61G 1/0237 280/767
5,135,350 A * 8/1992 Eelman ................ A61G 1/0212 5/81.1 R
5,572,756 A * 11/1996 Muuranen ............ A61G 1/0262 5/625
5,971,913 A 10/1999 Newkirk et al.
6,276,010 B1 * 8/2001 Way ..................... A61G 7/0507 5/11
6,486,792 B1 11/2002 Moster et al.
6,648,343 B2 11/2003 Way et al.
6,691,346 B2 2/2004 Osborne et al.
6,702,314 B1 3/2004 Crose
6,752,224 B2 * 6/2004 Hopper ................ A61G 1/0275 5/500
6,978,500 B2 12/2005 Osborne et al.
7,171,708 B2 2/2007 Osborne et al.
7,384,046 B2 * 6/2008 Le Masne De Chermont ............ A61G 5/061 280/5.2
7,398,571 B2 7/2008 Souke et al.
7,472,439 B2 1/2009 Lemire et al.
7,487,562 B2 2/2009 Frondorf et al.
7,490,021 B2 2/2009 Holland et al.
7,570,152 B2 8/2009 Smith et al.
8,117,701 B2 2/2012 Bobey et al.
8,258,963 B2 9/2012 Dixon et al.
8,307,473 B1 11/2012 Ambarth et al.
8,334,779 B2 12/2012 Zerhusen et al.
8,341,777 B2 1/2013 Hensley et al.
8,344,860 B2 1/2013 Collins, Jr. et al.
8,409,095 B1 4/2013 Marquis
8,410,943 B2 4/2013 Metz et al.
8,413,270 B2 4/2013 Turner et al.
8,439,416 B2 5/2013 Lambarth et al.
8,464,380 B2 6/2013 Bobey et al.
8,525,682 B2 9/2013 Dixon et al.
8,544,126 B2 10/2013 Elliott et al.
8,604,917 B2 12/2013 Collins et al.
8,640,798 B2 2/2014 Walkingshaw et al.
8,756,078 B2 6/2014 Collins, Jr. et al.
8,768,520 B2 7/2014 Oexman et al.
8,847,756 B2 9/2014 Tallent et al.
8,870,812 B2 10/2014 Alberti et al.
8,924,218 B2 12/2014 Corpier et al.
8,973,963 B2 3/2015 Lambarth et al.
8,984,685 B2 3/2015 Robertson et al.
9,004,204 B2 4/2015 Walkingshaw et al.
9,021,634 B2 * 5/2015 Goto ...................... A61G 7/051 5/625
9,038,217 B2 5/2015 Elliot et al.
9,138,173 B2 9/2015 Penninger et al.
9,173,792 B2 11/2015 Goffer
9,204,823 B2 12/2015 Derenne et al.
9,220,650 B2 12/2015 Bobey et al.
9,233,033 B2 1/2016 Valentino et al.
9,320,444 B2 4/2016 Hayes et al.
9,381,125 B2 7/2016 Herbst et al.
9,463,126 B2 10/2016 Zerhusen et al.
9,486,084 B2 11/2016 Connell et al.
9,486,373 B2 11/2016 Lambarth et al.
9,510,981 B2 12/2016 Lambarth et al.
9,569,591 B2 2/2017 Vanderpohl, III
9,593,833 B2 3/2017 McMannon et al.
9,655,798 B2 5/2017 Zerhusen et al.
9,814,410 B2 11/2017 Kostic et al.
9,844,275 B2 12/2017 Nunn et al.
9,999,555 B2 6/2018 Magill et al.
10,004,654 B2 6/2018 Zerhusen et al.
10,034,979 B2 7/2018 Bechtel et al.
10,052,249 B2 8/2018 Elliott et al.
10,098,796 B2 10/2018 Valentino et al.
10,136,841 B2 11/2018 Alghazi
10,172,752 B2 1/2019 Goffer
10,188,569 B2 1/2019 Elku et al.
10,617,579 B2 * 4/2020 Naber ...................... A61G 1/06
11,191,688 B2 * 12/2021 Yeckel ................. A61G 7/1051
2002/0014951 A1 2/2002 Kramer et al.
2004/0088792 A1 5/2004 O'Krangley et al.
2004/0133981 A1 * 7/2004 Walkingshaw ...... A61G 1/0225 5/610
2006/0075558 A1 * 4/2006 Lambarth ............ A61G 1/0212 296/20
2006/0082176 A1 * 4/2006 Broadley ............. A61G 1/0262 296/20
2006/0195987 A1 * 9/2006 Walkingshaw .......... A61G 1/00 280/5.24
2007/0174967 A1 * 8/2007 Bourgraf .............. A61G 1/0565 5/618
2007/0182220 A1 * 8/2007 Walkinshaw .......... A61G 1/017 297/118
2007/0284845 A1 * 12/2007 Roovers ................. A61G 5/045 180/315
2008/0007103 A1 * 1/2008 Welles ................. A61B 5/6887 297/330

(56) References Cited

U.S. PATENT DOCUMENTS

2008/0079252 A1* 4/2008 Shutter ................ A61G 3/0808 280/755
2008/0172789 A1 7/2008 Elliot et al.
2008/0272629 A1* 11/2008 Walkingshaw ........ A61G 5/061 297/118
2008/0276372 A1* 11/2008 Lambarth ............ A61G 1/0212 5/611
2008/0290679 A1* 11/2008 Lambarth ................ A61G 1/06 296/20
2009/0000034 A1* 1/2009 Myers ................. B60B 33/0073 16/35 R
2009/0165207 A1* 7/2009 Reed ......................... B60T 7/10 5/608
2009/0276959 A1* 11/2009 Menna .................. A61G 1/013 5/611
2011/0018296 A1* 1/2011 Broadley ............. A61G 1/0262 296/20
2011/0083270 A1* 4/2011 Bhai ......................... B60L 3/10 701/22
2011/0169653 A1 7/2011 Wang et al.
2011/0254237 A1* 10/2011 Rembos ................. A61G 5/066 280/5.22
2011/0260483 A1* 10/2011 Chinn ...................... A61G 1/06 296/20
2011/0266821 A1* 11/2011 Goto ...................... A61G 7/051 296/20
2012/0023670 A1 2/2012 Zerhusen et al.
2012/0139197 A1* 6/2012 Livingston ............. A61G 5/066 280/5.22
2012/0153687 A1* 6/2012 Kume .................... A61G 7/015 297/118
2012/0198613 A1* 8/2012 Jelinek ................... A61G 7/015 5/86.1
2012/0198627 A1 8/2012 Turner et al.
2012/0237326 A1* 9/2012 Van Ness ............. A61G 3/0236 414/812
2012/0275896 A1* 11/2012 Magill ................... A61G 1/056 414/800
2012/0299353 A1* 11/2012 Griswold ............... A61G 7/018 297/183.1
2013/0142367 A1 6/2013 Berry et al.
2013/0168987 A1* 7/2013 Valentino ............... A61G 1/056 92/61
2013/0227787 A1 9/2013 Herbst et al.
2013/0282234 A1* 10/2013 Roberts .................... A61G 7/08 280/80.1
2014/0039351 A1 2/2014 Mix et al.
2014/0084553 A1* 3/2014 Carletti ................ A61G 5/0833 280/5.22
2014/0115778 A1* 5/2014 Ng ....................... A61G 7/1061 5/83.1
2014/0197654 A1* 7/2014 Valentino ............... A61G 1/013 296/20
2014/0259420 A1 9/2014 Lambarth et al.
2014/0265181 A1 9/2014 Lambarth et al.
2014/0277778 A1* 9/2014 Nunn ................... A47C 27/082 700/282
2014/0297327 A1 10/2014 Heil et al.
2014/0299391 A1* 10/2014 Carletti .................. A61G 5/061 180/6.7
2015/0060162 A1 3/2015 Goffer
2015/0186611 A1* 7/2015 George .................. G16H 10/60 705/51
2015/0196442 A1* 7/2015 Heil ....................... A61G 7/012 5/613
2015/0216606 A1* 8/2015 Bally ..................... A61G 7/012 248/220.22
2015/0216746 A1* 8/2015 Dirauf ...................... A61G 1/04 701/25
2015/0216747 A1* 8/2015 Valentino ............. A61G 1/0262 5/610
2015/0250669 A1 9/2015 Elliott et al.
2016/0022218 A1 1/2016 Hayes et al.
2016/0045382 A1 2/2016 Goffer
2016/0089287 A1* 3/2016 Buerstner ............ A61G 13/105 5/616
2016/0095774 A1 4/2016 Bobey et al.
2016/0128880 A1* 5/2016 Blickensderfer .... A61G 1/0562 296/20
2016/0235610 A1 8/2016 Drake
2016/0296387 A1* 10/2016 Schar ....................... A61G 1/02
2016/0313758 A1* 10/2016 Schmidt ................. G05G 9/047
2016/0324705 A1 11/2016 Bach Castillo
2016/0331617 A1 11/2016 Stryker et al.
2016/0367416 A1 12/2016 Lambarth et al.
2016/0367420 A1 12/2016 Zerhusen et al.
2017/0027789 A1 2/2017 St.John et al.
2017/0049642 A9 2/2017 Valentino et al.
2017/0079859 A1 3/2017 Lambarth et al.
2017/0119610 A1* 5/2017 Christensen ........... A61G 13/08
2017/0124844 A1 5/2017 Huster et al.
2017/0143565 A1* 5/2017 Childs .................... A61G 7/015
2017/0143566 A1 5/2017 Elku et al.
2017/0172827 A1* 6/2017 Schaaf ................... A61G 5/006
2017/0202715 A1* 7/2017 Carletti ................ A61G 1/0262
2017/0224562 A1 8/2017 Zerhusen et al.
2017/0259811 A1 9/2017 Coulter et al.
2017/0300058 A1* 10/2017 Peret .................... A61G 5/1043
2017/0340495 A1* 11/2017 Paul ....................... A61G 5/127
2017/0340498 A1* 11/2017 Tessmer ............... A61G 13/104
2018/0028377 A1 2/2018 Stryker et al.
2018/0028383 A1 2/2018 Stryker et al.
2018/0039743 A1 2/2018 Dixon et al.
2018/0055418 A1 3/2018 Kostic et al.
2018/0056985 A1 3/2018 Coulter et al.
2018/0161225 A1 6/2018 Zerhusen et al.
2018/0177652 A1 6/2018 Furman et al.
2018/0184984 A1 7/2018 Zerhusen et al.
2018/0185212 A1 7/2018 Lucas et al.
2018/0185213 A1 7/2018 Naber et al.
2018/0250177 A1 9/2018 Magill et al.
2018/0271286 A1 9/2018 Jacobs et al.
2018/0271287 A1 9/2018 Jacobs et al.
2018/0303687 A1 10/2018 Moreno et al.
2018/0338875 A1* 11/2018 Cardona ................ A61G 3/061
2018/0369035 A1 12/2018 Bhimavarapu et al.
2018/0369036 A1 12/2018 Furman et al.
2018/0369039 A1 12/2018 Bhimavarapu et al.
2019/0008708 A1 1/2019 Moreno et al.
2019/0024882 A1 1/2019 Jonsson et al.
2019/0046373 A1 2/2019 Coulter et al.
2020/0129351 A1* 4/2020 Wiggermann ........... A61G 7/08
2020/0188199 A1* 6/2020 Smink .................... A61G 5/006
2020/0222257 A1* 7/2020 Sikora ...................... A61G 1/00
2020/0330297 A1* 10/2020 Matters ................ A61G 5/1091
2021/0369530 A1* 12/2021 Turocy ................... A61B 90/35
2024/0130910 A1* 4/2024 Yoshida ................. A61G 7/018

FOREIGN PATENT DOCUMENTS

KR 20130076922 A 7/2013
KR 20160080898 A 7/2016
WO 0101913 A1 1/2001
WO 02039944 A3 9/2002
WO 2006023447 A2 3/2006
WO 2006089399 A2 8/2006
WO 2014149392 A1 9/2014
WO 2015148578 A2 10/2015
WO 2015157402 A1 10/2015
WO 2015171365 A1 11/2015
WO 2016196403 A1 12/2016
WO 2017061471 A1 4/2017
WO 2017201513 A1 11/2017
WO 2018154819 A1 8/2018
WO 2018203476 A1 11/2018
WO 2018216387 A1 11/2018

(56) References Cited

OTHER PUBLICATIONS

English language abstract and machine-assisted English translation for KR 2013-0076922 extracted from espacenet.com database on May 2, 2018, 8 pages.
English language abstract and machine-assisted English translation for WO 2017/061471 extracted from espacenet.com database on Mar. 25, 2019, 26 pages.
English language abstract and machine-assisted English translation for WO 2018/154819 extracted from espacenet.com database on Mar. 25, 2019, 35 pages.
English language abstract and machine-assisted English translation for WO 2018/203476 extracted from espacenet.com database on Mar. 25, 2019, 37 pages.
English language abstract and machine-assisted English translation for WO 2018/216387 extracted from espacenet.com database on Mar. 25, 2019, 43 pages.
English language abstract and machine-assisted translation of KR 20160080898 extracted from espacenet.com database on Sep. 12, 2017, 12 pages.
Hill-Rom, "Centrella (TM) Smart+ Bed, Therapeautic Surfaces", Sep. 20, 2017; 3 pages.
Hill-Rom, "Centrella Smart + Bed Brochure", Sep. 27, 2017, 11 pages.
Mobile Stairlift, "Mobile Stairlift & Accessories Webpage", 2019, https://www.mobilestairlift.com/products/mobile-stairlift-battery-powered-portable, 4 pages.
Mobile Stairlift, "Mobile Stairlift Motorized Chair Lift—Battery Powered Webpage", 2019, https://www.mobilestairlift.com/collections/mobile-stairlift-accessories, 5 pages.
Stryker, "InTouch Critical Care Bed Model FL27 (2130/2140) Operations Manual—Optional Pendant Control", 2130-009-001 Rev C, Apr. 2008, p. 25.
Youtube, "How to Use the Mobile Stairlift Dolly—An Introductory Guide Video", Apr. 10, 2018, https://www.youtube.com/watch?v=BQt3-q73Zyg, 2 pages.
Youtube, "Introducing the Mobile Stairlift—Portable Stair Climbing Wheelchair Video", Apr. 10, 2018, https://www.youtube.com/watch?v=QhBhuuoeyd4, 3 pages.
Youtube, "ST003A Plus New Type Mobility Stair Climber Chair for Lifting Elderly Video", Apr. 5, 2018, https://www.youtube.com/watch?v=_ItZ1Nbpf-0, 2 pages.

* cited by examiner

PATIENT SUPPORT APPARATUS WITH ADAPTIVE USER INTERFACE

CROSS-REFERENCE TO RELATED APPLICATIONS

This application is a Continuation of U.S. patent application Ser. No. 16/019,994, filed on Jun. 27, 2018, which claims priority to and the benefit of U.S. Provisional Patent Application No. 62/525,371, filed on Jun. 27, 2017, the disclosures of each of which are hereby incorporated by reference in their entirety.

BACKGROUND

Patient support systems facilitate care of patients in a health care setting. Patient support systems comprise patient support apparatuses such as, for example, hospital beds, stretchers, cots, tables, wheelchairs, and chairs. A conventional patient support apparatus comprises a base and a litter upon which the patient is supported.

Often, patient support apparatuses have one or more powered devices to perform one or more functions on the patient support apparatus. These functions can include lifting and lowering the litter, moving a patient forward and backward, raising a patient from a horizontal position to an inclined position, or vice versa, and the like. When a caregiver wishes to operate a powered device to perform such a function, the caregiver actuates one of several buttons or other user input devices on a user interface that is associated with the desired function. By way of illustrative example, a user interface of a patient support apparatus may comprise one button to lift the litter, one button to lower the litter, one button to move the patient forward, one button to move the patient backward, one button to raise the patient to an inclined position, and one button to lower the patient back to horizontal from the inclined position. As a result, depending on the specific configuration of the patient support apparatus, the user interface can sometimes be cluttered with a large number of buttons which may lead to inefficiency, and sometimes confusion, in operation of the patient support apparatus.

A patient support system designed to limit the number of buttons or other user input devices required and overcome one or more of the aforementioned challenges is desired.

DETAILED DESCRIPTION OF THE EMBODIMENTS

Figure 1:
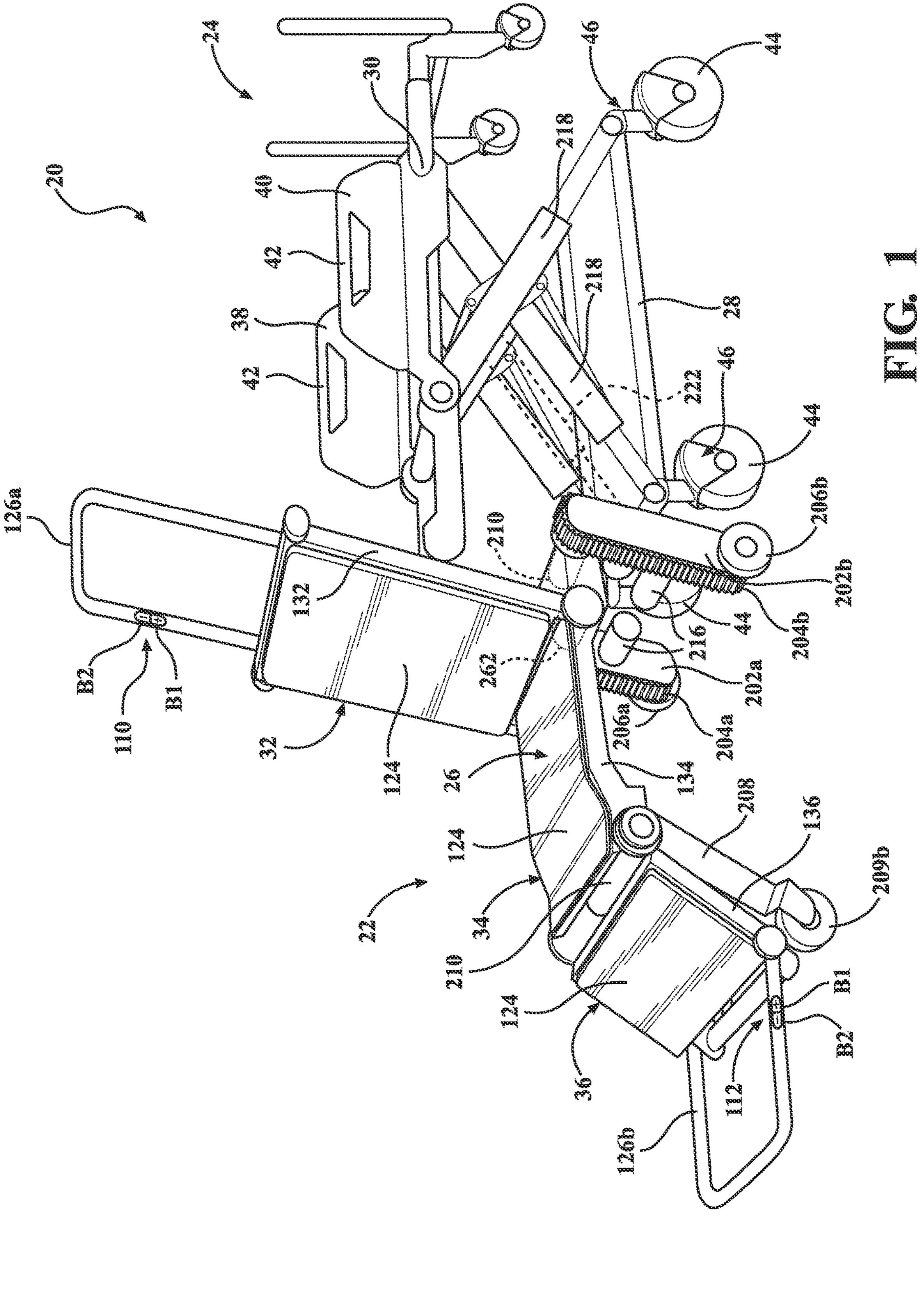
FIG. 1 is a perspective view of a patient support apparatus according to a first embodiment of the present disclosure, shown comprising a base and a litter.

Referring to FIG. 1, a patient support apparatus of a patient support system is shown at 20 for supporting a patient in a health care setting according to a first embodiment of the present disclosure. As will be appreciated from the subsequent description below, while the illustrated embodiments of the patient support apparatus 20 described herein are configured as cots for transporting patients, the patient support apparatus 20 may comprise a hospital bed, a stretcher, a table, a wheelchair, a chair, or a similar apparatus utilized in the care of a patient. The embodiment of the patient support apparatus 20 shown in FIG. 1 generally comprises a litter 22 and a base 24. The litter 22 defines or otherwise comprises a patient support surface 26 to support a patient.

In some embodiments, the patient support apparatus 20 may comprise a reconfigurable patient support as described in U.S. Pat. No. 9,486,373, which is hereby incorporated by reference in its entirety. In some embodiments, the patient support apparatus 20 may comprise a reconfigurable transport apparatus as described in U.S. Pat. No. 9,510,981, which is hereby incorporated by reference in its entirety. In some embodiments, the patient support apparatus 20 may comprise a person support apparatus system as described in U.S. Patent Application Publication No. 2018/0028383, which is hereby incorporated by reference in its entirety. In some embodiments, the patient support apparatus 20 may comprise a patient transfer apparatus with integrated tracks as described in U.S. patent application Ser. No. 15/854,943, which is hereby incorporated by reference in its entirety. In some embodiments, the patient support apparatus 20 may comprise a variable speed patient transfer apparatus as described in U.S. patent application Ser. No. 15/854,199, which is hereby incorporated by reference in its entirety. In some embodiments, the patient support apparatus 20 may comprise a patient transfer apparatus as described in U.S. patent application Ser. No. 15/855,161, which is hereby incorporated by reference in its entirety. In some embodiments, the patient support apparatus 20 may comprise an ambulance cot as described in U.S. Pat. No. 7,398,571, which is hereby incorporated by reference in its entirety.

With continued reference to FIG. 1, the base 24 and litter 22 each have a head end and a foot end corresponding to designated placement of the patient's head and feet on the patient support apparatus 20. In FIG. 1, the litter 22 is shown separated from the base 24; as is described in greater detail below, the base 24 is configured to removably receive and support the litter 22 in certain situations. Put differently, in the illustrated embodiment, the litter 22 is configured for releasable attachment to the base 24. The base 24 comprises a base frame 28 and an intermediate frame 30. The intermediate frame 30 is spaced above the base frame 28. Although not illustrated in detail in the drawings, a mattress (or sections thereof) may be disposed on or integral with the litter 22. In such circumstances, the mattress comprises or otherwise defines a secondary patient support surface upon which the patient is supported.

The litter 22 may comprise several sections, some of which are capable of being articulated relative to others, such as a fowler section 32, a seat section 34, and a foot section 36. The fowler section 32 and the foot section 36 may pivot relative to the seat section 34, or may articulate relative to the seat section 34 in any manner. For instance, the fowler section 32 and/or the foot section 36 may both pivot and translate relative to the seat section 34 in some configurations.

First and second side rails 38, 40 are coupled to the base 24. The first side rail 38 is positioned on one side of the base 24, and the second side rail 40 is positioned on the other side of the base 24. In alternative configurations, there may be more than two side rails. The side rails 38, 40 are shown fixed to the intermediate frame 30. The side rails 38, 40 may be movable between a raised position in which they block ingress and egress into and out of the patient support apparatus 20, a lowered position in which they are not an obstacle to such ingress and egress, and/or one or more intermediate positions therebetween. In still other configurations, the patient support apparatus 20 may not include any side rails. In further configurations, the side rails 38, 40 may be coupled to the litter 22 instead of the base 24. Caregiver interfaces 42, such as handles, are shown integrated into the side rails 38, 40 to help facilitate movement of the patient support apparatus 20 over floor surfaces. Additional caregiver interfaces 42 may be integrated into other components of the patient support apparatus 20. The caregiver interfaces 42 are graspable by the caregiver to manipulate the patient support apparatus 20 for movement.

Wheels 44 are coupled to the base frame 28 to facilitate transport over floor surfaces. The wheels 44 are arranged in each of four quadrants of the base 24 adjacent to corners of the base frame 28. In the illustrated embodiments, the wheels 44 are caster wheels, which are able to rotate and swivel relative to the base frame 28 during transport. Each of the wheels 44 forms part of a caster assembly 46. Each caster assembly 46 is mounted to the base frame 28. It should be understood that various configurations of the caster assemblies 46 are contemplated. In addition, in some configurations, the wheels 44 are not caster wheels 46 and may be non-steerable, steerable, non-powered, powered, or combinations thereof. Additional wheels 44 are also contemplated. For example, the patient support apparatus 20 may comprise four non-powered, non-steerable wheels 44, along with one or more powered wheels. In some cases, the patient support apparatus 20 may not include any wheels 44. In other configurations, one or more auxiliary wheels (powered or non-powered), which are movable between stowed positions and deployed positions, may be coupled to the base frame 28. In some cases, when these auxiliary wheels are located between caster assemblies 46 and contact the floor surface in the deployed position, they cause two of the caster assemblies 46 to be lifted off the floor surface thereby shortening a wheel base of the patient support apparatus 20. A fifth wheel may also be arranged substantially in a center of the base. Other configurations are contemplated.

It should be noted that in many of the drawings described herein, certain components of the patient support apparatus 20 have been omitted from view for convenience of description and ease of illustration.

Figure 2:
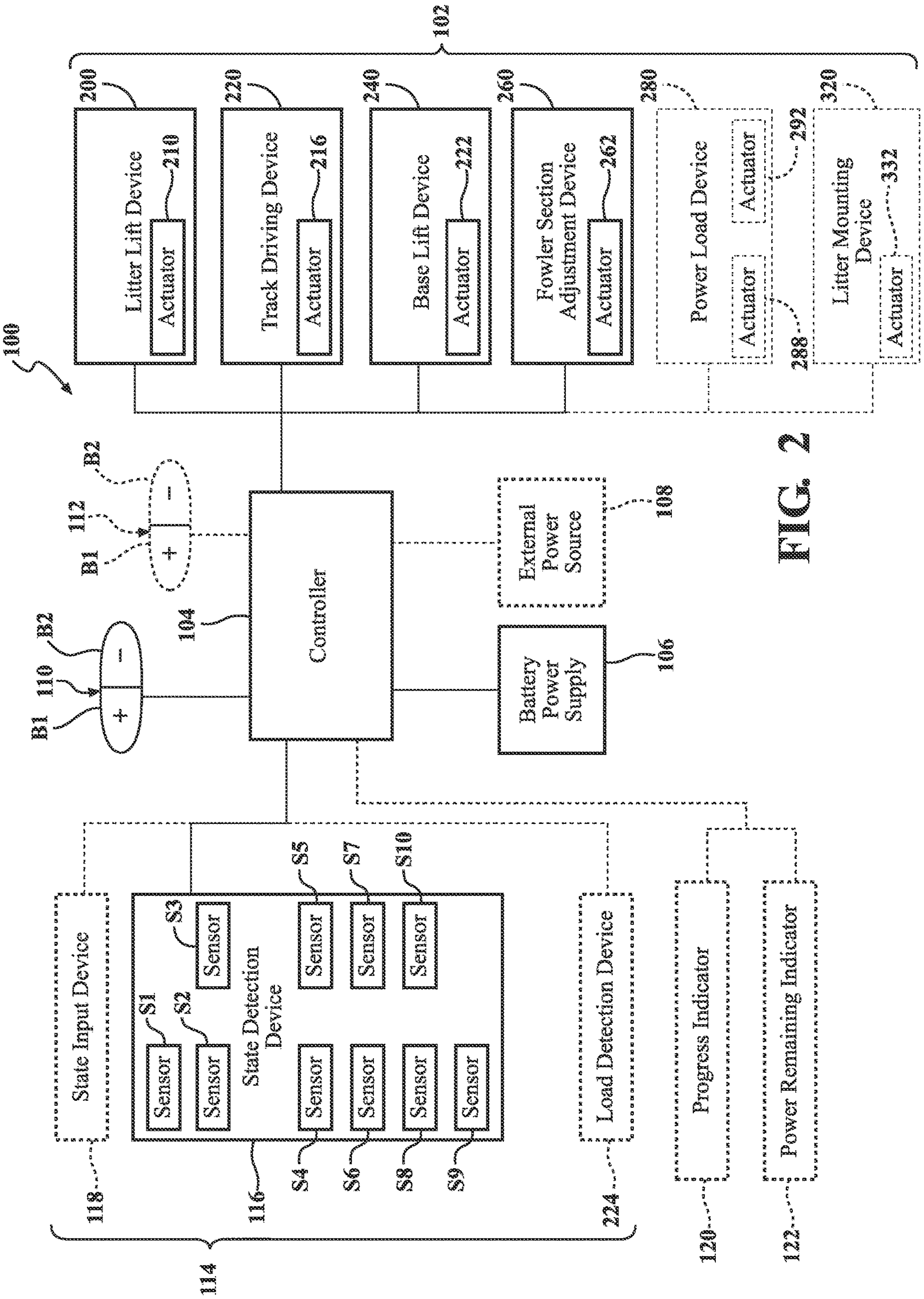
FIG. 2 is a schematic view of a control system of the patient support apparatus of FIG. 1.

Referring now to FIG. 2, a control system 100 of the first embodiment of the patient support apparatus 20 is shown schematically. The control system 100 generally comprises one or more powered devices 102 operated by a controller 104 in response to actuation of one or more user interfaces and in response to state signals received from a sensing system 114. In the first embodiment, the control system 100 comprises a first user interface 110 and a second user interface 112. Each of these components will be described in greater detail below.

As noted above, FIGS. 1-12D generally depict a first embodiment of the patient support apparatus 20, and FIGS. 13-17F generally depict a second embodiment of the patient support apparatus, each of which are described in greater detail below. While it will be appreciated that these embodiments share similar components and structural features, for the purposes of clarity and consistency and unless otherwise indicated, the control system 100 depicted schematically in FIG. 2 corresponds to the first embodiment of the patient support apparatus 20 described herein in connection with FIGS. 1-12D.

With continued reference to FIG. 2, each of the one or more powered devices 102 of the control system 100 is configured to perform one or more predetermined functions. To this end, the powered devices 102 employ one or more components that utilize electricity in order to perform functions. One or more powered devices 102 of the patient support system and/or the patient support apparatus 20 may comprise powered adjustment devices, such as a litter lift device 200, a track driving device 220, a base lift device 240, a fowler section adjustment device 260, a power load device 280, and a litter mounting device 320. Other powered devices 102 are also contemplated.

The powered devices 102 may have many possible configurations for performing the predetermined functions of the patient support apparatus 20. As will be appreciated from the subsequent description below, powered devices 102 may cooperate with or otherwise form a part of the patient support apparatus 20 in certain embodiments. Exemplary configurations of some of the powered devices 102 are described in greater detail below. One or more actuators may be used to effectuate functions of each powered device 102. It should be understood that numerous configurations of the powered devices 102, other than those specifically described herein, are contemplated. Exemplary scenarios of how certain powered devices 102 may be utilized are also described below. However, numerous other scenarios not described herein are also contemplated.

Figure 3:
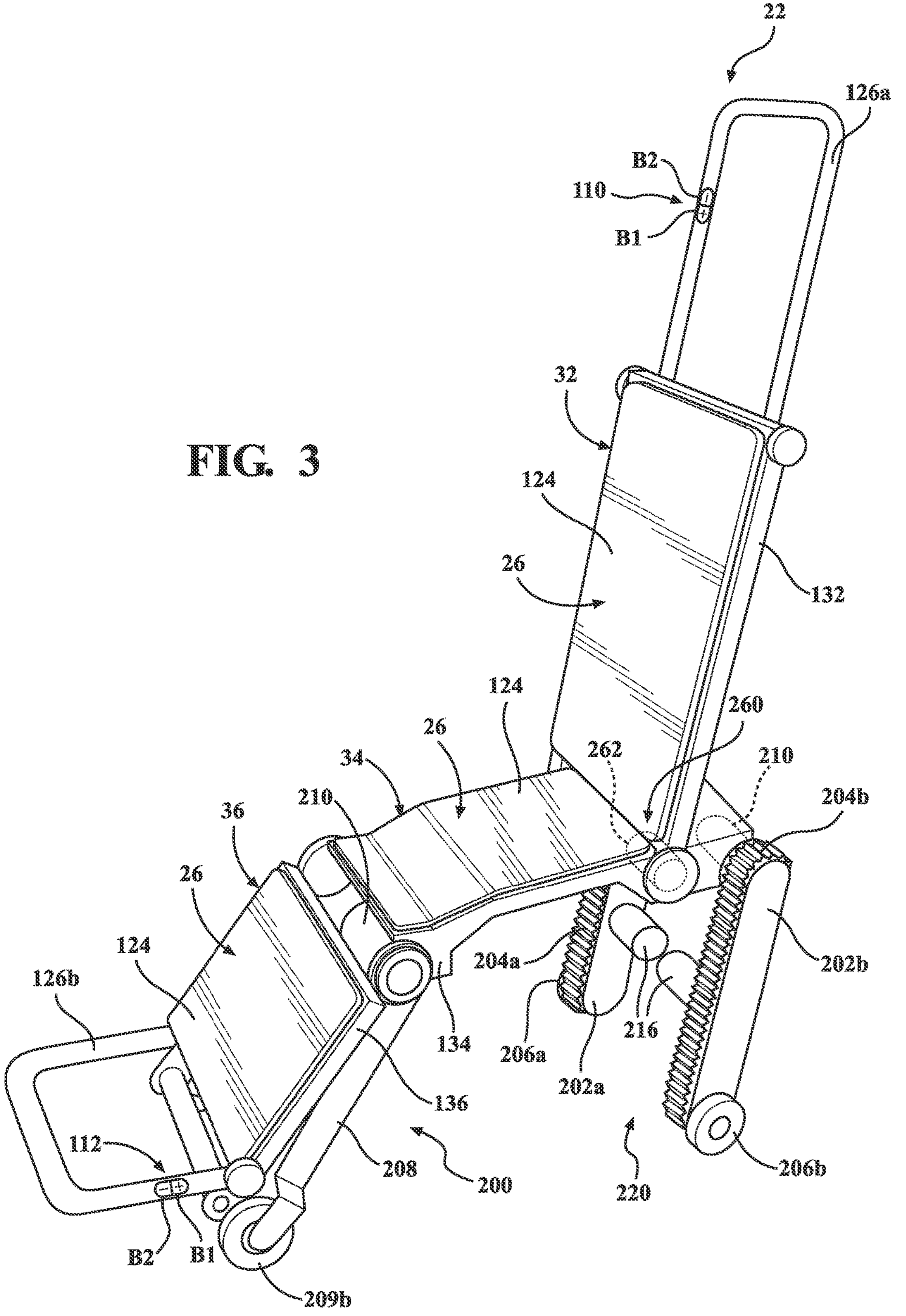
FIG. 3 is a perspective view of the litter of FIG. 1.

In the embodiment shown in FIG. 3, the litter 22 is configured to serve as a mobile chair to transport patients up and down stairs. Mobile chairs (sometimes called "stair chairs") are used to evacuate patients from buildings where patient accessibility is limited, such as buildings having more than one floor. As noted above, the litter 22 of the illustrated patient support apparatus 20 generally comprises the fowler section 32, the seat section 34, and the foot section 36. Here, the seat section 34 comprises a seat frame 134, and the fowler section 32 comprises a fowler frame 132 that is coupled to the seat frame 134 such that the fowler frame 132 may pivot or otherwise articulate relative to the seat frame 134. The foot section 36 comprises a foot frame 136 coupled to the seat frame 134 such that the foot frame 136 may pivot or otherwise articulate relative to the seat frame 134. In some configurations, the seat, fowler, and foot frames 134, 132, 136 comprise a pair of frame members spaced laterally apart from and fixed relative to each other. In further configurations, the litter 22 comprises actuators driven by the controller 104 and coupled to the fowler and foot frames 132, 136 to pivot or otherwise articulate the fowler and foot sections 32, 36 relative to the seat section 34.

In the embodiment shown in FIG. 3, deck panels 124 are disposed on each of the frames 132, 134, 136 collectively forming or otherwise defining the patient support surface 26. The deck panels 124 may comprise rigid panels with or without padding or any other suitable materials for supporting the patient.

In the first embodiment of the patient support apparatus 20 illustrated in FIGS. 1-12D, the litter 22 comprises a pair of handles 126*a*, 126*b*. More specifically, the litter 22 comprises first and second handles 126*a*, 126*b* respectively coupled to the fowler frame 132 and the foot frame 136. Here, one or more users (e.g. caregivers) may grasp the handles 126*a*, 126*b* to manipulate (e.g., lift and/or move) the litter 22. The first and second handles 126*a*, 126*b* may be fixed or adjustable relative to the corresponding fowler and foot frames 132, 136. In this embodiment, and as is best shown in FIG. 3, the first user interface 110 is coupled to the first handle 126*a* adjacent to the fowler frame 132, and the second user interface 112 is coupled to the second handle 126*b* adjacent to the foot frame 136. In alternative configurations, the litter 22 may comprise only a single user interface 110 coupled to one of the foot frame 136 and the fowler frame 132, or three or more user interfaces may be provided coupled to portions of the litter 22 and/or the base 24. While the user interfaces 110, 112 are coupled to the litter 22 in the illustrated embodiment, in alternative configurations, user interfaces may be located on one of the side rails 38, 40 coupled to the base 24, or other suitable locations. Other configurations are contemplated.

As noted above, the illustrated patient support apparatus 20 employs the track driving device 220, which is configured to assist users in traversing a flight of stairs by mitigating the load users (e.g., caregivers) would otherwise be required to lift via the first and second handles 126*a*, 126*b*. In some configurations the track driving device 220 may be configured to move the litter 22 across the floor surface. The track driving device 220 is coupled to the litter 22 and comprises a pair of track frame members 202*a*, 202*b* coupled to the seat frame 134 such that the track frame members 202*a*, 202*b* may pivot or otherwise articulate relative to the seat frame 134. The track driving device 220 comprises continuous tracks 204*a*, 204*b* rotatably coupled to each of the track frame members 202*a*, 202*b*. The track driving device 220 further comprises wheels 206*a*, 206*b* rotatably coupled to each of the track frame members 202*a*, 202*b* and configured to be disposed in contact with the floor surface. In the illustrated embodiments, the wheels 206*a*, 206*b* are freely rotatable. In alternative embodiments, the wheels 206*a*, 206*b* may be powered drive wheels coupled to the controller 104 that may be driven by the controller 104.

Figure 8:
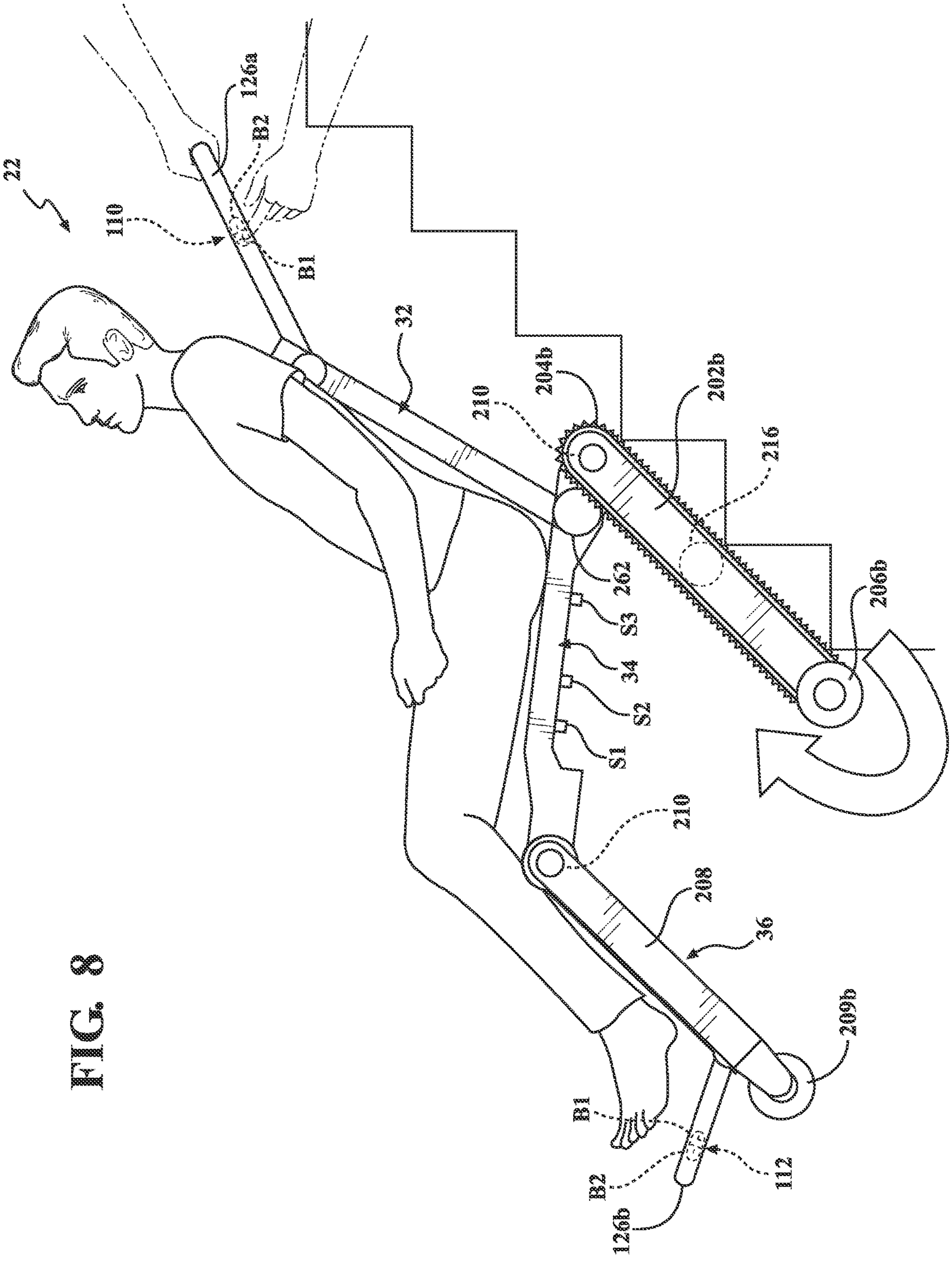
FIG. 8 is a side view of the litter of the patient support apparatus of FIGS. 6-7, shown with the user interface comprising a third functionality.

With continued reference to FIG. 3, the track driving device 220 comprises one or more track actuators 216 coupled to the track frame members 202*a*, 202*b* and coupled to (or otherwise disposed in communication with) the controller 104 to drive the continuous tracks 204*a*, 204*b* for ascending and descending stairs (see FIG. 8). The track driving device 220 may be configured to operate in the same manner or a similar manner as those shown in U.S. Pat. Nos.

9,486,373, 9,510,981, U.S. patent application Ser. No. 15/854,943, and/or U.S. patent application Ser. No. 15/854,199, previously referenced.

In the first embodiment of the patient support apparatus 20 depicted in FIGS. 1-12D, the litter 22 comprises a support frame 208 coupled to the seat frame 134 such that the support frame 208 may pivot or otherwise articulate relative to the seat frame 134 and/or the foot frame 136. In other embodiments (e.g., the second embodiment described in greater detail below in connection with FIGS. 13-17H), the support frame 208 may be coupled to the foot frame 136 such that the support frame 208 articulates with the foot frame 136 relative to the seat frame 134. With continued reference to FIG. 3, the litter 22 further comprises wheels 209*a*, 209*b* rotatably coupled to the support frame 208 which are configured to be disposed in contact with the floor surface. In the illustrated embodiments, the wheels 209*a*, 209*b* are freely rotatable. In alternative embodiments, the wheels 209*a*, 209*b* may be powered drive wheels coupled to the controller 104 that may be driven by the controller 104.

Figure 4:
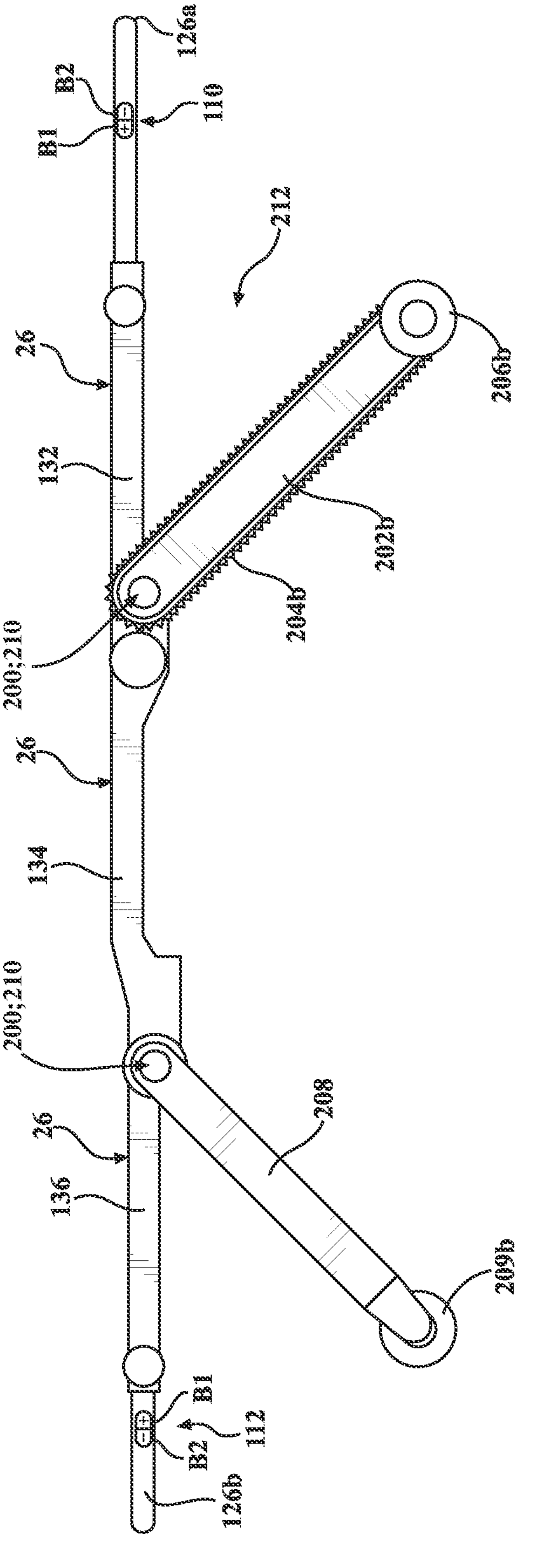
FIG. 4 is a side view of the litter of FIG. 3 shown arranged in a raised position.
Figure 5:
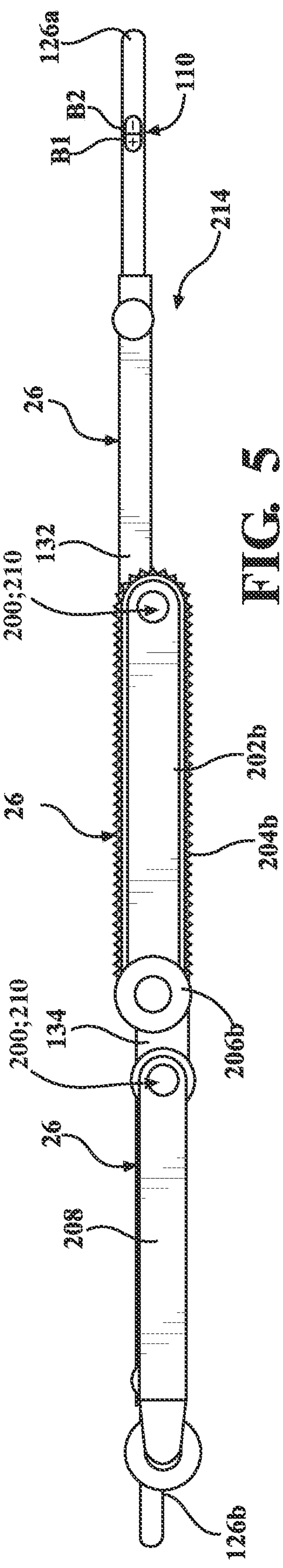
FIG. 5 is a side view of the litter of FIGS. 3-4 shown arranged in a lowered position.

The litter lift device 200 is coupled to the litter 22 and is configured to raise and lower the patient between minimum and maximum heights of the litter 22, and intermediate positions therebetween when the litter 22 is separated from the base 24 (see FIGS. 4-5). To this end, the illustrated litter lift device 200 comprises one or more litter lift actuators 210 coupled to the controller 104 and the litter 22 to raise and lower the patient support surface 26 relative to the floor surface. In the representative embodiment depicted in FIG. 3, two litter lift actuators 210 are coupled to the seat frame 134 and the lift actuators 210 are also respectively coupled to the support frame 208 and the track frame members 202*a*, 202*b*. This arrangement facilitates pivoting the support frame 208 and track frame members 202*a*, 202*b* relative to the seat frame 134. In this manner, the support frame 208 and the track frame members 202*a*, 202*b* act as support legs supporting the seat frame 134 above the floor surface. In the embodiment depicted in FIG. 4, the litter 22 is shown in a raised position 212 with the patient support surface 26 spaced from the floor surface at a maximum height relative to the floor surface. In FIG. 5, the litter 22 is shown in a lowered position 214 with the patient support surface 26 spaced from the floor surface at a minimum height relative to the floor surface.

The base lift device 240 is coupled to the base 24 and is configured to raise and lower the patient between minimum and maximum heights of the base 24, and intermediate positions therebetween, when the litter 22 is supported by the base 24. In the representative embodiment illustrated in FIG. 1, the base 24 comprises one or more lift arms 218 coupling the intermediate frame 30 to the base frame 28. The base lift device 240 comprises one or more base lift actuators 222 coupled to at least one of the base frame 28 and the intermediate frame 30 to raise and lower the intermediate frame 30 and litter 22 relative to the floor surface and the base frame 28. The base lift device 240 may be configured to operate in the same manner or a similar manner as the lift mechanisms shown in U.S. Pat. Nos. 7,398,571, 9,486,373, 9,510,981, and/or U.S. Patent Application Publication No. 2018/0028383, previously referenced.

As is shown in FIG. 3 and depicted schematically in FIG. 2, the fowler section adjustment device 260 is configured to pivot or otherwise articulate the fowler frame 132 relative to the seat frame 134. To this end, the fowler section adjustment device 260 comprises a fowler actuator 262 coupled to the controller 104, the fowler frame 132, and the seat frame 134 to articulate the fowler frame 132 relative to the seat frame 134.

Figure 10:
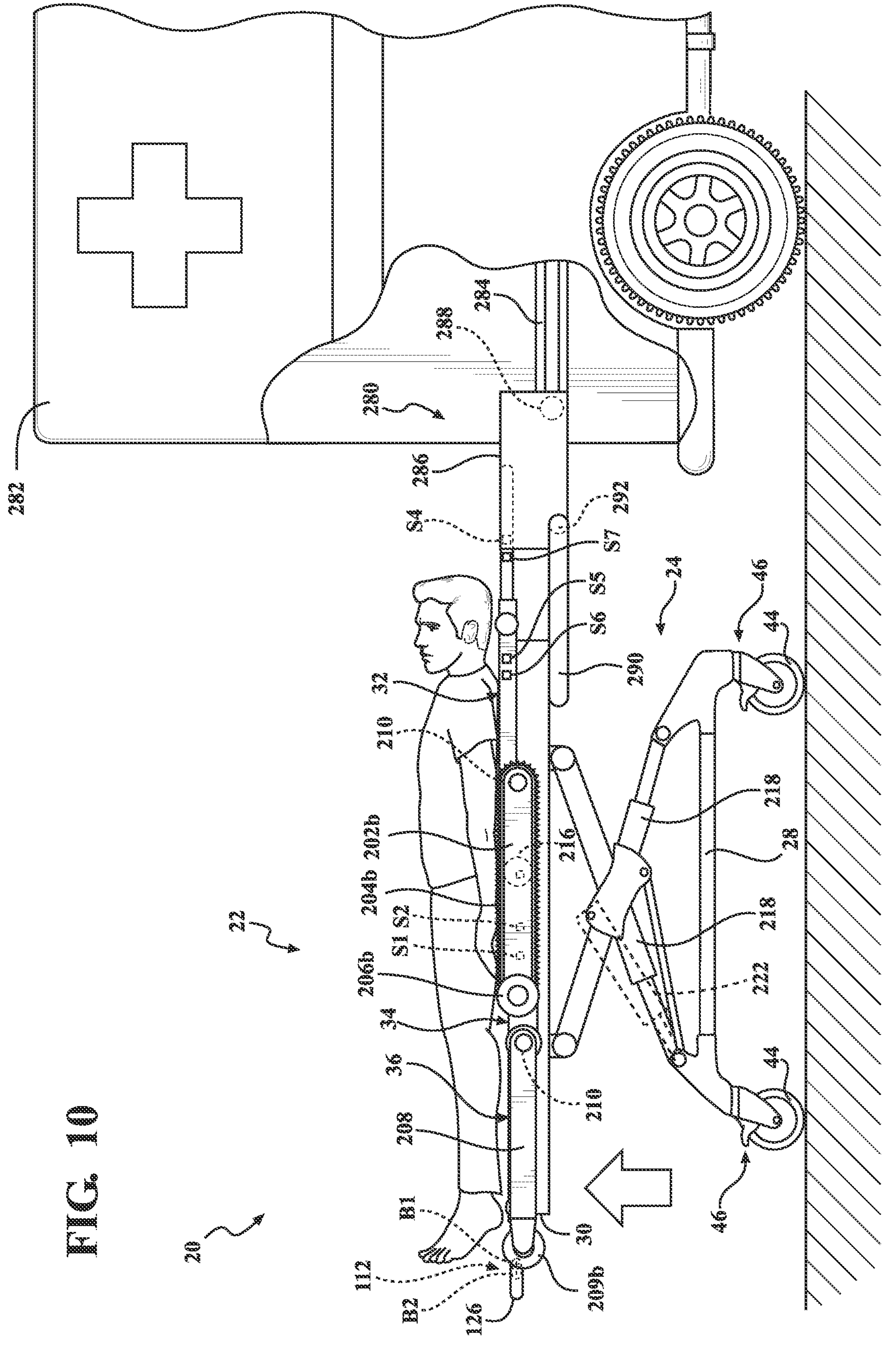
FIG. 10 is a side view of an ambulance and the patient support apparatus of FIGS. 6-9, shown with the user interface comprising the first functionality.
Figure 11:
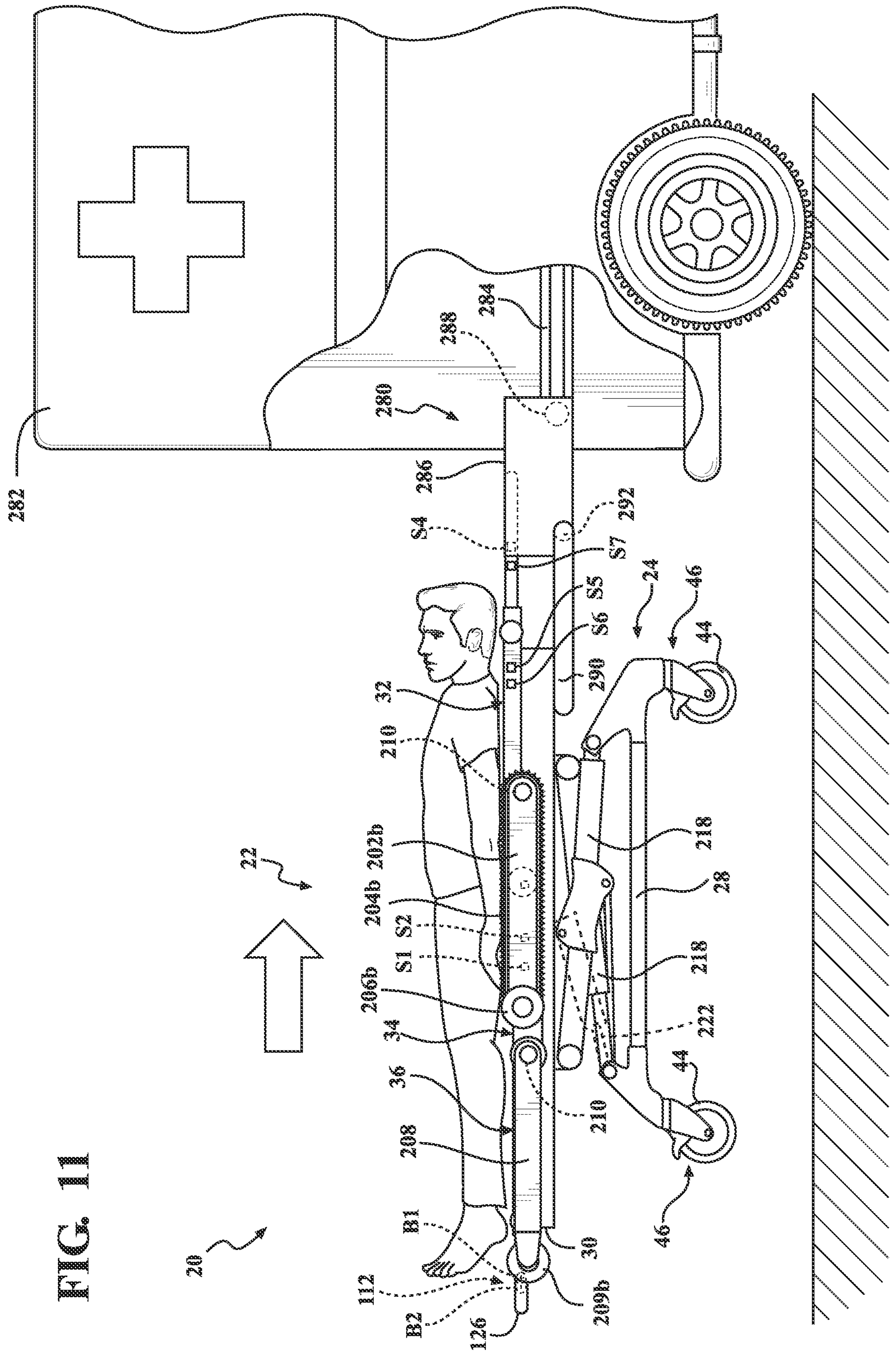
FIG. 11 is a side view of the ambulance and the patient support apparatus of FIG. 10, shown with the user interface comprising a fourth functionality.

As is shown in FIGS. 10-11 and depicted schematically in FIG. 2, the power load device 280 is coupled to an ambulance 282 and is configured to load and unload the patient support apparatus 20 into and out of the ambulance 282 when the power load device 280 is coupled to at least one of the litter 22 and the base 24. In this exemplary embodiment, the power load device 280 of the patient support system is realized as a powered device 102 that can be driven by the controller 104 without necessarily forming a part of the patient support apparatus 20. The power load device 280 generally comprises a rail 284 coupled to the ambulance 282. The rail 284 comprises a first end at the back of the ambulance where patients are loaded (e.g., a cargo area), and extends to a second end toward the front of the ambulance. The power load device 280 further comprises a trolley 286 coupled to the rail 284. The trolley 286 is movable along a length of the rail 284. The power load device 280 comprises a trolley actuator 288 coupled to the rail 284 and the trolley 286 to move the trolley 286 along the length of the rail 284.

In the embodiment shown in FIGS. 10-11, the power load device 280 comprises arms 290 coupled to the trolley 286. The arms 290 are configured to pivot or otherwise articulate relative to the trolley 286 in order to support the patient support apparatus 20 when at least one of the litter 22 and the base 24 are coupled to the trolley 286. The power load device 280 further comprises an arm actuator 292 coupled to the trolley 286 and the arms 290 to pivot or otherwise articulate the arms 290 relative to the trolley 286. When the trolley 286 is coupled to at least one of the litter 22 and the base 24, the power load device 280 is coupled to or otherwise disposed in communication with the controller 104 to be controlled by the controller 104 (see FIG. 2). The power load device 280 may be powered by a power source supplied by the ambulance 282 and/or by a power source on the patient support apparatus 20. In some embodiments, the power load device 280 of the patient support system is configured as described in U.S. Pat. No. 8,439,416, which is hereby incorporated by reference in its entirety.

In the embodiment illustrated in FIGS. 12A-12D, the litter mounting device 320 is coupled to the base 24 and is configured facilitate mounting the litter 22 onto the base 24. Here in the illustrated embodiment, the litter mounting device 320 is coupled to the intermediate frame 30 of the base 24. The intermediate frame 30 extends generally longitudinally between a first end 322 and a second end 324. Here, the first end 322 is arranged adjacent to head end of the base 24, and the second end 324 is arranged adjacent to the foot end of the base 24. In alternative configurations, the first end 322 may be arranged to be at the foot end of the base, and the second end 324 may be arranged to be at the head end of the base 24.

With continued reference to FIGS. 12A-12D, the illustrated litter mounting device 320 comprises a first gear 326 rotatably coupled to the intermediate frame 30 at the first end 322, and a second gear 328 rotatably coupled to the intermediate frame 30 at the second end 324. A chain 330 is disposed in meshing relationship with and is configured to rotate around both the first and second gears 326, 328. At least one of the chain 330, the first gear 326, and the second gear 328 is driven by a mounting actuator 332 to rotate the chain 330, the first gear 326, and the second gear 328. In alternative configurations, a belt and either pulleys or gears may be used to operate the litter mounting device 320 in the same or similar manner as the chain 330 and gears 326, 328. Other configurations are contemplated.

A carrier 334 is coupled to the chain 330 and is configured to move with the chain 330 relative to the base 24 between an unloaded position 336 (shown in FIGS. 12A-12B), a loaded position 338 (shown in FIG. 12D), and one or more intermediate positions (shown in FIG. 12C) between the unloaded and loaded positions 336, 338. The carrier 334 is proximal to the second end 324 of the intermediate frame 30 in the unloaded position 336 (see FIGS. 12A-12B), and is proximal to the first end 322 of the intermediate frame 30 in the loaded position 338 (see FIG. 12D). The mounting actuator 332 moves the carrier 334 (and, thus, the litter 22) between the unloaded position 336 and the loaded position 338.

In the representative embodiment illustrated in FIGS. 12A-12D, the carrier 334 comprises a hook 340 for attaching the litter 22 to the carrier 334. The litter 22 comprises a pin 342 that is received by the hook 340. In some embodiments, the carrier 334 may comprises a releasable locking assembly configured to prevent the pin 342 from separating from the hook 340 when the carrier 334 is moved between the unloaded and loaded positions 336, 338. However, the litter 22 may be releasably secured to the carrier 334 using components other than the pin 342 and hook 340, such as a double hook arrangement or another complementary fastening arrangement known in the art for releasably securing two physical components together. Other configurations are contemplated.

As noted above, the control system 100 is provided to control operation of the one or more powered devices 102 which form a part of or otherwise cooperate with the patient support apparatus 20. To this end, the controller 104 may employ one or more microprocessors for processing instructions or an algorithm stored in memory to control operation of the one or more powered devices 102. Additionally or alternatively, the controller 104 may comprise one or more microcontrollers, field programmable gate arrays, systems on a chip, discrete circuitry, and/or other suitable hardware, software, and/or firmware that is capable of carrying out the functions described herein. The controller 104 may be carried on-board the patient support apparatus 20, or may be remotely located. In one embodiment, the controller 104 is mounted to the litter 22. In other embodiments, the controller 104 may be mounted to the base 24. The controller 104 may comprise one or more subcontrollers configured to control the one or more powered devices 102, and/or one or more subcontrollers for each of the one or more powered devices 102. In some cases (e.g., the second embodiment depicted schematically in FIG. 14 and described in greater detail below), one subcontroller may be attached to the litter 22 and another subcontroller may be attached to the base 24. Power to the one or more powered devices 102 and/or the controller 104 may be provided by a battery power supply 106. In alternative configurations, the one or more powered devices 102 and/or the controller 104 may be provided by an external power source 108.

The controller 104 is coupled to the one or more powered devices 102 in a manner that allows the controller 104 to control the powered devices 102 (e.g., via electrical communication). The controller 104 may communicate with the one or more powered devices 102 via wired or wireless connections. In some embodiments, the controller 104 may generate and transmit control signals to the one or more powered devices 102, or components thereof, to drive or otherwise facilitate operating their associated actuators or to cause the one or more powered devices 102 to perform one or more of their respective functions.

In addition to controlling operation of the one or more powered devices 102, in some embodiments, the controller 104 also determines current and desired states of the litter 22 and/or the base 24 based on input signals that the controller 104 receives from the first user interface 110 (and/or the second user interface 112) and state signals that the controller 104 receives from the sensing system 114. The state of the litter 22 and/or the base 24 may be a position, a relative position with respect to another object or component, an orientation, a configuration, an angle, a speed, a load condition, an energization status, or any other state of the litter 22 and/or the base 24.

The sensing system 114 comprises a state detection device 116 that is coupled to the litter 22 and the controller 104 and monitors the state of the litter 22 directly, or indirectly. The state detection device 116 comprises one or more sensors S configured to monitor the litter 22, the base 24, and/or the one or more powered devices 102. To this end, the state detection device 116 generates a state signal corresponding to the state of the litter 22 and sends the state signal to the controller 104, such as when the litter 22 is mounted to the base 24.

The state detection device 116 and/or other aspects of the sensing system 114 may be used by the controller 104 for various purposes. The sensing system 114 may comprise one or more sensors S, including force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. The sensing system 114 may further comprise one or more sensors S to detect mechanical, electrical, and/or electromagnetic coupling between components of the patient support apparatus 20. Other types of sensors S are also contemplated. Some of the sensors S may monitor thresholds movement relative to discrete reference points. The sensors S can be located anywhere on the patient support apparatus 20, or remote from the patient support apparatus 20. For example, the sensors S may be located on or in the patient support surface 26, the base frame 28, the intermediate frame 30, the side rails 38, 40, or other suitable locations.

In some configurations described further below, the sensing system 114 acts as a secondary input device used to provide a second input signal to the controller 104 to cause or continue operation of the one or more powered devices 102. Numerous scenarios exist in which the one or more powered devices 102 can be operated based on the first input signal and the second input signal provided by the sensing system 114.

In one configuration, the sensing system 114 indicates when the function being performed has been completed by the one or more powered devices 102. By way of non-limiting example, adjustment of one or more powered devices 102 may be interrupted or stopped because a minimum or maximum position of the one or more powered devices 102 has been reached, such as by using a sensor S realized as a mechanical limit switch, a membrane switch, etc. Here in this example, the litter lift device 200 may be configured to move between a minimum height at a fully-lowered position (see FIG. 5) and a maximum height at a fully-lifted position (see FIG. 4). The litter lift device 200 may incorporate limit switches, encoders, and the like, such as in one or both of the litter lift actuators 210, to indicate when the minimum or maximum heights have been reached and thereby cause the controller 104 to discontinue operation of the lift actuators 210.

In certain embodiments (e.g. in the second embodiment described in greater detail below in connection with FIGS. 13-17H), the sensing system 114 comprises a state input device 118 to enable a user (e.g., a caregiver) to select a state such that actuation of the state input device 118 generates the state signal. In this case, instead of the controller 104 automatically detecting the current state of the litter 22, a user can manually enter the current state (or, in some embodiments, a desired state) of the litter 22 (e.g., "litter-on-base," "litter-off-base," etc.). In some configurations, the state input device 118 is spaced from at least one of the user interfaces 110, 112. In other configurations, the state input device 118 is connected to at least one of the user interfaces 110, 112.

The user interfaces 110, 112 are coupled to the controller 104 and may be actuated by the user (e.g., a caregiver) to transmit corresponding input signals to the controller 104, and the controller 104 controls operation of the one or more powered devices 102 based on the input signals and the state signals. Operation of the one or more powered devices 102 may continue until the user discontinues actuation of the user interface 110, 112 (e.g., until the corresponding input signal is terminated). Other configurations are contemplated.

The user interfaces 110, 112 may comprise devices capable of being actuated by the user. The user interfaces 110, 112 may be configured to be actuated in a variety of different ways, including but not limited to, mechanical actuation (hand, foot, finger, etc.), hands-free actuation (voice, foot, etc.), and the like. The user interfaces 110, 112 may comprise one or more of a load cell, a push button, a touch screen, a joystick, a twistable control handle, a dial, a knob, a gesture sensing device for monitoring motion of hands, feet, face, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, buttons/pedals may be physical buttons/pedals, or may be virtually-implemented buttons/pedals such as through optical projection or forming part of a graphical user interface presented on a touchscreen. Buttons/pedals may also be mechanically-implemented in some embodiments, or may drive-by-wire type buttons/pedals where a user-applied force actuates a sensor S such as a switch or potentiometer. Other configurations are contemplated.

In the first embodiment of the patient support apparatus 20 illustrated in FIGS. 1-12D, each of the user interfaces 110, 112 comprises two buttons B1, B2 that may be actuated to generate the input signal used by the controller 104 to drive the one or more powered devices 102. In other embodiments, the user interfaces 110, 112 may comprise three or more buttons (e.g. in the second embodiment described in greater detail below in connection with FIGS. 13-17H). In some embodiments, the user interfaces 110, 112 may comprise a single button. Other configurations are contemplated.

As will be appreciated from the subsequent description below, individual buttons B1, B2 (or "input controls") of the user interfaces 110, 112 may be used to control functions of or associated with more than one powered device 102. The user interfaces 110, 112 generate input signals corresponding to each individual button B1, B2 of the user interface 110, 112 when actuated. In order to operate different powered devices 102, the input signal received by the controller 104 may not change when the same button B1, B2 is actuated; rather, the state signals generated by the state detection device 116 may change according to the current state of the litter 22 and/or the base 24 such that the controller 104 determines which of the powered devices 102 to actuate based on the current state detected using the input signal from the same button B1, B2. Put differently, the same button B1, B2 can be used to control different powered devices 102 depending on the state determined by the controller 104 via the sensing system 114, the state detection device 116, and/or the state input device 118. By way of non-limiting example, the user may actuate a button B1 on the user interface 110 to operate the base lift device 240 when the litter 22 is in a first state, and the same button B1 may be actuated to operate the track driving device 220 when the litter 22 is in a second state. Other configurations are contemplated.

In one embodiment, the sensing system 114 comprises a load detection device 224 coupled to the base 24. The load detection device 224 is configured to detect when the intermediate frame 30 is subjected to a load, such as load created by the litter 22 or load created by the litter 22 and the patient. More specifically, the load detection device 224 detects when a load has exceeded a load threshold. When the intermediate frame 30 is subject to a load below the load threshold, the base lift actuator 222 raises and lowers the intermediate frame 30 relative to the base frame 28 in response to actuation of the user interfaces 110, 112 at a first rate. When the intermediate frame 30 is subjected to a load at or above the load threshold, the base lift actuator 222 raises and lowers the intermediate frame 30 relative to the base frame 28 in response to actuation of the user interfaces 110, 112 at a second rate slower than the first rate.

Figure 6:
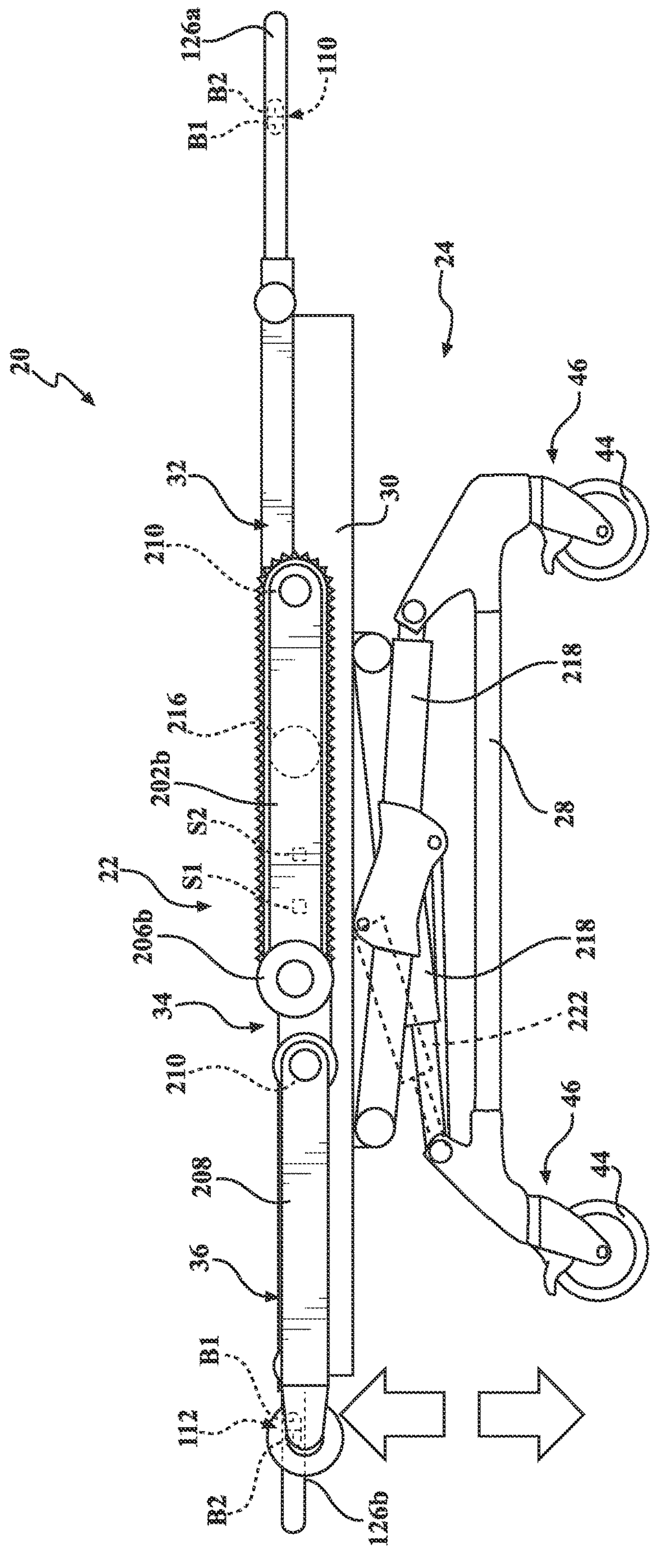
FIG. 6 is a side view of the patient support apparatus of FIG. 1, shown having a user interface comprising a first functionality.

In one exemplary embodiment shown in FIGS. 6-11, changes in functionality of the user interfaces 110, 112 based on current states of the litter 22 are illustrated. In FIG. 6, the base lift actuator 222 comprises a linear actuator. Here, the state detection device 116 comprises a sensor S1 to detect the litter 22 being coupled to and supported by the base 24. In this case, the current state of the litter 22 is considered to be a "litter-on-base" state. In response to detection via the sensor S1, the state detection device 116 generates a corresponding state signal that is received by the controller 104; here in the "litter-on-base" state, when a user actuates the first button B1 of one of the user interfaces 110, 112, the controller 104 is configured to operate the base lift actuator 222 to raise the litter 22 and the intermediate frame 30 relative to the floor surface and the base frame 28. Conversely, in the "litter-on-base" state, when the user actuates the second button B2 of the user interface 110, 112, the controller 104 is configured to operate the base lift actuator 222 to lower the litter 22 and the intermediate frame 30 relative to the floor surface and the base frame 28.

Figure 7:
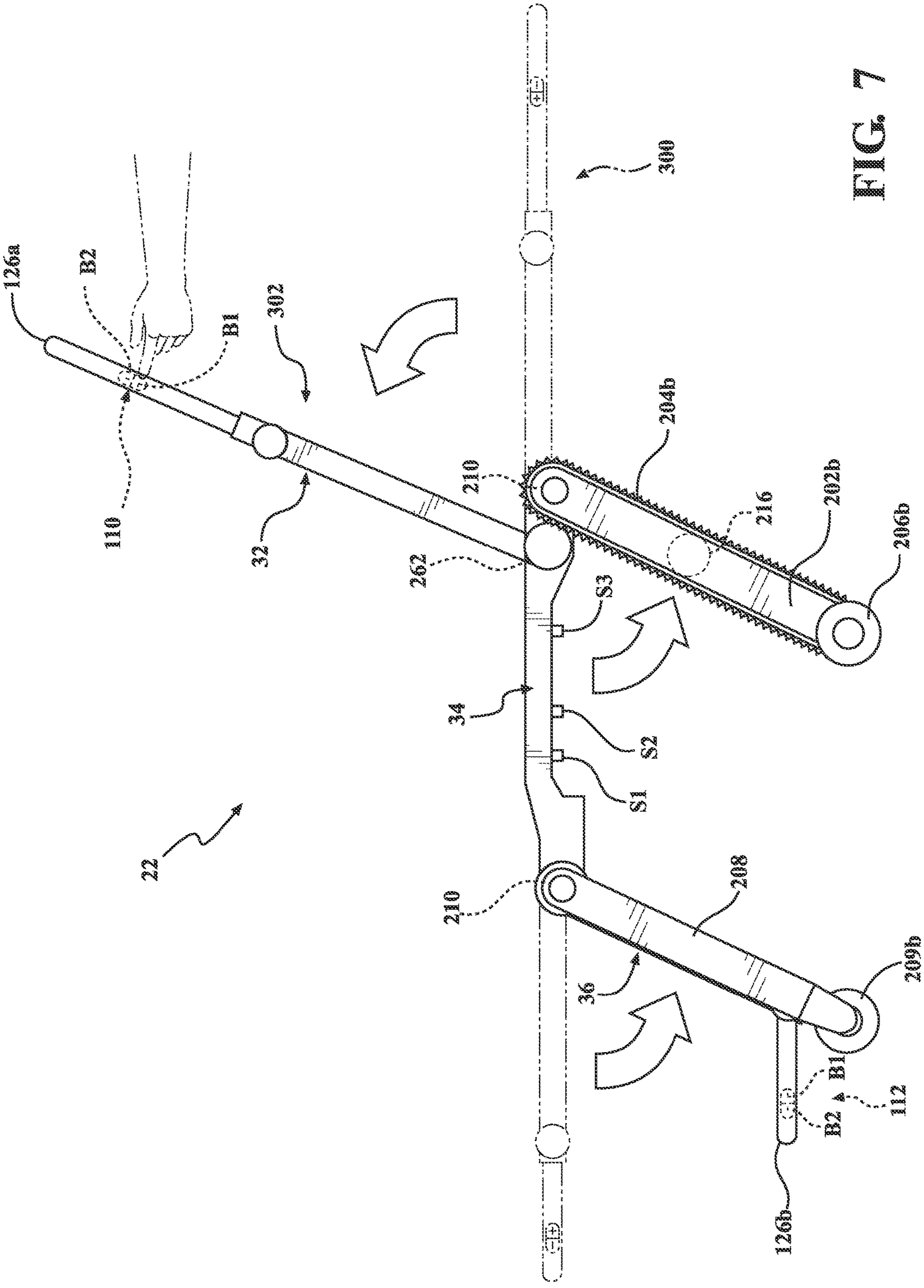
FIG. 7 is a side view of the litter of the patient support apparatus of FIG. 6, shown with the user interface comprising a second functionality.

As shown in FIG. 7, the litter 22 is removed from the base 24 and the sensor S1 of the state detection device 116 detects that the litter 22 is not supported by the base 24. In this case, the current state of the litter 22 is considered to be a "litter-off-base" state. Because of the absence of detection via the sensor S1, the state detection device 116 generates a state signal corresponding to the sensor S1 that is received by the controller 104; here in the "litter-off-base" state, the controller 104 is configured to change functionality of the user interfaces 110, 112 based on the change in state to the "litter-off-base" state. Accordingly, the user interfaces 110, 112 can be operated while in the "litter-off-base" state to change the configuration of the litter 22 between a substantially flat configuration 300 (see also FIGS. 4-5) and a seated configuration 302 (see also FIGS. 3 and 8).

Here, when a user actuates the first button B1 of one of the user interfaces 110, 112, the controller 104 is configured to operate the litter lift actuators 210 and the fowler actuator 262 to articulate the foot frame 136, the support frame 208, the fowler frame 132, and the track frame members 202*a*, 202*b* of the litter 22 toward the substantially flat configuration 300. Conversely, when the user actuates the second button B2 of the user interface 110, 112 while in the "litter-off-base" state, the controller 104 is configured to operate the litter lift actuators 210 and the fowler actuator 262 to articulate the foot frame 136, the support frame 208, the fowler frame 132, and the track frame members 202*a*, 202*b* of the litter 22 toward the seated configuration 302. FIG. 7 illustrates the litter 22 approaching the seated configuration 302.

As shown in FIG. 8, a patient is loaded on the litter 22 and is being transported up a flight of stairs. In some embodiments, the state detection device 116 comprises a load sensor S2 coupled to the litter 22 to detect whether the patient is supported by the litter 22. The state detection device 116 may further comprise an accelerometer S3 coupled to the litter 22 to detect whether the seat section 34 is substantially parallel to the floor surface. As shown in FIG. 8, in this case, since the load sensor S2 detects the patient load and the accelerometer S3 detects that the seat is not parallel to the floor surface (e.g., by measuring orientation relative to gravity), the current state of the litter 22 is considered to be a "patient-on-stairs" state. Here in the "patient-on-stairs" state, the litter 22 may be configured to operate in the same manner or a similar manner as the litter shown in U.S. patent application Ser. No. 15/854,943, U.S. patent application Ser. No. 15/854,199, and/or U.S. patent application Ser. No. 15/855,161, previously referenced.

Thus, when the patient is supported on the seat section 34 and the seat section 34 is not parallel with the floor surface as determined via the sensors S2, S3, the state detection device 116 generates a state signal received by the controller 104 corresponding to the "patient-on-stairs" state. Here too, the controller 104 is configured to change functionality of the user interfaces 110, 112 based on the change in state to the "patient-on-stairs" state. More specifically, while in the "patient-on-stairs" state, when a user actuates the first button B1 of one of the user interfaces 110, 112, the controller 104 is configured to operate the track actuators 216 to drive the continuous tracks 204*a*, 204*b* up the flight of stairs. Conversely, when the user actuates the second button B2 of the user interface 110, 112 while in the "patient-on-stairs" state, the controller 104 is configured to operate the track actuators 216 to drive the continuous tracks 204*a*, 204*b* down the flight of stairs. FIG. 8 illustrates the first button B1 being actuated.

In some embodiments, the second user interface 112 may be actuated by another user (e.g., a second caregiver), whereby actuation of the second user interface 112 transmits the corresponding second input signal to the controller 104, and the controller 104 controls operation of the one or more powered devices 102 based on the state signals and based on both the first input signal from the first user interface 110 and the second input signal from the second user interface 112. Thus, in some configurations, the controller 104 relies on the state signal and both the first and second input signals in order to generate an output signal used to actuate the powered device 102 to ensure that simultaneous actuation of the first and second user interfaces 110, 112 by two or more users occurs before the function of the powered device 102 will be performed. In the "patient-on-stairs" state depicted in FIG. 8, for example, two users may be operating the litter 22 together. Accordingly, in some configurations, in order for the controller 104 to cause operation of the track actuators 216, both the first user interface 110 and the second user interface 112 are required to be actuated simultaneously (i.e., with both users actuating buttons B1 or B2 at the same time). Thus, the controller 104 could require both of the first and second input signals when the state signal represents the litter 22 being in the "patient-on-stairs" state before generating an output signal to actuate the track actuators 216. In some embodiments, the controller 104 may require that the first user interface 110 and the second user interface 112 be actuated sequentially before driving the track actuators 216. In some embodiments, the first and second user interfaces 110, 112 may be actuated by a single user. In further embodiments, at least one of the user interfaces 110, 112 may be actuated by two or more users. Other configurations are contemplated.

Figure 9:
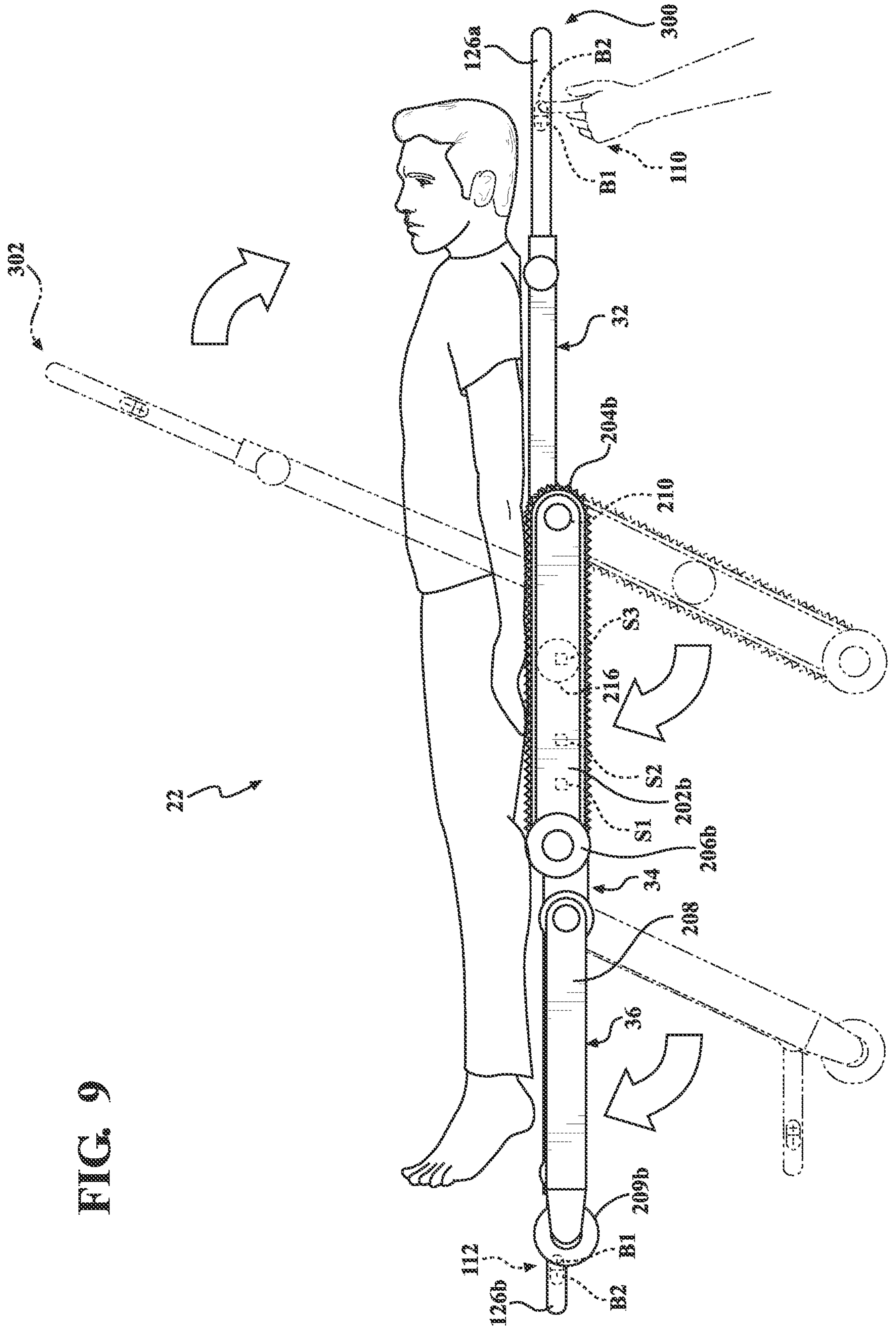
FIG. 9 is a side view of the litter of the patient support apparatus of FIGS. 6-8, shown with the user interface comprising the second functionality.

As shown in FIG. 9, one or more users are preparing to return the litter 22 to a substantially flat configuration 300 in order to couple the litter 22 to the base 24 in the first embodiment of the patient support apparatus 20. Here, the load sensor S2 coupled to the litter 22 continues to detect that the patient is supported by the litter 22, and the accelerometer S3 detects that the seat section 34 is substantially parallel to the floor surface. In this case, the current state of the litter 22 is considered to be a "patient-off-stairs" state. Thus, when the patient is supported on the seat section 34 and the seat section 34 is parallel with the floor surface as determined via the sensors S2, S3, the state detection device 116 generates a state signal received by the controller 104 which corresponds to the "patient-off-stairs" state. Here too, the controller 104 is configured to change functionality of the user interfaces 110, 112 based on the change in state to the "patient-off-stairs" state. More specifically, while in the "patient-off-stairs" state, the user interfaces 110, 112 can be operated to change the configuration of the litter 22 between the substantially flat configuration 300 (see FIGS. 4-5 and 9) and the seated configuration 302 (see FIGS. 3, 7, and 8). When the litter 22 returns to the substantially flat configuration 300 and the litter 22 is coupled to the base 24, functionality of the user interfaces 110, 112 returns to the functionality described above in connection with FIG. 6.

As shown in FIG. 10, the litter 22 is coupled to the base 24 and the patient support apparatus 20 is being loaded into the ambulance 282. In some embodiments, the state detection device 116 comprises a proximity sensor S4 to detect when the litter 22 is coupled to the trolley 286. In the illustrated embodiment, the state detection device 116 further comprises another proximity sensor S5 to detect when the arms 290 of the power load device 280 are adjacent to the litter 22. While the proximity sensors S4, S5 are coupled to the litter 22 in the illustrated embodiment, other suitable locations for the sensors S4, S5 are contemplated by the present disclosure.

With continued reference to FIG. 10, as noted above, the patient support apparatus 20 is depicted as being coupled to the trolley 286 of the ambulance 282. Here, the proximity sensor S4 detects that the litter 22 of the patient support apparatus 20 has been coupled to the trolley 286. In this case, the current state of the litter 22 is considered to be a "litter-loading" state, where the litter 22 is coupled to the trolley 286 but the arms 290 of the power load device 280 have not yet been pivoted to support the patient support apparatus 20 (FIG. 10 shows the arms 290 pivoted into support). Thus, when the patient support apparatus 20 has been coupled to the trolley 286 as determined via the sensor S4, the state detection device 116 generates a state signal received by the controller 104 which correspond to the "litter-loading" state. Here, the controller is configured to change functionality of the user interfaces 110, 112 based on the change in state to the "litter-loading" state. More specifically, while in the "litter-loading" state, the user interfaces 110, 112 can be used to operate the arm actuators 292 to pivot the arms 290 relative to the trolley 286. Here, wired or wireless communication between the patient support apparatus 20 and the ambulance 282 may be effected while in the "litter-loading" state such that the user interfaces 110, 112 can be used to drive the arm actuators 292 coupled to the ambulance 282. Put differently, the arm actuators 292 may be capable of being remotely-controlled by the user interfaces 110, 112, or the physical connection of the litter 22 to the trolley 286 may place the user interfaces 110, 112 (and/or the controller 104) into electrical communication with the arm actuators 292. Accordingly, while in the "litter-loading" state, the first button B1 can be actuated to operate the arm actuators 292 and pivot the arms 290 relative to the trolley 286 until the patient support apparatus 20 is supported by the trolley 286 and the rail 284 as depicted in FIG. 10.

With continued reference to FIG. 10, as noted above, patient support apparatus 20 is depicted as being coupled to the trolley 286 of the ambulance 282 with the arms 290 pivoted to support the patient support apparatus 20. Here, the proximity sensor S5 detects that the arms 290 of the power load device 280 are adjacent to the litter 22 such that the patient support apparatus 20 is supported by the power load device 280. In this case, the current state of the litter 22 is considered to be a "supported-litter-loading" state. Thus, when the patient support apparatus 20 is supported by the arms 290 of the power load device 280 as determined via the sensor S5, the state detection device 116 generates a state signal received by the controller 104 which corresponds to the "supported-litter-loading" state. Here, the controller 104 is configured to again change the functionality of the user interfaces 110, 112 based on the change in state to the "supported-litter-loading" state depicted in FIG. 10. More specifically, while in the "supported-litter-loading" state, the user interfaces 110, 112 can be used to operate the base lift actuator 222 to raise the base frame 28 of the base 24 off the floor surface (e.g., the ground adjacent to the ambulance 282). Here, when the first button B1 of one of the user interfaces 110, 112 is actuated, the controller 104 operates the base lift actuator 222 to raise the base frame 28 relative to intermediate frame 30 such that the base frame 28 moves toward the intermediate frame 30 and the patient support apparatus 20 is suspended above the floor surface by the trolley 286 and the rail 284 (see FIG. 11).

Referring now to FIG. 11, in some embodiments, the state detection device 116 comprises an infrared sensor S6 (or another type of sensor) to detect when the base frame 28 is fully raised off the floor surface. While the infrared sensor S6 is coupled to the litter 22 in the illustrated embodiment, the infrared sensor S6 (or another type of sensor) may be coupled to the base lift actuator 222, to another location on the base 24, or other suitable locations without departing from the scope of the present disclosure. Other configurations are contemplated. Here in FIG. 11, the infrared sensor S6 detects that the base frame 28 has been fully retracted away from the floor surface. In this case, the current state of the litter 22 is considered to be a "retracted-litter-loading" state. Thus, when the base frame 28 has been retracted towards the supported litter 22 of the patient support apparatus 20 as determined via the sensor S6, the state detection device 116 generates a state signal received by the controller 104 which corresponds to the "retracted-litter-loading" state. Here too, the controller 104 is configured to once again change functionality of the user interfaces 110, 112 based on the change in state to the "retracted-litter-loading" state depicted in FIG. 11. More specifically, while in the "retracted-litter-loading" state, the user interfaces 110, 112 can be used to operate the trolley actuator 288. Here, when the user actuates the first button B1 of the user interface 110, 112, the controller 104 operates the trolley actuator 288 to move the trolley 286 (and, thus, the patient support apparatus 20) along the rail 284 toward the second end of the rail 284.

In some embodiments, the state detection device 116 further comprises an optical sensor S7 (or another type of sensor) coupled to the litter 22 to detect the positions of the patient support apparatus 20 and trolley 286 along the length of the rail 284. Here too, the optical sensor S7 (or another type of sensor) may alternatively be coupled to the trolley 286, to the base 24, or to other suitable locations. Other configurations are contemplated.

In some embodiments, when the optical sensor S7 detects that the patient support apparatus 20 and the trolley 286 are at the second end of the rail 284, the state detection device 116 generates a corresponding state signal received by the controller 104 which, in response, interrupts operation of the trolley actuator 288 when the trolley 286 is at the second end of the rail 284. In order to unload the patient support apparatus 20 from the ambulance 282, the user can actuate the second button B2 of the user interface 110, 112 to move the trolley 286 and the patient support apparatus 20 toward the first end of the rail 284 until the patient support apparatus 20 is disposed outside of the ambulance 282 (see FIG. 11). Here, the optical sensor S7 detects that the patient support apparatus 20 and the trolley 286 are at the first end of the rail 284, and the state detection device 116 generates a corresponding state signal received by the controller 104 which, in response, interrupts operation of the trolley actuator 288 and changes functionality of the user interfaces 110, 112 to operate the base lift actuator 222. From here, when the user actuates the second button B2 of the user interface 110, 112, the controller 104 drives the base lift actuator 222 such that the base frame 28 moves relative to the intermediate frame 30 and extends toward the floor surface. Once the wheels 44 of the base frame 28 make contact with the floor surface, continued actuation of the second button B2 raises the litter 22 and intermediate frame 30 relative to the floor surface, the base frame 28, and the arms 290 of the power load device 280. Here, the proximity sensor S5 detects that the arms 290 are no longer adjacent the litter 22, and the one or more users may remove the patient support apparatus 20 from the power load device 280.

Referring now to FIGS. 12A-12D, as noted above, the litter 22 is configured for removable attachment to the base 24 of the patient support apparatus 20 in the illustrated embodiments. During the process of attaching the litter 22 to the base 24 (and/or removing the litter 22 from the base 24), the functionality of the user interfaces 110, 112 likewise changes based on current states of the litter 22. To this end, the in some embodiments, the state detection device 116 comprises a proximity sensor S8 to detect attachment of the litter 22 to the carrier 334 of the litter mounting device 320. More specifically, the sensor S8 detects when the pin 342 of the litter 22 has been coupled to the hook 340 of the carrier 334. Here too in this embodiment, the state detection device 116 further comprises an optical sensor S9 to detect when the carrier 334 is in the unloaded position 336, and an optical sensor S10 to detect whether the carrier 334 is in the loaded position 338 (see FIG. 12D).

Figure 12A:
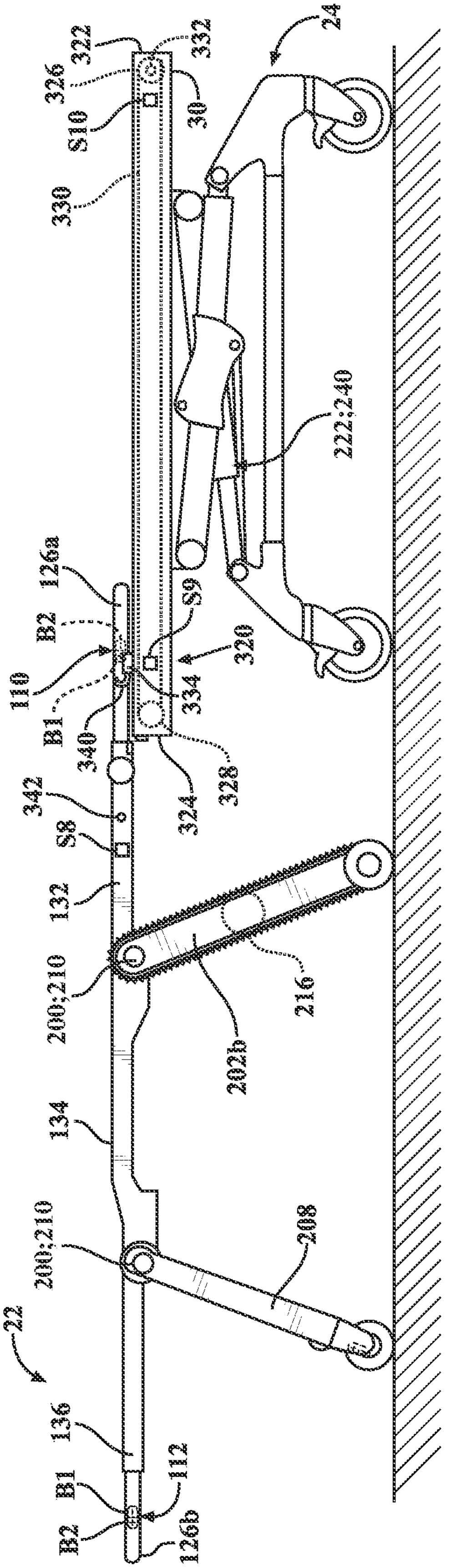
FIG. 12A is a side view of the patient support apparatus of FIGS. 1-11, shown with the user interface comprising a fifth functionality.

In FIG. 12A, the litter 22 is shown spaced from the base 24. Here, when a user actuates one of the buttons of the user interfaces 110, 112, the controller 104 is configured to operate the litter 22 in a manner similar to the "litter-off-base" state described above in connection with FIG. 7; actuation of the user interfaces 110, 112 drives the litter lift device 200 to raise or lower the litter 22 (and, thus, the pin 342) relative to the base 24 (and, thus, relative to the hook 340 of the carrier 334) such that the hook 340 may receive the pin 342. In some embodiments, rather than driving the litter lift device 200 to raise or lower the litter 22 relative to the base 24, the state detection device 116 may comprise an additional sensor (not shown) to detect proximity of the litter 22 relative to the base 24, whereby actuation of the user interfaces 110, 112 drives the base lift device 240 to raise or lower the base 24 (and, thus, the hook 340) relative to the litter 22 (and, thus, the pin 342) such that the pin 342 may be received by the hook 340. Other configurations are contemplated.

Figure 12B:
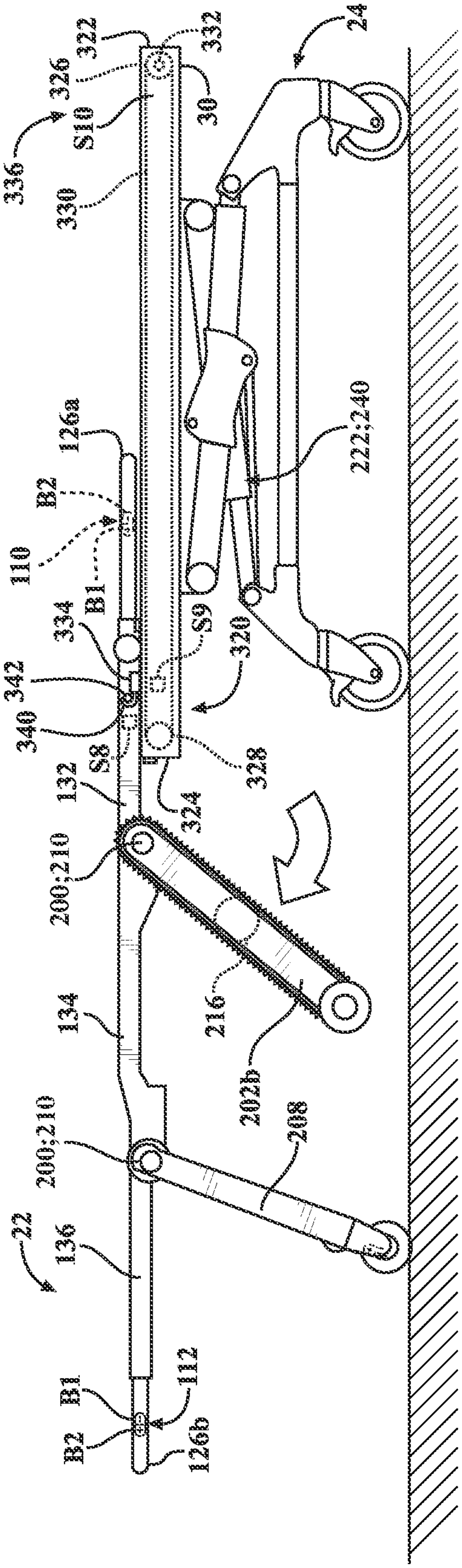
FIG. 12B a side view of the patient support apparatus of FIG. 12A, shown with the user interface comprising a sixth functionality in a first position.

As shown in FIG. 12B, the litter 22 is coupled to the base 24, but is not yet fully supported by the base 24. In this case, the current state of the litter 22 is considered to be a "litter mounting" state. Thus, when the pin 342 of the litter 22 has been received by the hook 340 of the carrier 334 as determined via the proximity sensor S8, and the carrier 334 is in the unloaded position 336 as determined via the optical sensor S9, the state detection device 116 generates a state signal received by the controller 104 which corresponds to the "litter mounting" state. Here, the controller 104 is configured to change functionality of the user interfaces 110, 112 based on the change in state to the "litter mounting" state depicted in FIG. 12B. Accordingly, the user interfaces 110, 112 can now be operated to change the configuration of the litter 22 as well as move the carrier 334 toward the loaded position 338. More specifically, when a user actuates the first button B1 of one of the interfaces 110, 112, the controller 104 is configured to operate the litter lift actuators 210 to articulate the track frame members 202*a*, 202*b* of the litter 22 toward the seat frame 134, and to operate the mounting actuator 332 to move the carrier 334 (and, thus, the litter 22) toward the loaded position 338 (see FIG. 12D; compare with FIGS. 12B-12C). In some embodiments, the controller 104 may be configured to operate the litter lift actuators 210 until the track frame members 202*a*, 202*b* are substantially parallel with the seat frame 134 before operating the mounting actuator 332. In other embodiments, the controller 104 may be configured to coordinate operation of the litter lift actuators 210 and the mounting actuator 332 simultaneously.

Figure 12C:
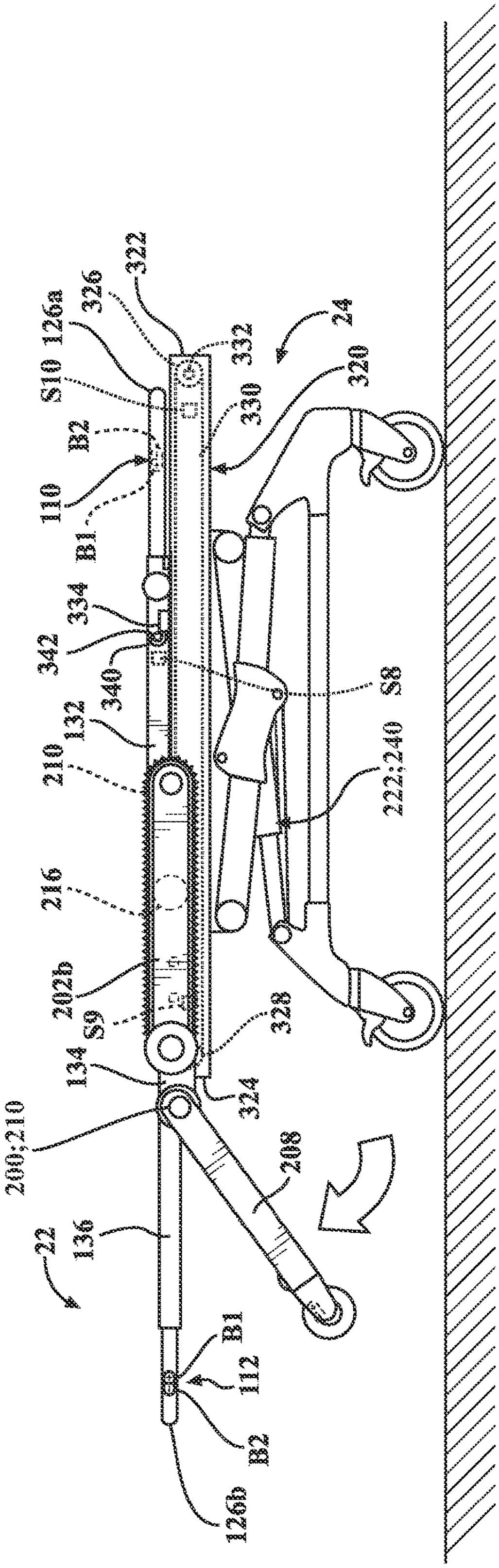
FIG. 12C is a side view of the patient support apparatus of FIGS. 12A-12B, shown with the user interface comprising the sixth functionality in a second position.
Figure 12D:
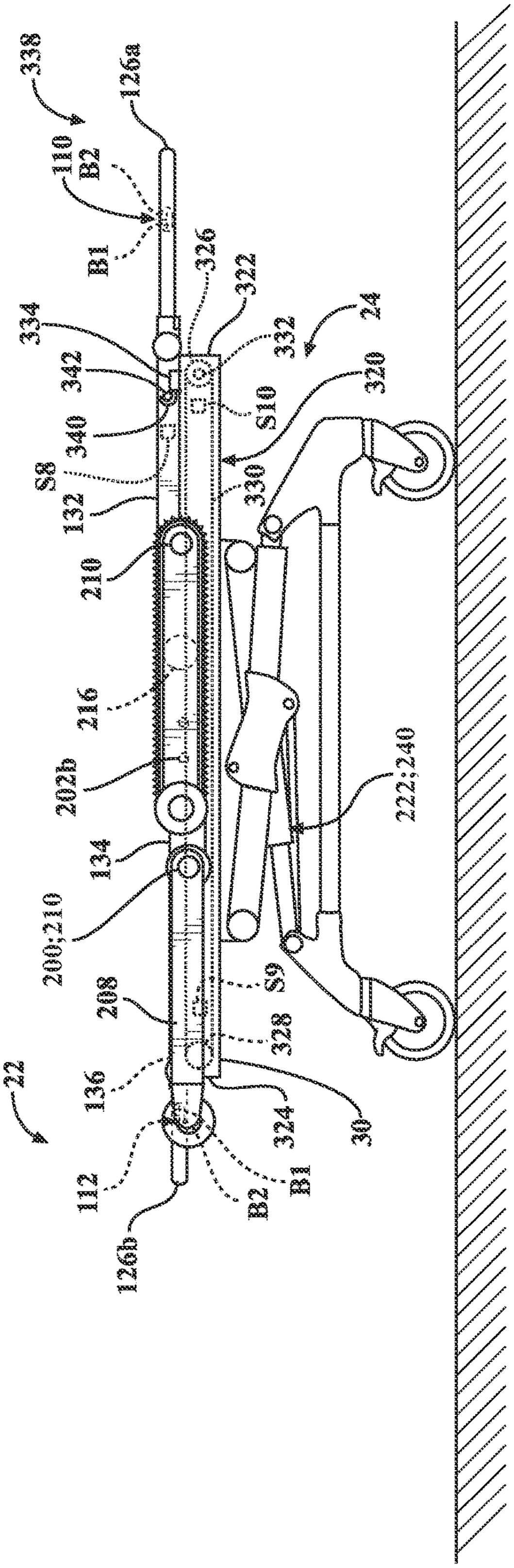
FIG. 12D is a side view of the patient support apparatus of FIGS. 12A-12C, shown with the user interface comprising the sixth functionality in a third position.

As shown in FIG. 12C, the track frame members 202*a*, 202*b* are parallel with the seat frame 134, and the carrier 334 is in an intermediate position between the unloaded and loaded positions 336, 338 (compare FIG. 12C with FIGS. 12B and 12D). Here, when a user actuates the first button B1 of one of the interfaces 110, 112, the controller 104 is configured to operate the litter lift actuators 210 to articulate the support frame 208 of the litter 22 toward the foot frame 136, and to operate the mounting actuator 332 to move the carrier 334 (and, thus, the litter 22) toward the loaded position 338 (see FIG. 12D). Conversely, when a user actuates the second button B2 of one of the interfaces 110, 112, the controller 104 is configured to operate the litter lift actuators 210 to articulate the support frame 208 of the litter 22 away from the foot frame 136, and to operate the mounting actuator 332 to move the carrier 334 (and, thus, the litter 22) toward the unloaded position 336 (see FIG. 12A). In some configurations, the controller 104 is configured to operate the litter lift actuators 210 until the support frame 208 is in contact with a floor surface (or reaches a predetermined lowered position) before operating the mounting actuator 332. In other configurations, the controller 104 is configured to coordinate operation of the litter lift actuators 210 and the mounting actuator 332 simultaneously. Other configurations are contemplated.

As shown in FIG. 12D, the litter 22 is in the substantially flat configuration and the carrier 334 is in the loaded position 338. Here, when the carrier 334 is in the loaded position 338 as determined via the optical sensor S10, the state detection device 116 generates a state signal received by the controller 104 which, in some embodiments, changes the functionality of the user interfaces 110, 112 to operate in a manner similar to the "litter-on-base" state described above in connection with FIG. 6. In some embodiments, the user may return to the "litter mounting" state by rapidly actuating the second button B2 of one of the user interfaces 110, 112 in quick succession (e.g. pushing the second button B2 twice in a short interval of time) and then holding the second button B2 to operate the mounting actuator 332 to move the carrier 334 and the litter 22 toward the unloaded position 336. In some embodiments, a switch (not shown) coupled to the controller 104 may be provided for manual actuation by the user to select (or "shift") between the "litter mounting" state and the "litter-on-base" state. In some embodiments, the patient support apparatus 20 may comprise a latch to releasably lock the litter 22 to the base 24 when the carrier 334 is in the loaded position 338 (see FIG. 12D). Here, the latch may be manually operated and may serve as the switch for selecting between operating states of the litter 22 (e.g., the "litter mounting" and "litter-on-base" states).

Referring again to FIG. 2, in some embodiments, data from the sensing system 114 may be stored in memory of the controller 104, and can be used to provide a history log or charts for the user, as well as activate alarms or other indicators to the user if needed. In some embodiments, the control system 100 may comprise a progress indicator 120 to display data collected in the memory of the control system 100 to a user. The progress indicator 120 may comprise a screen or another device for displaying data to the user. The progress indicator 120 may also display the current state of the litter 22, current functionalities of specific buttons B1, B2 on the user interfaces 110, 112, and/or energization statuses of powered devices 102. In some embodiments, statistics used for quantifying progress of the patient support apparatus 20 may be displayed. By way of example, the progress indicator 120 could be configured to display lift cycles completed, number of stairs traversed, duration since last charge of the battery 106, distance traveled by the litter 22, and other statistics relating to data received from the controller 104 through the sensing system 114.

In some embodiments, the control system 100 may comprise a power remaining indicator 122 to display power remaining in the battery power supply 106. The power remaining indicator 122 may comprise a screen or another device for displaying data to the user. In some embodiments, the screen or other device used for the power remaining indicator 122 could be the same screen or display device used for the progress indicator 120. In some embodiments, the power remaining indicator 122 could display power remaining in the battery power supply 106 in terms of a quantity of stairs capable of being ascended or descended by the track driving device 220, an amount of time remaining before the battery power supply 106 will be unable to power certain powered devices 102, a percent of power remaining, and/or a distance capable of being traversed by the track driving device 220. In one embodiment, data displayed on either of the indicators 120, 122 may change when the litter 22 changes states, such as from the "litter-on-base" state (in which the litter 22 is supported by the base 24) to the "litter-off-base" state (in which the litter 22 is unsupported by the base 24.

It will be appreciated that the actuators 210, 216, 222, 262, 288, 292, 332 described herein may comprise one or more of an electric actuator, a hydraulic actuator, a pneumatic actuator, combinations thereof, or any other suitable types of actuators. The actuators 210, 216, 222, 262, 288, 292, 332 may comprise one or more of a rotary actuator, a linear actuator, or any other suitable actuators. The actuators 210, 216, 222, 262, 288, 292, 332 may comprise reversible DC motors, or other types of motors, in some embodiments. Other configurations are contemplated.

As noted above, a second second embodiment of the patient support apparatus according to the present disclosure is depicted in FIGS. 13-17H. As will be appreciated from the subsequent description below, the second embodiment and the first embodiment share similar structure and components, as well as similar features, advantages, and operational use. Thus, in FIGS. 13-17H and in the subsequent description of the second embodiment below, the structure and components that are the same as or that otherwise correspond to the structure and components of the first embodiment are provided with the same reference numerals increased by 400.

Referring now to FIGS. 13-17H, aspects of the second embodiment of the patient support apparatus 420 are shown. Unless otherwise indicated below, it will be appreciated that the description of the first embodiment of the patient support apparatus 20 described above and depicted in FIGS. 1-12D may be incorporated by reference with respect to the second embodiment of the patient support apparatus 420 depicted in FIGS. 13-17H without limitation.

As shown in FIGS. 13 and 15A-15C, the litter 422 of the patient support apparatus 420 is separated from the base 424. In this second embodiment, the support frame of the litter 422 is integral with the foot frame; for the purposes of clarity and consistency, the integrated support frame and foot frame of the second embodiment will hereinafter be referred to as the "front leg 536", and the foot section of the second embodiment will hereinafter be referred to as the "front leg section 436". The front leg 536 has a proximal end coupled to the seat frame 534, and a distal end opposite the proximal end to assist in supporting the litter 422 above the floor surface. Wheels 609*a*, 609*b* are respectively coupled to the distal end of the front legs 536 and are configured to be disposed in contact with the floor surface.

Figure 13:
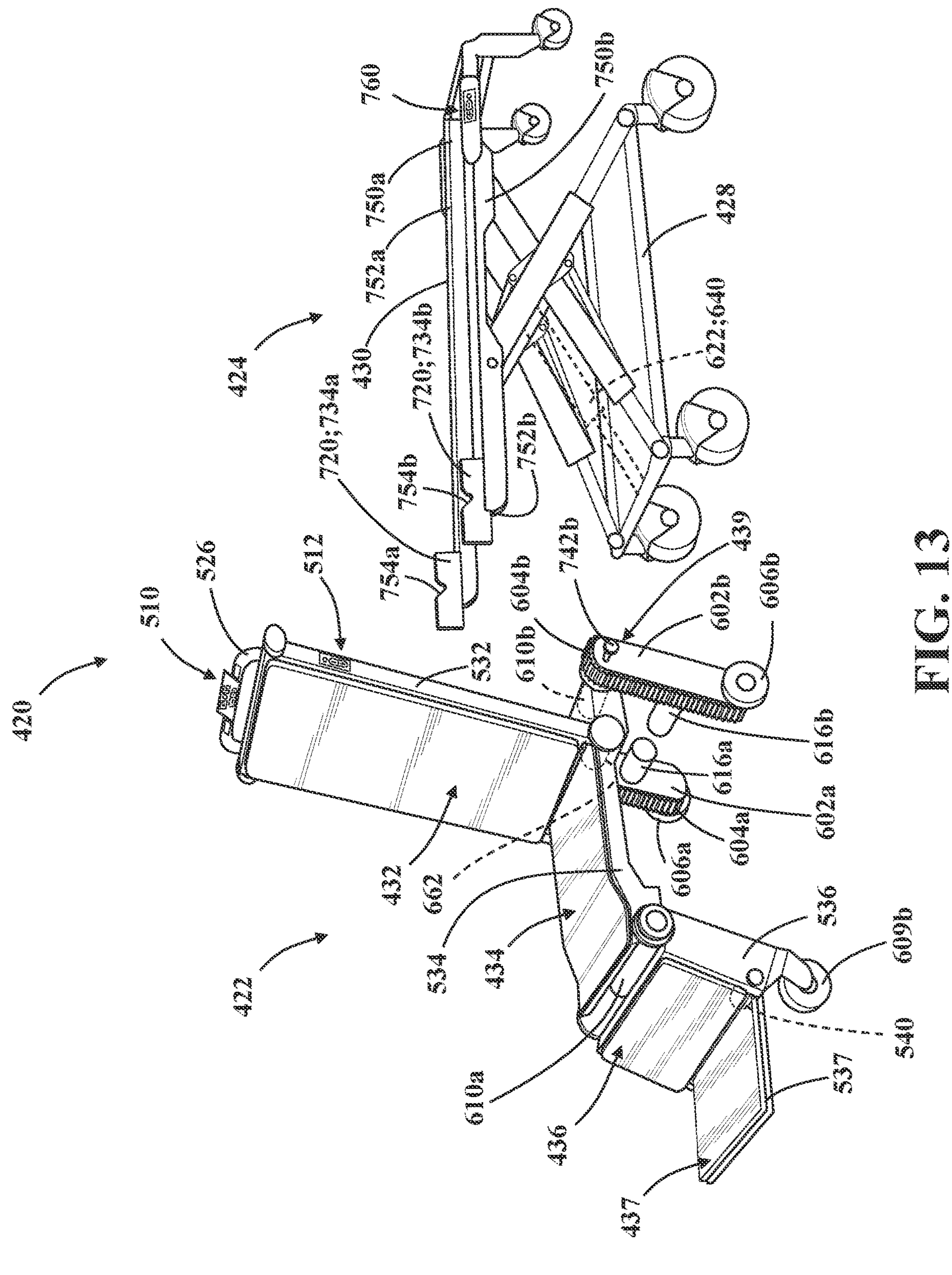
FIG. 13 is a perspective view of a patient support apparatus according to a second embodiment of the present disclosure, shown comprising a litter mounting device for mounting a litter on a base.

As shown in FIG. 13, the litter 422 of the second embodiment of the patient support apparatus 420 further comprises a footboard section 437 with a footboard frame 537 coupled to the front leg 536. The footboard frame 537 may provide or otherwise define an additional patient support surface to support a patient's feet. Additionally, the footboard frame 537 may be used as a caregiver interface to assist a caregiver with lifting or manipulating the litter 422. A footboard actuator 540 is coupled to the front leg 536, the footboard frame 537, and the controller 504 to pivot or otherwise articulate the footboard frame 537 relative to the front leg 536 (and, thus, to pivot or otherwise articulate footboard section 437 relative to the foot section 436). Here, the controller 504 may be configured to coordinate operation of the footboard actuator 540 with operation of other actuators of the patient support apparatus 420 to maintain a predetermined orientation of the footboard section 437 relative to the floor surface or to another section of the litter 422 (e.g. the seat frame) when one or more other actuators are driven to adjust the configuration of the litter 422.

As shown in FIG. 13, the litter 422 comprises a rear leg section 439. The rear leg section 439 comprises the track driving device 620 which, in turn, comprises a pair of track frame members, hereinafter referred to as "rear legs 602*a*, 602*b*." The rear legs 602*a*, 602*b* are coupled, at their proximal ends, to the seat frame 534 such that the rear legs 602*a*, 602*b* can pivot or otherwise articulate relative to the seat frame 534. In this second embodiment, the track driving device 620 comprises continuous tracks 604*a*, 604*b* rotatably coupled to the rear legs 602*a*, 602*b*, respectively. The track driving device 620 further comprises wheels 606*a*, 606*b* rotatably coupled to the respective distal ends of the rear legs 602*a*, 602*b* which are likewise configured to be disposed in contact with the floor surface.

Figure 15A:
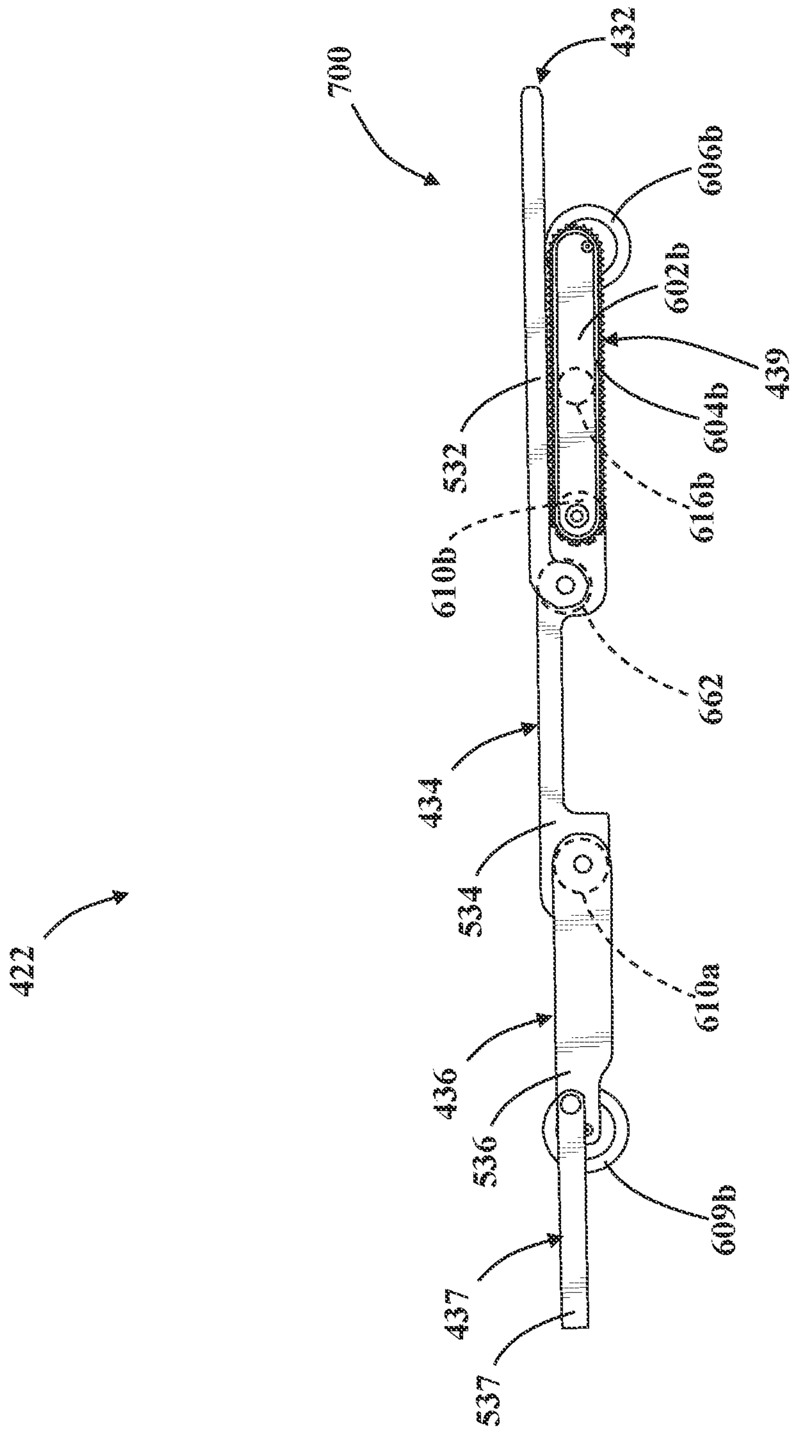
FIG. 15A is a side view of the litter of the patient support apparatus of FIG. 13, shown in a first configuration.
Figure 15B:
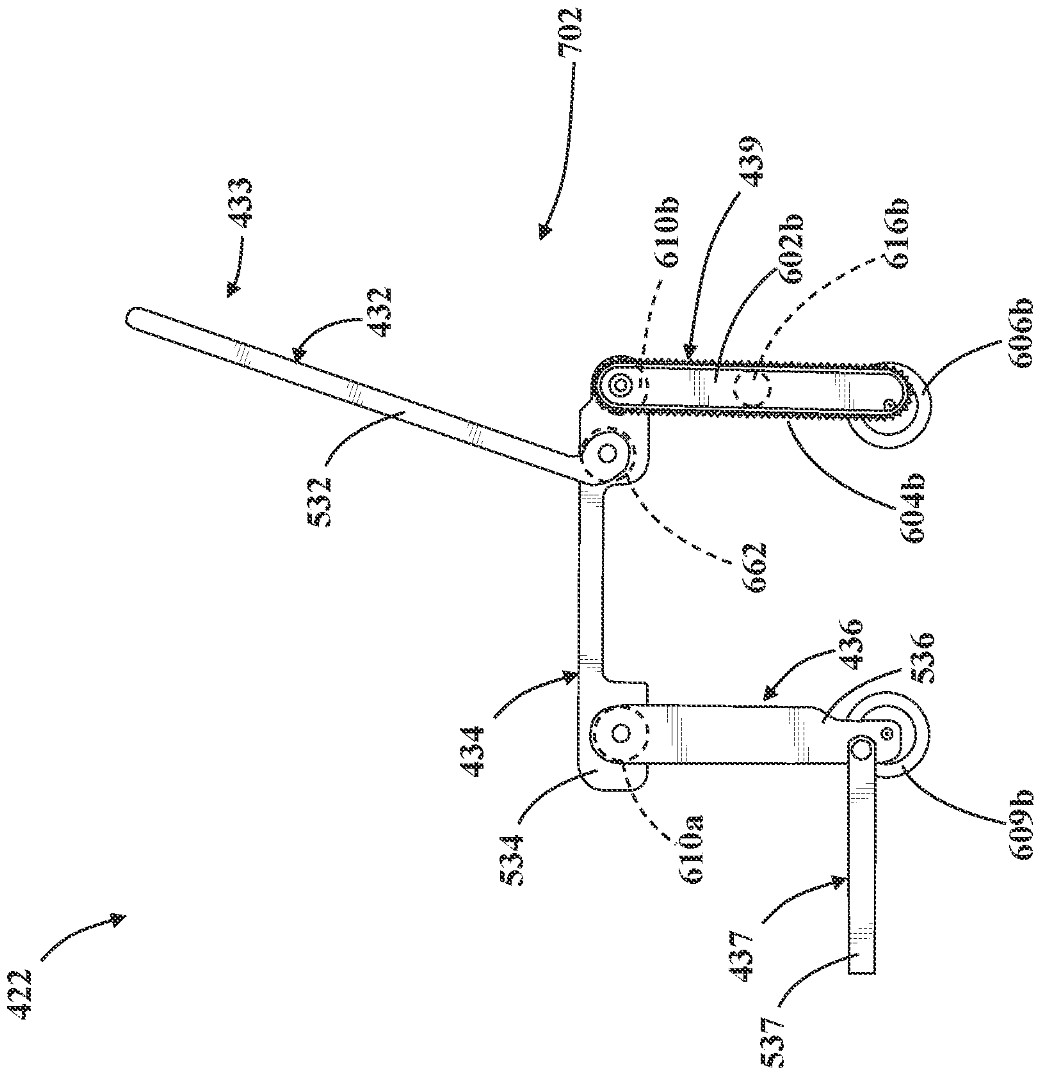
FIG. 15B is a side view of the litter of the patient support apparatus of FIG. 15A, shown in a second configuration.
Figure 15C:
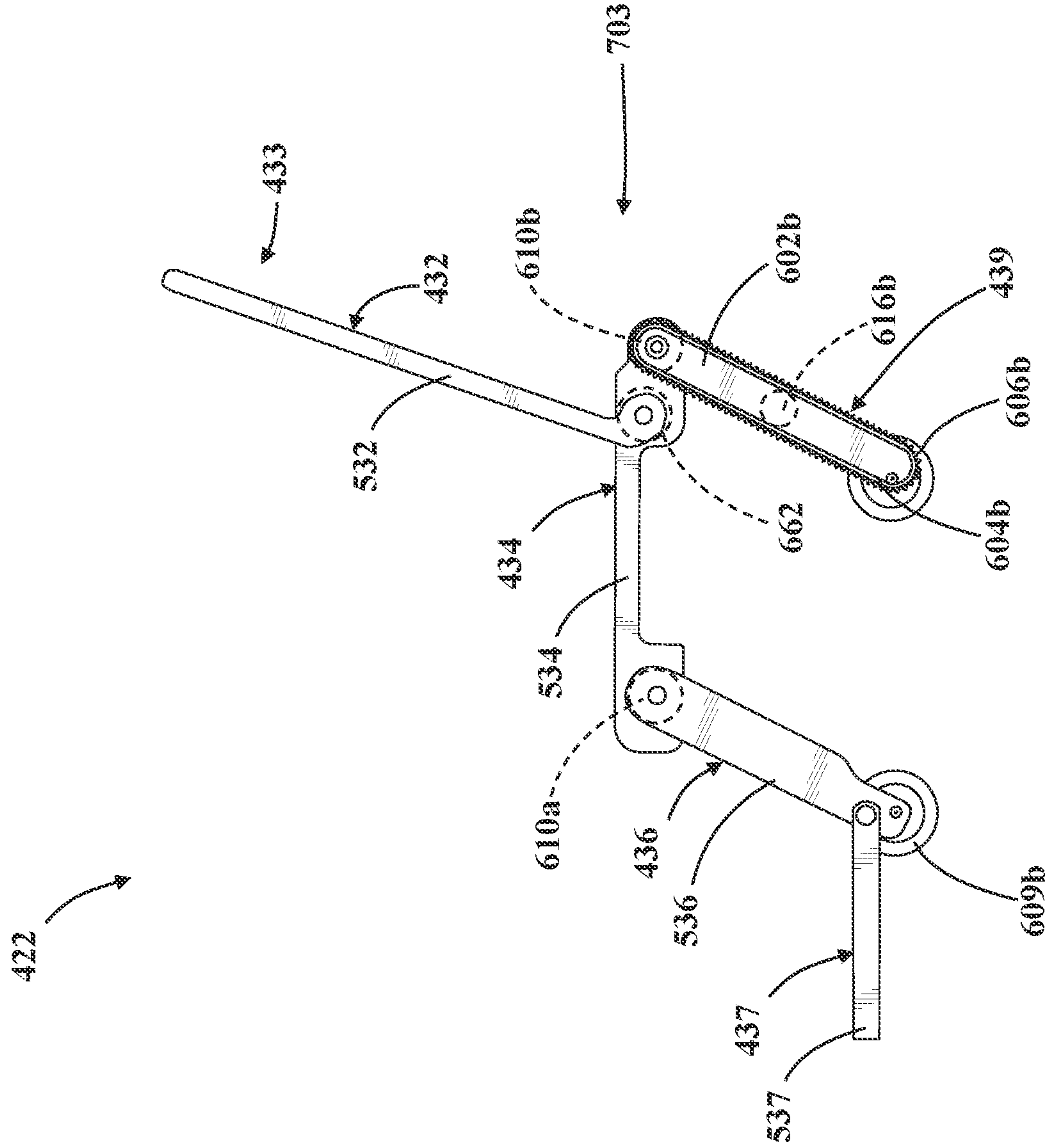
FIG. 15C is a side view of the litter of the patient support apparatus of FIGS. 15A-15B, shown in a third configuration.

In this second embodiment, the litter lift device 600 is coupled to the litter 422 and is configured to raise and lower the patient between minimum and maximum heights of the litter 422 (and to intermediate positions therebetween) when the litter 422 is separated from the base 424 (see FIGS. 15A-15C). To this end, the litter lift device 600 comprises a first litter lift actuator 610*a* and a second litter lift actuator 610*b*. The first litter lift actuator 610*a* is coupled to the seat frame 534, the front leg 536, and the controller 504 to pivot or otherwise articulate the front leg 536 relative to the seat frame 534. The second litter lift actuator 610*b* is coupled to the seat frame 534, the rear legs 602*a*, 602*b*, and the controller 504 to pivot or otherwise articulate the rear legs 602*a*, 602*b* relative to the seat frame 534. In this manner, the front leg 536 and the rear legs 602*a*, 602*b* act as support legs supporting the seat frame 534 above the floor surface to adjust the height of (or tilt) the seat frame 534 relative to the floor surface.

In FIG. 15A, the litter 422 is depicted in a substantially flat configuration 700 with the distal ends of the front leg 536 and rear legs 602*a*, 602*b* articulated away from each other to bring the seat frame 534 to a minimum height relative to the floor surface, and with the fowler section 432 pivoted or otherwise articulated relative to the seat section 434 toward the distal end of the rear legs 602*a*, 602*b*. In the substantially flat configuration 700, a patient may be readily transferred to the patient support surface from the floor surface.

In in FIG. 15B, the litter 422 is depicted in a seated chair configuration 702 (hereinafter, "chair configuration 702") with the front leg 536 and the rear legs 602*a*, 602*b* arranged generally perpendicular to the seat frame 534 to bring the seat frame 534 to a maximum height relative to the floor surface, and with the fowler section 432 pivoted or otherwise articulated relative to the seat section 434 to a raised position 433. In the chair configuration 702 illustrated in FIG. 15B, the raised position 433 is a position where the fowler section 432 forms an oblique angle relative to the seat section 434 between the position of the fowler section 432 in the substantially flat configuration 700 (see FIG. 15A) and a position of the fowler section 432 generally perpendicular to the seat section 434 (not shown). In some embodiments, the raised position 433 of the fowler section 432 may be defined as a position where the fowler section 432 is generally perpendicular to the seat section 434 (not shown). In the chair configuration 702, the sections of the litter 422 are advantageously arranged for the user to move the litter

422 relative to the floor surface via the wheels 606*a*, 606*b*, 609*a*, 609*b*, one or more of which may be realized as caster wheels.

In FIG. 15C, the litter 422 is depicted in a seated stair configuration 703 (hereinafter, "stair configuration 703") with the front leg 536 and the rear legs 602*a*, 602*b* disposed at oblique angles relative to the seat frame 534. In the stair configuration 703, the distal ends of the rear legs 602*a*, 602*b* are pivoted or otherwise articulated toward the proximal end of the front leg 536, and the distal end of the front leg 536 is pivoted or otherwise articulated away from the proximal ends of the rear legs 602*a*, 602*b*. Here in FIG. 15C, the front leg 536 and rear legs 602*a*, 602*b* are illustrated as being substantially parallel in the stair configuration 703. In other stair configurations (not shown), the front leg 536 and rear legs 602*a*, 602*b* may not be parallel to each other.

As is shown in FIG. 15C, when the litter 422 is in the stair configuration 703, the fowler section 432 may likewise be arranged in the raised position 433 relative to the seat section 434. Here, the raised position 433 may be the same as is utilized in the chair configuration 702 (see FIG. 15B), or the fowler section 432 could be arranged at a different angle relative to the seat section 434 in some embodiments. In the stair configuration 703 depicted in FIG. 15C, the front leg 536 and the rear legs 602*a*, 602*b* are positioned to assist the user with operating the track driving device 620 to ascend or descend stairs via the track driving device 620. In some embodiments, the litter 422 may be adjusted to a dolly configuration (not shown) where the distal ends of the front leg 536 and each of the rear legs 602*a*, 602*b* are pivoted or otherwise articulated toward each other such that the wheels 609*a*, 609*b* coupled to the front leg 536 can rotate about the same axis as the wheels 606*a*, 606*b* coupled to the rear legs 602*a*, 602*b*.

Operation of the litter 422 to and between the configurations introduced above in connection FIGS. 15A-15C will be described in greater detail below.

Referring again to FIG. 13, the litter 422 comprises a handle 526 coupled to the fowler frame 532. The handle 526 may be fixed or adjustable relative to the fowler frame 532. One or more users (e.g. caregivers) may grasp the handle 526 (and/or the footboard frame 537) to manipulate (e.g., lift and/or move) the litter 422. In this second embodiment, the first user interface 510 is coupled to the handle 526, and the second user interface 512 is coupled to a portion of the fowler frame 532 that is spaced from the handle 526. In this second embodiment of the patient support apparatus 420, the second user interface 512 offers alternative access to at least some aspects of the first user interface 510 to assist the user in operating various powered devices 502, such as when the first user interface 510 is less accessible. In alternative configurations, the second user interface 512 (and/or additional user interfaces) could be coupled to one of the seat frame 534, the front leg 536, and/or the rear legs 602*a*, 602*b*. In further configurations, the litter 422 may comprise only a single user interface 510 coupled to the handle 526. Other configurations are contemplated.

Similar to the first embodiment of the patient support apparatus 20 described above in connection with FIGS. 12A-12D, the second embodiment of the patient support apparatus 420 likewise comprises a base 424 for releasably securing and supporting the litter 422 above the floor surface. To this end, and as is shown in FIG. 13, the base 424 employs a litter mounting device 720 comprising one or more base rails 750*a*, 750*b* extending along the intermediate frame 430 between the first end 722 and the second end 724. In the illustrated embodiment, the first end 722 and the second end 724 of the intermediate frame 430 define opposing first and second ends of the base rails 750*a*, 750*b*.

In this second embodiment, the base rails 750*a*, 750*b* each define a channel 752*a*, 752*b* for receiving a respective carrier 734*a*, 734*b*. The carriers 734*a*, 734*b* are slidably movable within the respective channels 752*a*, 752*b* along the base rails 750*a*, 750*b* between the first and second ends 722, 724 of the intermediate frame 430. To this end, the carriers 734*a*, 734*b* may employ an arrangement of rollers (e.g., bearings, bushings, pins, shafts, and the like; not shown) which ride in the channels 752*a*, 752*b* and/or along other portions of the base rails 750*a*, 750*b*. While the litter mounting device 720 illustrated in FIG. 13 employs a carrier 734*a*, 734*b* for each base rail 750*a*, 750*b*, in other configurations a single carrier may be coupled to both base rails 750*a*, 750*b*. In still other configurations, the litter mounting device 720 may comprise a single rail and a single carrier coupled to the rail to move between the first and second ends 722, 724. Other configurations are contemplated.

Here too in this second embodiment of the patient support apparatus 420, the carriers 734*a*, 734*b* of the litter mounting device 720 are configured to move relative to the base 424 between an unloaded position 736 (see FIGS. 16A-16B), a loaded position 738 (see FIGS. 16G-16H), and one or more intermediate positions (see FIGS. 16C-16F) between the unloaded and loaded positions 736, 738. The carriers 734*a*, 734*b* are disposed adjacent the second end 724 of the intermediate frame 430 in the unloaded position 736, and are disposed adjacent to the first end 722 of the intermediate frame 430 in the loaded position 737. Operation of the litter mounting device 720 of the second embodiment of the patient support apparatus 420 will be described in greater detail below.

As shown in FIG. 13, the carriers 734*a*, 734*b* each comprise a respective slot 754*a*, 754*b* for facilitating attachment of the litter 422. Here, the litter 422 comprises pins 742*a*, 742*b* that is received by the slot 754*a*, 754*b*, which have a generally U-shaped upwardly-opening profile which tapers outwardly. The litter 422 comprises a pin 742*a*, 742*b* extending from each rear leg 602*a*, 602*b* (one pin shown in FIG. 13) adjacent to the proximal end of the rear legs 602*a*, 602*b*. In some embodiments, one or more of the carriers 734*a*, 734*b* may further comprise a releasable locking assembly configured to prevent the pins 742*a*, 742*b* from moving out of the slots 754*a*, 754*b* in certain operating conditions. To this end, the releasable locking assembly may comprise a litter-to-carrier lock actuator 758 (depicted schematically in FIG. 14) coupled to the controller 504 and to one or both of the carriers 734*a*, 734*b* to selectively inhibit the pins 742*a*, 742*b* of the litter 422 from moving out of the slots 754*a*, 754*b* of the carriers 734*a*, 734*b* of the base 424.

In the second embodiment of the patient support apparatus 420, movement of the carriers 734*a*, 734*b* of the litter mounting device 720 is carried out manually. More specifically, when loading the litter 422 onto the base 424, a user (e.g., the caregiver) physically moves the litter 422 longitudinally relative to the base 424 and, thus, moves the carriers 734*a*, 734*b* along the base rails 750*a*, 750*b* between the first and second ends 722, 724 of the intermediate frame 430 to facilitate securing the litter 422 to the base 424. However, it will be appreciated that the litter mounting device 720 could be configured differently, such as with carriers 734*a*, 734*b* that are moved by an actuator (not shown) similar to the mounting actuator 332 described above in connection with FIGS. 12A-12D. Other configurations are contemplated.

Figure 14:
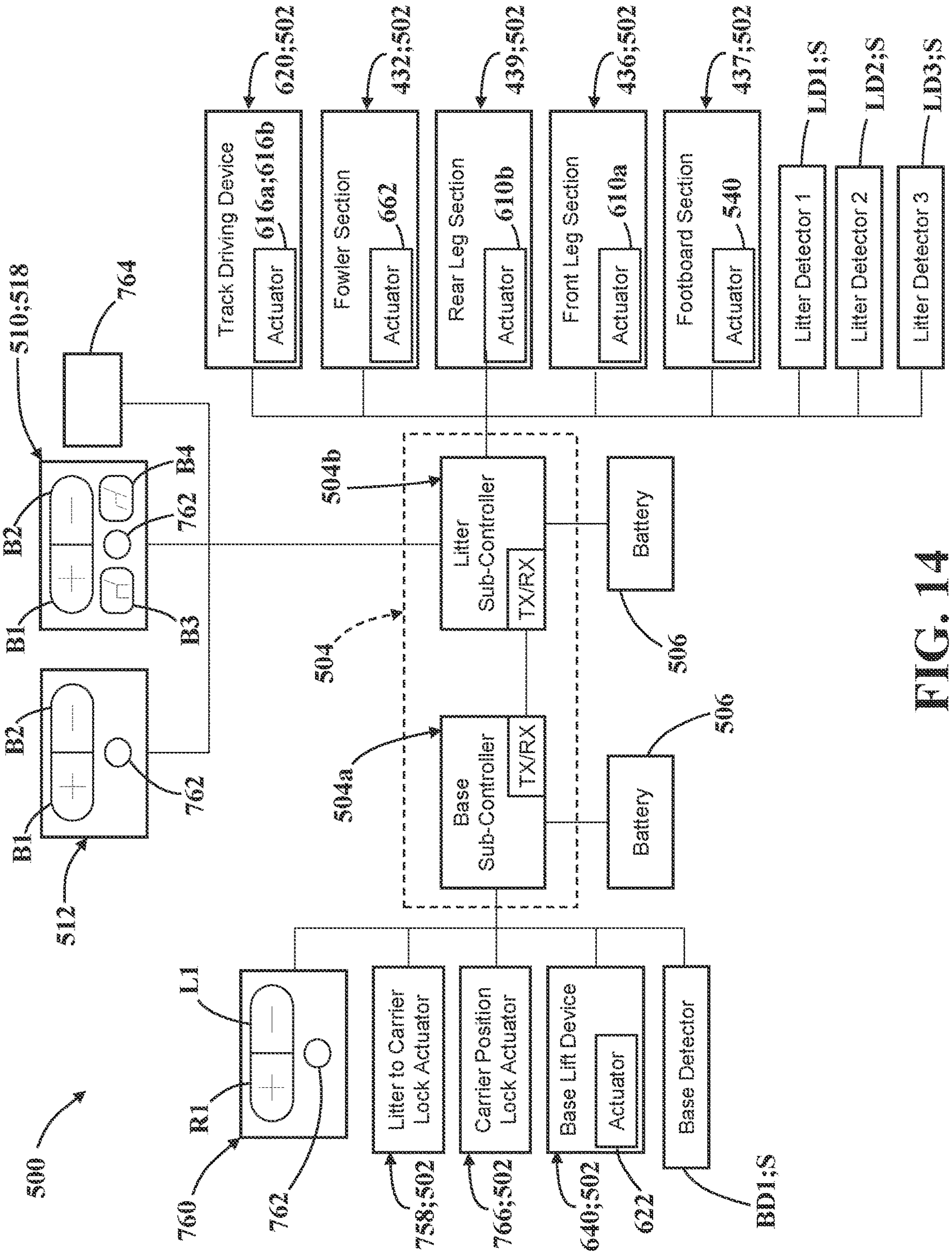
FIG. 14 is a schematic view of the patient support apparatus of FIG. 13.

As is depicted schematically in FIG. 14, the controller 504 of the second embodiment comprises a base subcontroller 504*a* coupled to the base 424 and a litter subcontroller 504*b* coupled to the litter 422. Here in this embodiment, the base subcontroller 504*a* is coupled to, disposed in communication with, and/or otherwise transmits and receives signals to and from the base lift device 640 and the litter-to-carrier lock actuator 758. The litter subcontroller 504*b* is coupled to, disposed in communication with, and/or otherwise transmits and receives signals to and from the track driving device 620, the fowler actuator 662, the litter lift actuators 610*a*, 610*b*, and the footboard actuator 540. The litter subcontroller 504*b* and the base subcontroller 504*a* may also transmit and receive signals between each other via wired and/or wireless communication.

The base lift device 640 of the second embodiment of the patient support apparatus 420 is similar to the base lift device 240 of the first embodiment. However, as is shown in FIG. 13 and depicted schematically in FIG. 14, the control system 500 of the second embodiment of the patient support apparatus 420 further comprises a base user interface 760 coupled to the base lift device 640 and to the controller 504 (e.g., to the base subcontroller 504*a*) for operating the base lift actuator 622. Here, the base user interface 760 comprises an extend (or, "raise") button R1 and a retract (or, "lower") button L1 each arranged for actuation by a user. Actuation of the extend button R1 generates a signal which is utilized by the controller 504 to operate the base lift actuator 622 such that the intermediate frame 430 is raised relative to the base frame 428. Conversely, actuation of the retract button L1 generates a signal which is utilized by the controller 504 to operate the base lift actuator 622 such that the intermediate frame 430 is lowered relative to the base frame 428. In FIG. 13, the base user interface 760 is coupled to the intermediate frame 430 of the base 424 adjacent to the head end, but may be coupled to a different portion of the base 424 in other embodiments. Furthermore, it will be appreciated that more than one base user interface 760 may be employed, either coupled to the base 424 or configured as remote user interfaces. Other configurations are contemplated.

Here too in the second embodiment of the patient support apparatus 420, the first and second user interfaces 510, 512 each comprise first and second buttons B1, B2 that may be actuated by a user to generate input signals communicated to the controller 504. With reference now to FIGS. 13-14, the first user interface 510, the second user interface 512, and/or the base user interface 760 may each further comprise an indicator 762 to communicate a presence or absence of certain conditions to the user. To this end, the indicator 762 may comprise a light, a display, and/or a device configured to generate sound, vibration, and the like. Other types of indicators are also contemplated. In some embodiments, the controller 504 may drive, actuate, or otherwise power the indicator 762 so as to communicate to the user that a certain configuration of the litter 422 has been reached and actuation of buttons (e.g., the first and second buttons B1, B2 of the first and/or second user interfaces 510, 512; or the extend and retract buttons R1, L1 of the base user interface 760) will not result in further operation of one or more actuators. In other embodiments, the indicator 762 may be configured to communicate to the user that additional actuation or manipulation of the litter 422 is restricted and/or permitted (e.g., based on the current state of the litter 422). Other configurations are contemplated.

In the second embodiment of the patient support apparatus 420, the first user interface 510 also comprises a state input device 518 comprising a chair button B3 and a stair button B4. Here, actuation of the chair and stair buttons B3, B4 by the user generates state signals received by the controller 504 which are employed to facilitate changing the functionality of aspects of the first and/or second user interfaces 510, 512 (and/or the functionality of one or more actuators) associated with actuation of the first and second buttons B1, B2. More specifically, and as is described in greater detail below, the chair and stair buttons B3, B4 permit the user to selectively switch the functionality of the first and second buttons B1, B2 so as to operate the litter 422 between the substantially flat configuration 700 (see FIG. 15A), the chair configuration 702 (see FIG. 15B), and the stair configuration 703 (see FIG. 15C).

Referring now to FIGS. 15A-15C, the litter 422 is shown depicted in the configurations 700, 702, 703 as noted above. In FIG. 15A, while the litter 422 is depicted as being arranged in the substantially flat configuration 700, the litter 422 is also disposed in the "chair operating" state such that actuation of the first button B1 generates an input signal received by the controller 504 which, in turn, operates the litter lift actuators 610*a*, 610*b* and the fowler actuator 662 to move the litter 422 toward the chair configuration 702 depicted in FIG. 15B (compare FIGS. 14A-15B). More specifically, in the "chair operating" state, actuation of the first button B1 results in movement of the distal ends of the front leg 536 and the rear legs 602*a*, 602*b* toward each other until the front leg 536 and the rear legs 602*a*, 602*b* are arranged generally perpendicular to the seat frame 534, and also results in movement of the fowler frame 532 relative to the seat frame 534 until the fowler section 432 of the litter 422 is in the raised position 433 (compare FIGS. 15A-15B).

Once the litter 422 has moved from the substantially flat configuration 700 to the chair configuration 702 shown in FIG. 15B, continued actuation of the first button B1 may not result in further operation of any actuators. On the other hand, while in the "chair operating" state, when the litter 422 is either in the chair configuration 702 or in a configuration between the chair configuration 702 and the substantially flat configuration 700, actuation of the second button B2 generates another input signal received by the controller 504 which, in turn, operates the litter lift actuators 610*a*, 610*b* and the fowler actuator 662 in an opposite manner to bring the litter 422 to the substantially flat configuration 700 (see FIG. 15A).

In FIG. 15B, the litter 422 is depicted as being arranged in the chair configuration 702. Here, the user may actuate the stair button B4 to generate a signal received by the controller 504 which, in turn, operates the litter lift actuators 610*a*, 610*b* to move the front leg 536 and the rear legs 602*a*, 602*b* such that the litter 422 moves to the stair configuration 703 (see FIG. 15C). When the litter 422 is in the stair configuration 703 as depicted in FIG. 15C, the litter 422 is considered to be in the "stair operating" state. Here, actuation of the first button B1 generates the input signal to the controller 504 and the controller 504 operates the track actuators 616*a*, 616*b* to operate the continuous tracks 604*a*, 604*b* in a first direction configured to drive the litter 422 up a set of stairs. While in the "stair operating" state, actuation of the second button B2 generates the input signal to the controller 504 and the controller 504 operates the track actuators 616*a*, 616*b* to operate the continuous tracks 604*a*, 604*b* in a second direction opposite the first direction that is configured to drive the litter 422 down a set of stairs.

In this second embodiment of the patient support apparatus 420, the control system 500 may comprise a user detection sensor 764 (e.g., a capacitive touch sensor or another suitable type of sensor) coupled to the first user interface 510 and to the controller 504 (see FIGS. 13-14). Here, the user detection sensor 764 is employed to generate a signal in response to sensing one of the user's hands adjacent the first user interface 510 (e.g., in contact with the user detection sensor 764). In some embodiments, the controller 504 may prevent the litter lift actuators 610*a*, 610*b* from moving the litter 422 from the chair configuration 702 (see FIG. 15B) to the stair configuration 703 (see FIG. 15C) unless the controller 504 receives the signal from the user detection sensor 764 indicating that the user's hand is adjacent to the first user interface 510. The controller 504 may also operate the track actuators 616*a*, 616*b* of the track driving device 620 so as to inhibit movement of the continuous tracks 604*a*, 604*b* when the user's hand is not detected adjacent to the first user interface 510 in order to prevent the litter 422 from ascending and/or descending stairs via the continuous track 604*a*, 604*b*. In some embodiments, the user detection sensor 764 may be coupled to the handle 526 adjacent the first user interface 510. It is contemplated that sensors other than a capacitive sensor may be used to generate a signal responsive to proximity of a user's hand adjacent the first user interface 510.

When the litter 422 is in the stair configuration 703, the user may actuate the chair button B3 to generate a signal to the controller 504 and the controller 504 operates the litter lift actuators 610*a*, 610*b* to return the litter 422 to the chair configuration 702 and the litter 422 returns to the "chair operating" state. Here in this embodiment of the patient support apparatus 420, the litter 422 must be in the chair configuration 702 before the controller 504 will operate the litter lift actuators 610*a*, 610*b* to move the litter 422 to the stair configuration 703 in response to actuation of the stair button B4. In other embodiments, actuation of the stair button B4 may result in operation of the litter lift actuators 610*a*, 610*b* to move the litter 422 from the substantially flat configuration 700, to the chair configuration 702, and then to the stair configuration 703.

now to FIGS. 12A-12D, as noted above, the litter 22 is configured for removable attachment to the base 24 of the patient support apparatus in the illustrated embodiments. During the process of attaching the litter 22 to the base 24 (and/or removing the litter 22 from the base 24), the functionality of the user interfaces 110, 112 likewise changes based on current states of the litter 22

Referring now to FIGS. 16A-17H, here too in the second embodiment of the patient support apparatus 420, the litter 422 is configured for removable attachment to the base 424, and during the process of attaching the litter 422 to the base 424 (and/or removing the litter 422 from the base 424), the functionality of the user interfaces 510, 512 likewise changes based on current states of the litter 422. Here, FIG. 16A-16H show configurations of the litter 422 as the position of the litter 422 relative to the base 424 changes, and FIGS. 17A-17H schematically depict detector and emitter positions associated with the litter 422 and the base 424 of the patient support apparatus 420. In this exemplary embodiment, the detectors and emitters depicted in FIGS. 17A-17H comprise sensors S disposed in communication with the controller 504 (e.g., hall effect sensors and magnets). The detectors are shown using squares, and the emitters are shown using circles; when an emitter is sensed by a detector, the emitter is depicted with a solid line to indicate that the detector is generating a signal received by the controller 504. When an emitter is not sensed by a detector, the emitter is depicted with dashed lines.

As noted above, FIGS. 17A-17H schematically depict relative detector and emitter positions which correspond directly to the configurations of the litter 422 shown in FIGS. 16A-16H. More specifically, FIG. 16A corresponds to FIG. 17A, FIG. 16B corresponds to FIG. 17B, and so on. It is contemplated that other detectors, emitters, and/or sensors S may be used to generate signals received by the controller 504 in response to changes in the position, configuration, and/or orientation of the litter 422 relative to the base 424, such as is depicted throughout FIGS. 16A-16H. It is also contemplated that the detectors, emitters, and/or sensors S may be arranged in locations, positions, and the like which are different from those described below and illustrated in FIGS. 17A-17H. Put differently, the arrangement and/or types of sensors S utilized by the patient support apparatus 420 could be different than is described herein in connection with FIGS. 16A-17H.

Figure 16A:
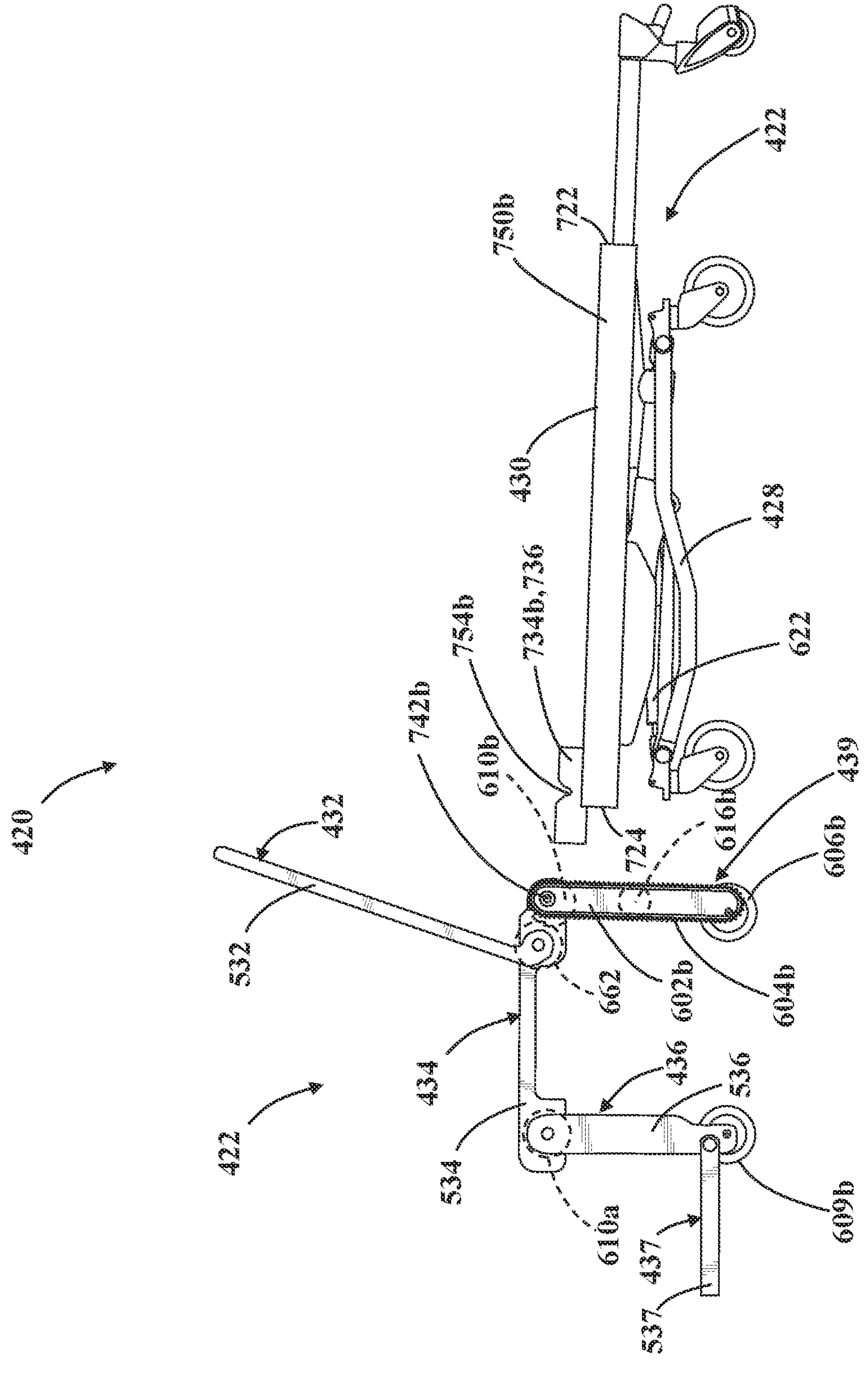
FIG. 16A is a side view of the patient support apparatus of FIG. 13, shown with the litter in a first position relative to the base.
Figure 17A:
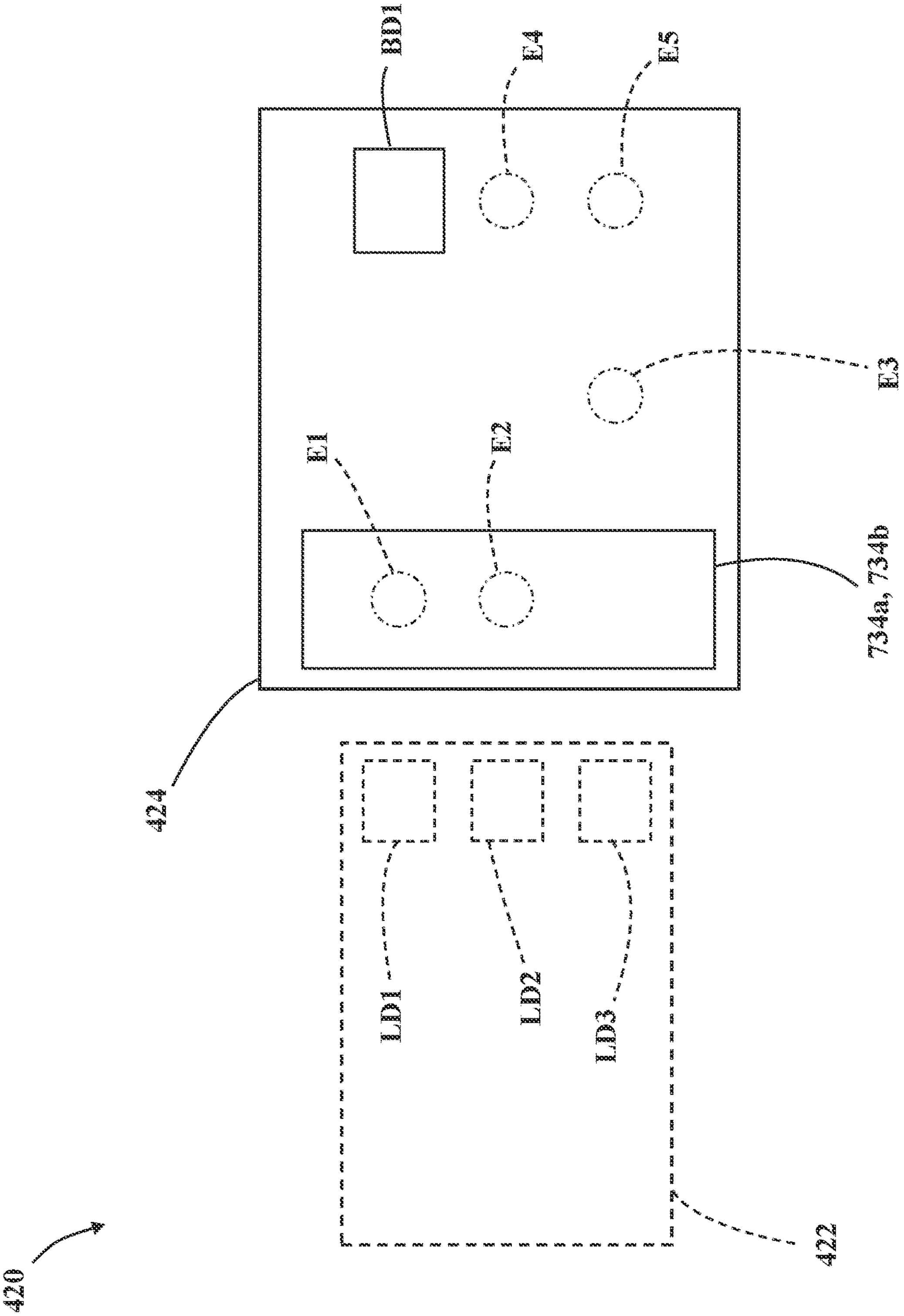
FIG. 17A is a schematic representation of the patient support apparatus of FIG. 13, shown with the litter in the first position relative to the base as depicted in FIG. 16A.

Referring now to FIGS. 17A-17H, in this embodiment the litter 422 comprises a first litter detector LD1 configured to generate a signal in response to sensing a first emitter E1 coupled to one of the carriers 734*a*, 734*b* to allow the controller 504 to determine when the pins 742*a*, 742*b* of the litter 422 are adjacent to the slots 754*a*, 754*b* of the carriers 734*a*, 734*b*. The litter 422 further comprises a second litter detector LD2 configured to generate a signal in response to sensing a second emitter E2 coupled to the intermediate frame 430 adjacent to the second end 724 to allow the controller 504 to determine when the pins 742*a*, 742*b* are received in the slots 754*a*, 754*b* at the second end 724 of the intermediate frame 430. The litter 422 further comprises a third litter detector LD3 configured to generate a signal in response to sensing a third emitter E3 coupled to the intermediate frame 430 between the first and second ends 722, 724 to allow the controller 504 to determine when the litter 422 is arranged relative to the base 424 with sufficient support necessary to subsequently permit pivoting or otherwise articulating the front leg 536 relative to the seat frame 534 such that the weight of the litter 422 becomes fully supported by the base 424, as described in greater detail below. The second and third litter detectors LD2, LD3 are also configured to generate signals responsive to fourth and fifth emitters E4, E5 coupled to the intermediate frame 430 adjacent to the first end 722 to allow the controller 504 to determine when the pins 742*a*, 742*b* are adjacent to the first end 722 of the intermediate frame 430. The base 424 in this embodiment comprises a base detector BD1 coupled to the first end 722 of the intermediate frame 430 configured to generate a signal in response to sensing the first emitter E1 coupled to one of the carriers 734*a*, 734*b* to allow the controller 504 determine when the carriers 734*a*, 734*b* are adjacent to the first end 722 of the intermediate frame 430. As noted above, the configuration and arrangement of the emitters E1, E2, E3, E4, E5 and the detectors LD1, LD2, LD3, BD1 introduced above and depicted in FIGS. 17A-17H is exemplary, and other configurations and arrangements are contemplated by the present disclosure FIGS. 16A and 17A depict the litter 422 as being spaced from the base 424, with the litter 422 arranged in the chair configuration 702. Here, because the litter 422 has been removed from the base 424, actuation of the first and second user interfaces 510, 512 results in the controller 504 operating the litter lift actuators 610*a*, 610*b* and the fowler actuator 662 in the manner described above in connection with FIGS. 15A-15C.

Figure 16B:
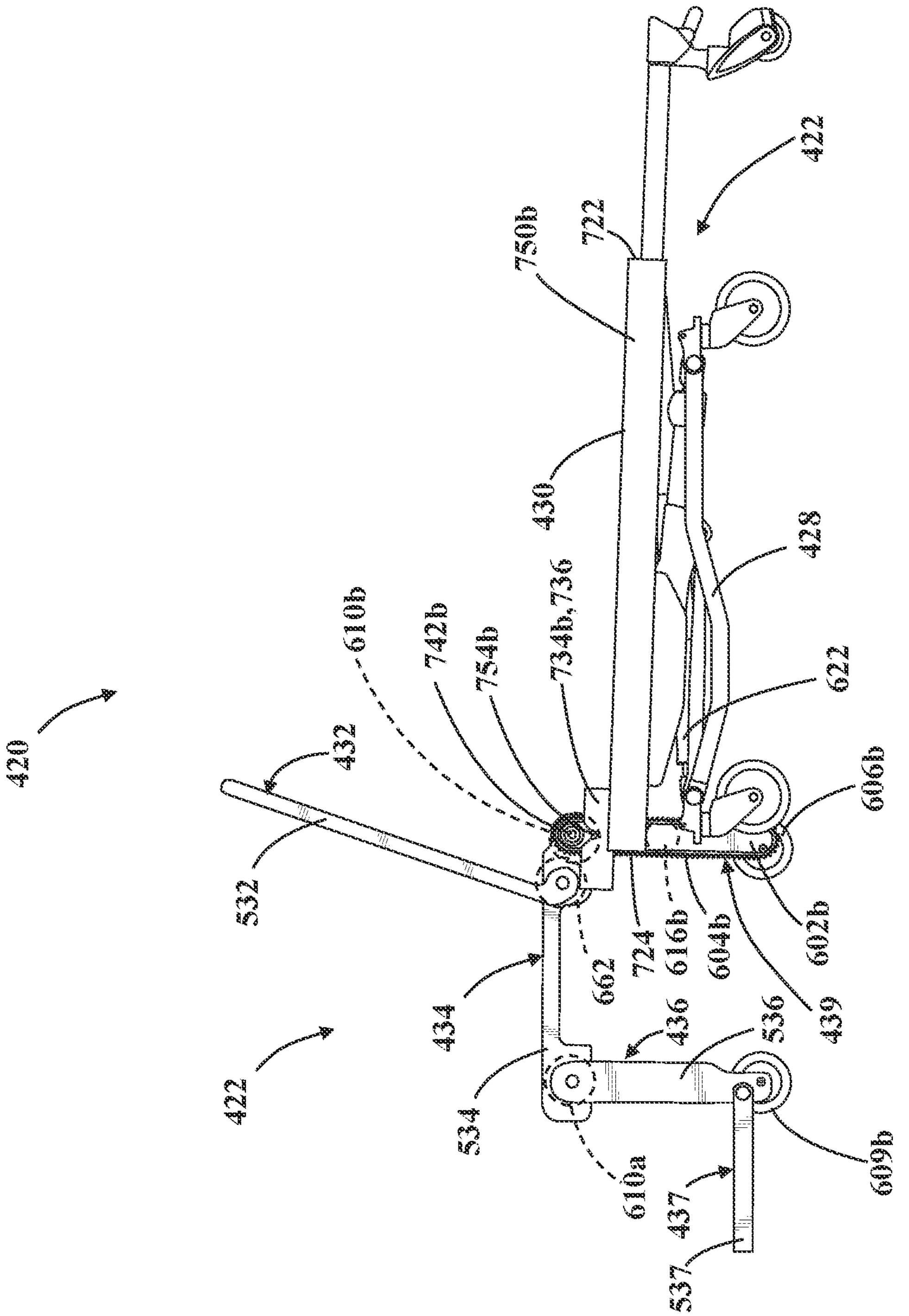
FIG. 16B is a side view of the patient support apparatus of FIG. 16A, shown with the litter in a second position relative to the base.
Figure 16C:
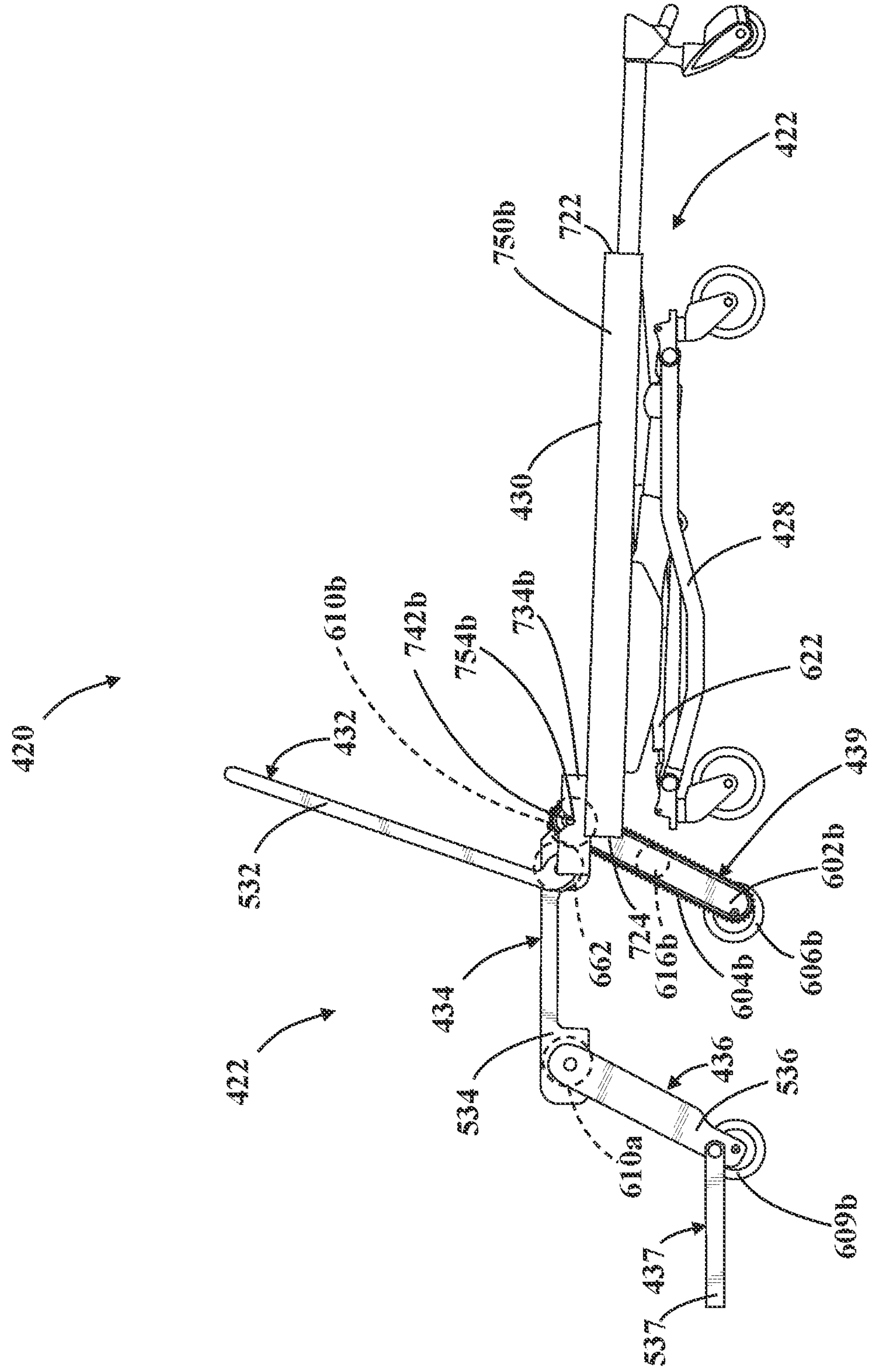
FIG. 16C is a side view of the patient support apparatus of FIGS. 16A-16B, shown with the litter in a third position relative to the base.
Figure 17B:
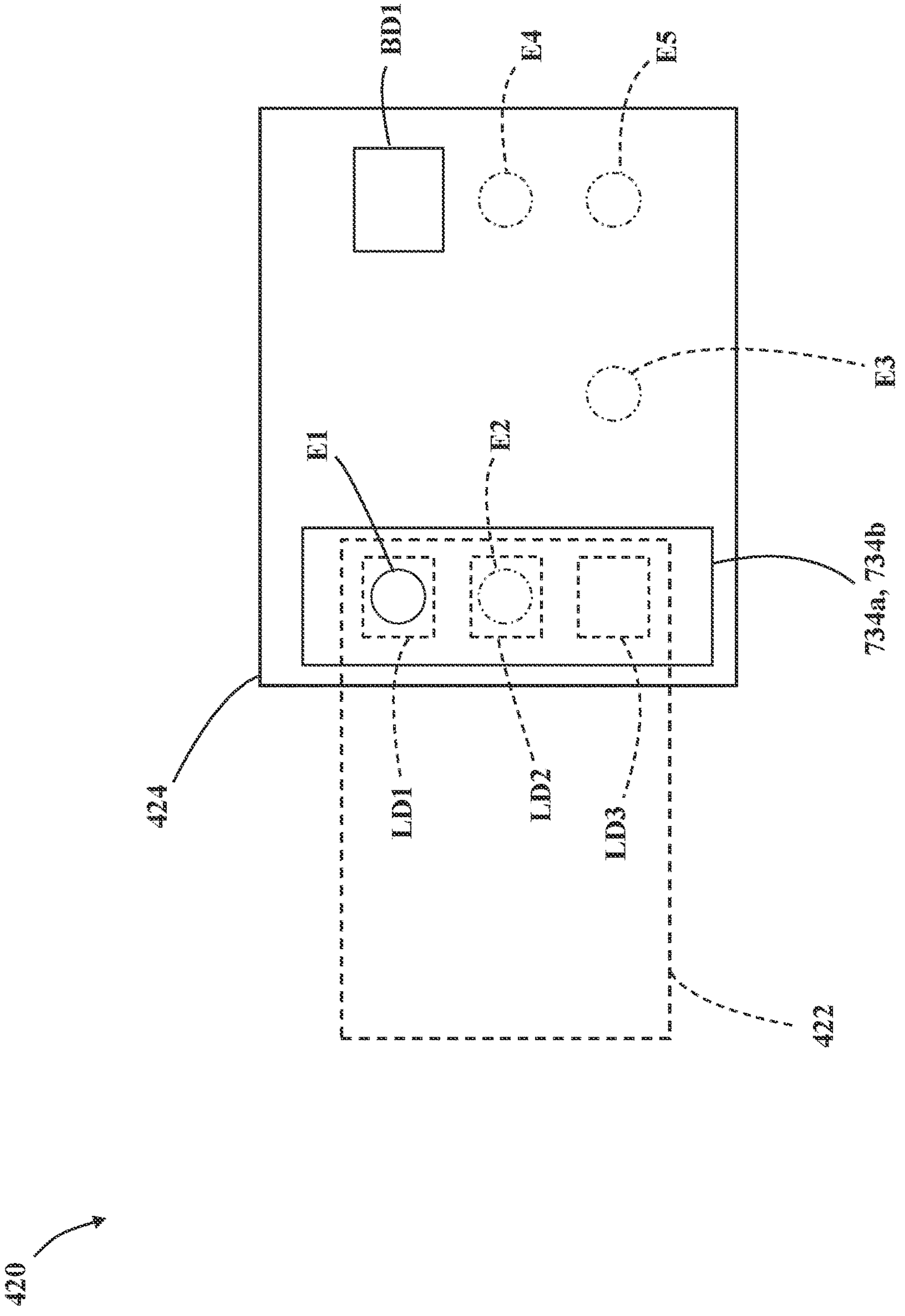
FIG. 17B is a schematic representation of the patient support apparatus of FIG. 13, shown with the litter in the second position relative to the base as depicted in FIG. 16B.
Figure 17C:
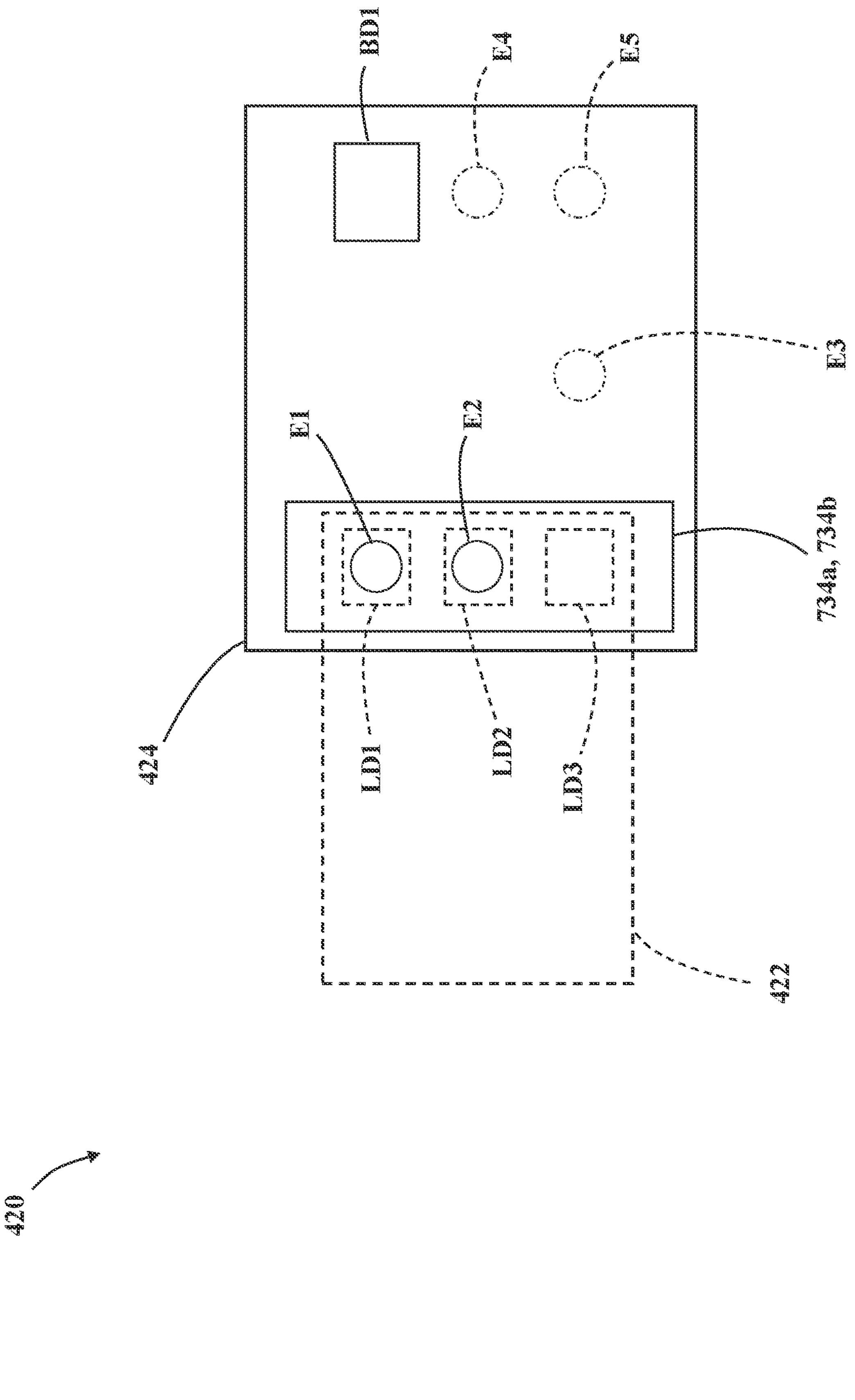
FIG. 17C is a schematic representation of the patient support apparatus of FIG. 13, shown with the litter in the third position relative to the base as depicted in FIG. 16C.

FIGS. 16B and 17B depict the litter 422 being spaced closer to the base 424 (compare with FIGS. 16A and 17A), with the pins 742*a*, 742*b* of the litter 422 positioned above the carriers 734a, 734b such that the pins 742a, 742b are generally aligned with the slots 754a, 754b of the carriers 734a, 734b. In this arrangement, the first litter detector LD1 generates a signal in response to sensing the first emitter E1 coupled to one of the carriers 734a, 734b in order to allow the controller 504 to detect that the pins 742a, 742b of the litter 422 are adjacent to the slots 754a, 754b of the carriers 734a, 734b. Here, when the user actuates the second button B2, the controller 504 is configured to operate the litter lift actuators 610a, 610b to move out of the chair configuration 702 and lower the pins 742a, 742b into the slots 754a, 754b. More specifically, the controller 504 drives the litter lift actuators 610a, 610b so as to move the rear legs 602a, 602b toward the front leg 536, and to move the front leg 536 away from the rear legs 602a, 602b, to a configuration with is similar to the stair configuration 703 described above in connection with FIG. 15C. Here, with continued actuation of the second button B2, the controller 504 continues to operate both litter lift actuators 610a, 610b until the second litter detector LD2 generates a signal in response to sensing the second emitter E2 coupled adjacent to the second end 724 of the intermediate frame 430, which allows the controller 504 to confirm that the pins 742a, 742b have been received in the slot 754a, 754b of the carriers 734a, 734b (see FIG. 16C). Continued actuation of the second button B2 results in subsequent movement of the litter 422 to effect securing to the base 424, as described below. However, when the litter 422 is arranged in the configuration depicted in FIGS. 16C and 17C, if user actuates the first button B1, the controller 504 is configured to operate the litter lift actuators 610a, 610b to move the front leg 536 and the rear legs 602a, 602b toward the chair configuration 702 and thus raise the pins 742a, 742b out of the slots 754a, 754b of the carriers 734a, 734b (see FIGS. 16B and 17B).

Figure 16D:
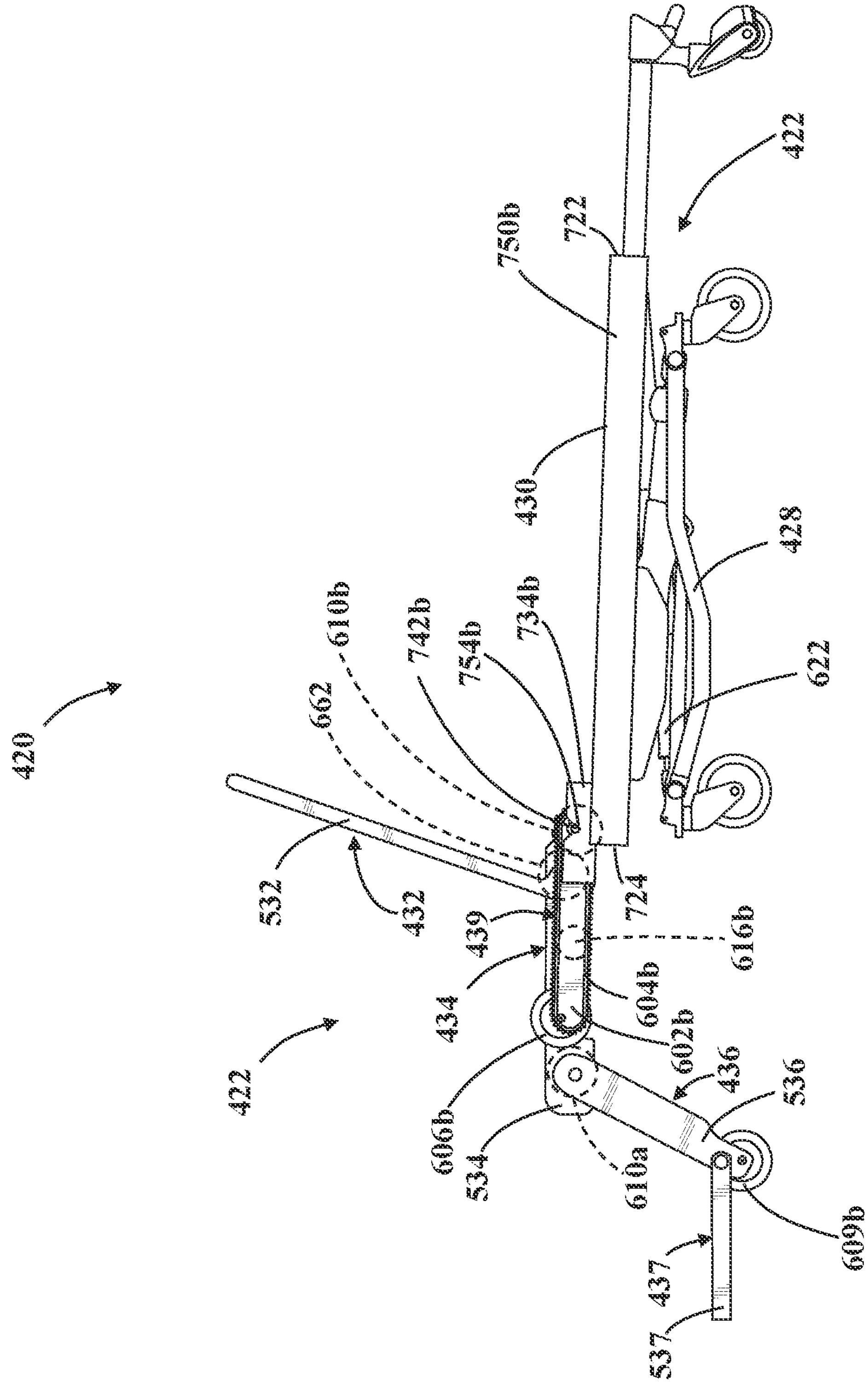
FIG. 16D is a side view of the patient support apparatus of FIGS. 16A-16C, shown with the litter in a fourth position relative to the base.
Figure 17D:
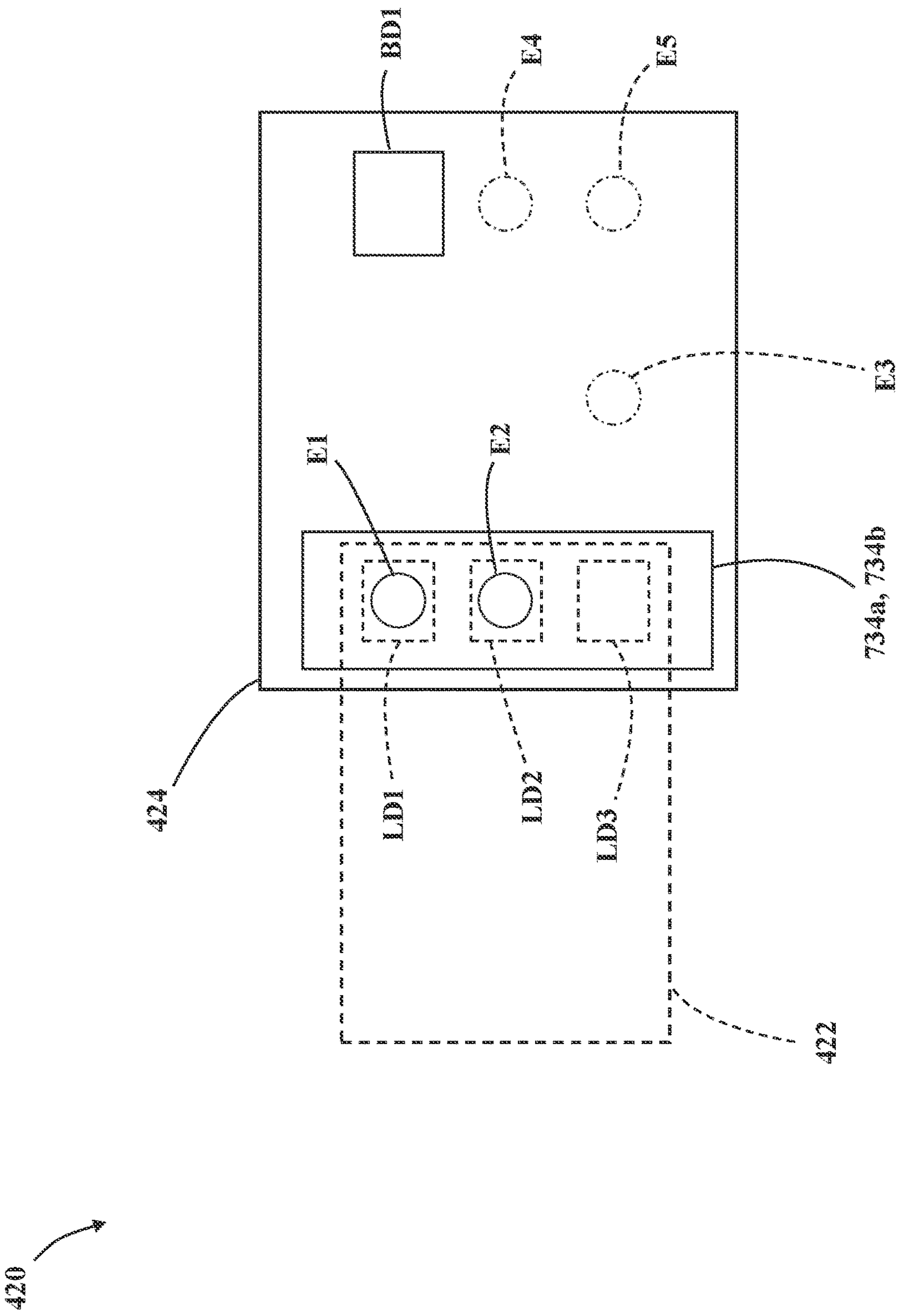
FIG. 17D is a schematic representation of the patient support apparatus of FIG. 13, shown with the litter in the fourth position relative to the base as depicted in FIG. 16D.

Continuing now to FIGS. 16D and 17D, when the user continues to actuate the second button B2, the controller 504 is configured to operate only the second litter lift actuator 610b so as to pivot or otherwise articulate the rear legs 602a, 602b up so as to be arranged generally parallel with the seat frame 534 (see FIG. 16D; compare to FIG. 16C). This arrangement provides clearance in that the rear legs 602a, 602b do not become an obstruction for continued loading of the litter 422 onto the base 424. Here, because the litter 422 is not yet fully supported by the base 424 when arranged as depicted in FIG. 16D (and also in FIG. 16C), the controller 504 advantageously keeps the front leg 536 in contact with the floor surface.

When the litter 422 is arranged as depicted in FIG. 16D after the rear legs 602a, 602b have been moved so as to be generally parallel to the seat frame 534, the user may continue to load the litter 422 onto the base 424 as described below. However, at this point the user could alternatively actuate the first button B1, which results in the controller 504 operating the second litter lift actuator 610b to pivot or otherwise articulate the rear legs 602a, 602b back toward the floor surface. If, however, the user is loading the litter 422 onto the base 424, continued actuation of the second button B2 does not result in the controller 504 operating any actuators at this point. Because movement of the carriers 734a, 734b of the litter mounting device 720 is carried out manually, as noted above, the user will need to advance the litter 422 longitudinally relative to the base 424 to continue with loading the litter 422 onto the base 424. Here, in some embodiments, in addition to ceasing operation of actuators, the controller 504 may also be configured to activate the indicator 762 to prompt user to advance the litter 422. Other configurations are contemplated.

Figure 16E:
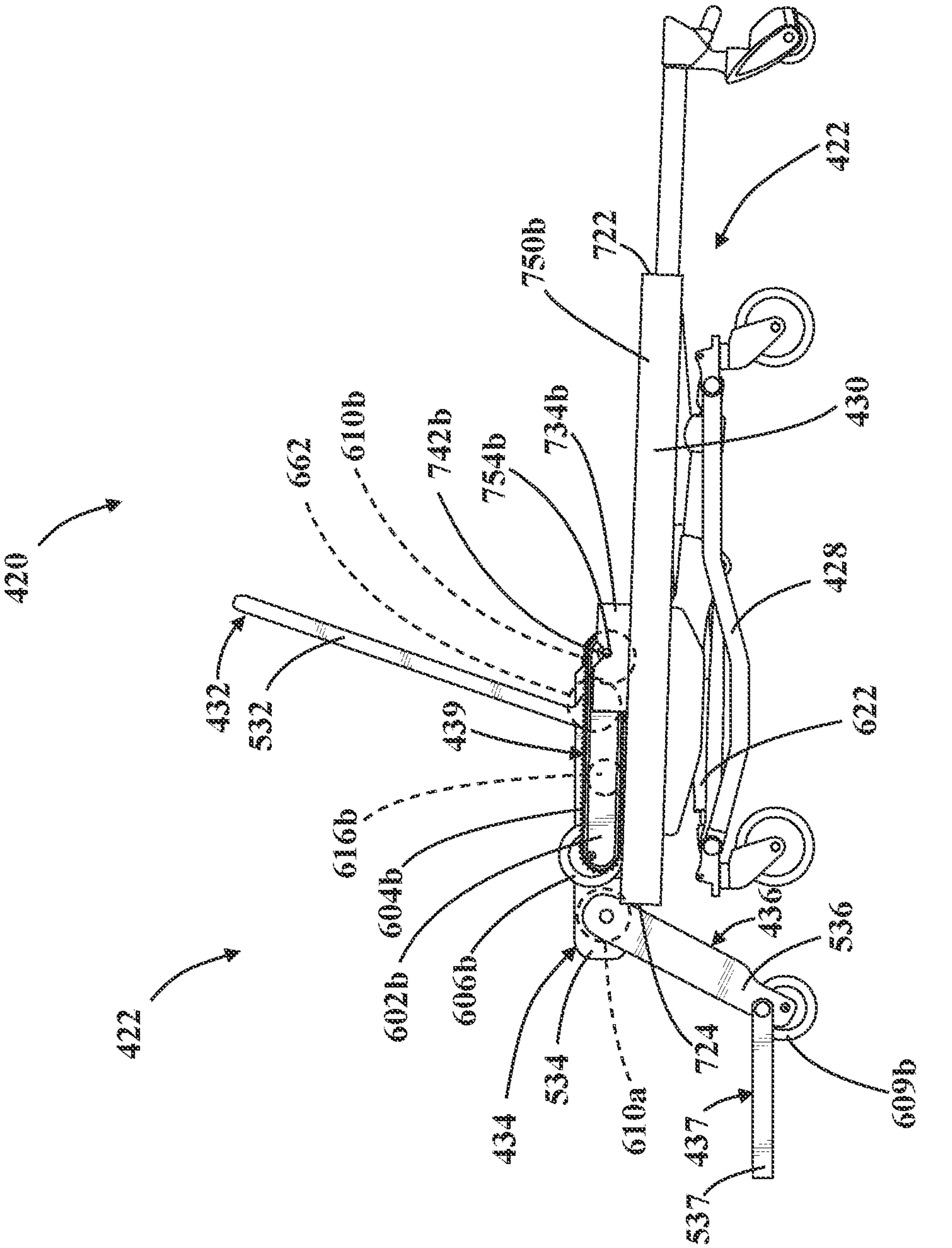
FIG. 16E is a side view of the patient support apparatus of FIGS. 16A-16D, shown with the litter in a fifth position relative to the base.
Figure 16F:
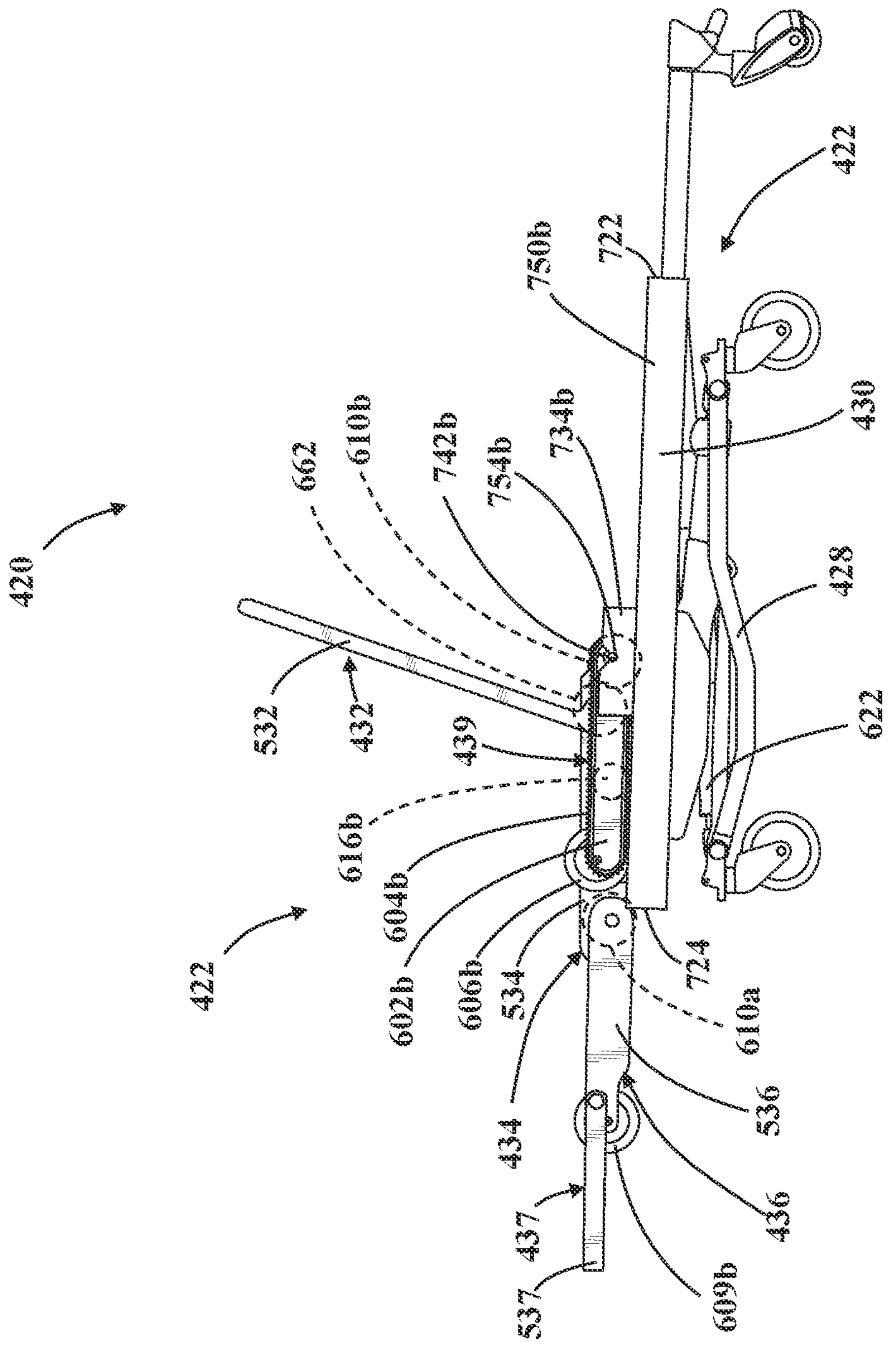
FIG. 16F is a side view of the patient support apparatus of FIGS. 16A-16E, shown with the litter in a sixth position relative to the base.
Figure 17E:
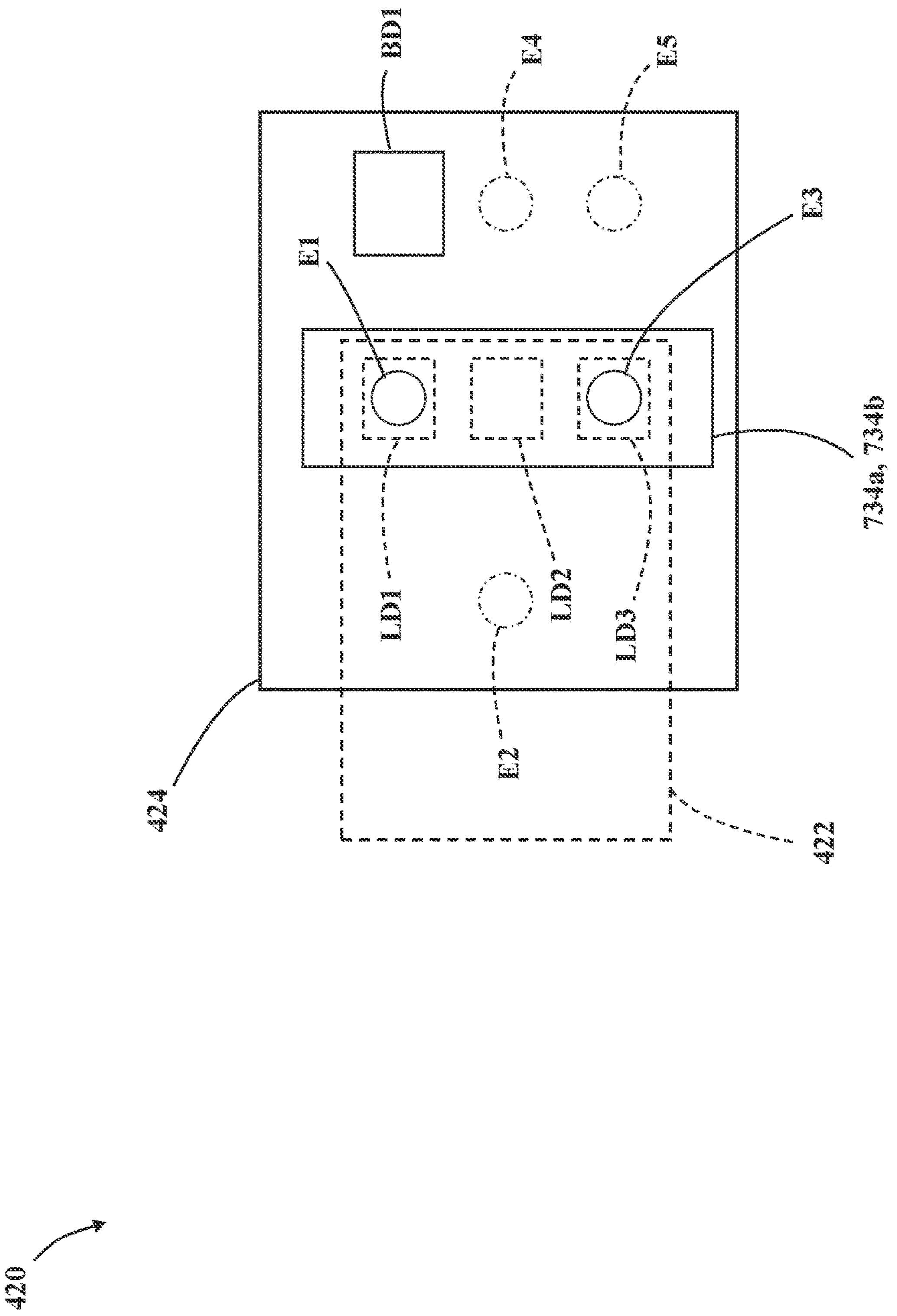
FIG. 17E is a schematic representation of the patient support apparatus of FIG. 13, shown with the litter in the fifth position relative to the base as depicted in FIG. 16E.
Figure 17F:
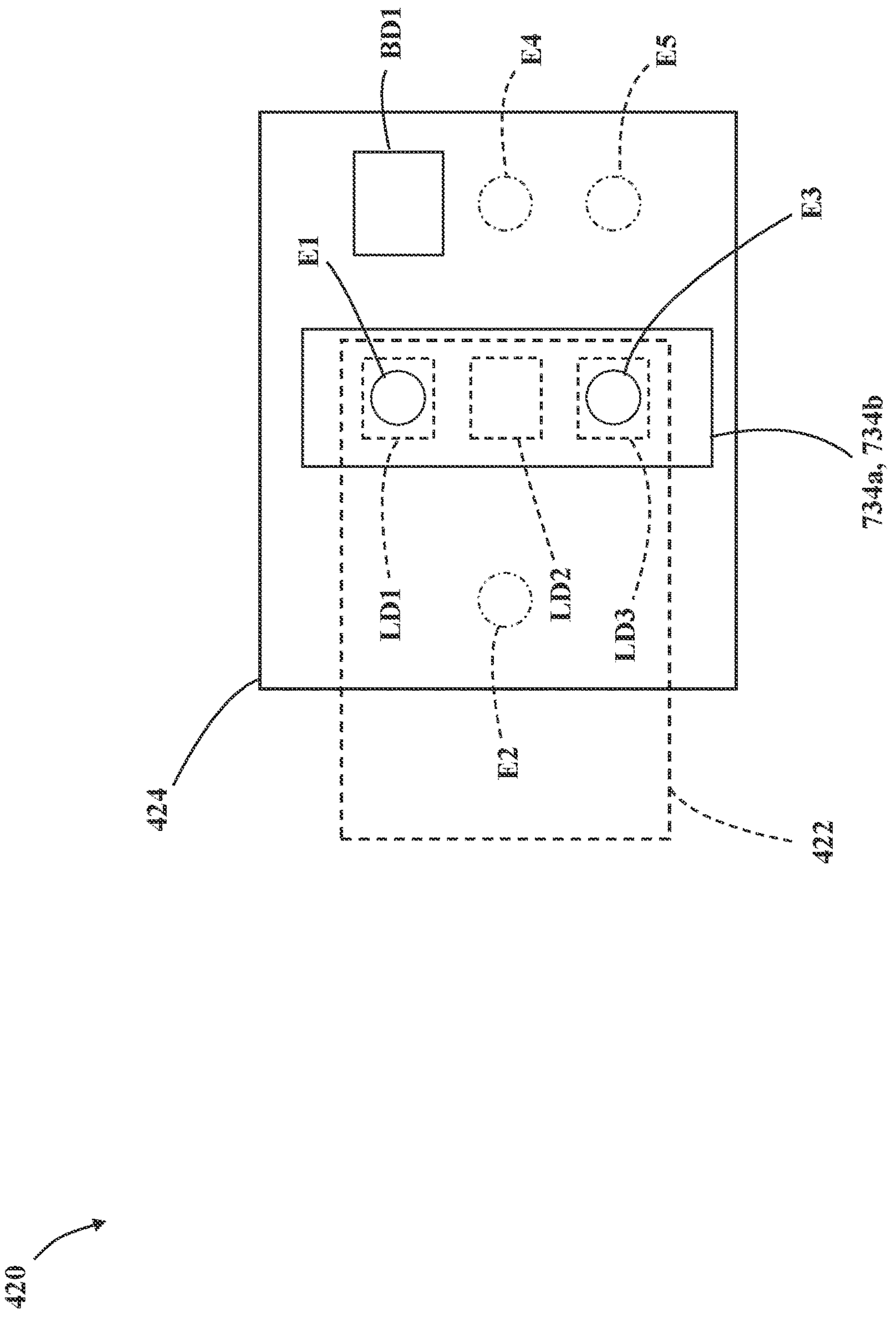
FIG. 17F is a schematic representation of the patient support apparatus of FIG. 13, shown with the litter in the sixth position relative to the base as depicted in FIG. 16F.

In the arrangement depicted in FIGS. 16E and 17E, the user has advanced (e.g., by pushing) the litter 422 (and, thus, the carriers 734a, 734b) along the base rails 750a, 750b and toward the first end 722 of the intermediate frame 430. Here, the third litter detector LD3 generates a signal in response to sensing the third emitter E3 coupled to the intermediate frame 430 between the first and second ends 722, 724. This signal allows the controller 504 to determine that the litter 422 is sufficiently supported by the base 424 to continue loading the litter 422. At this point, and continuing to the arrangement depicted in FIGS. 16F and 17F, when the user actuates (or continues to actuate) the second button B2, the controller 504 is configured to operate only the first litter lift actuator 610a to pivot or otherwise articulate the front leg 536 so as to be generally parallel with the seat frame 534 (see FIG. 16F). This arrangement similarly provides clearance in that the front leg 536 does not become an obstruction for continued loading of the litter 422 onto the base 424.

When the litter 422 is arranged as depicted in FIG. 16F after the front leg 536 has been moved so as to be generally parallel to the seat frame 534, the user may continue to load the litter 422 onto the base 424 as described below. However, at this point the user could alternatively actuate the first button B1, which results in the controller 504 operating the first litter lift actuator 610a to pivot or otherwise articulate the front leg 536 back toward the floor surface. If, however, the user is loading the litter 422 onto the base 424, continued actuation of the second button B2 does not result in the controller 504 operating any actuators at this point. Again, because movement of the carriers 734a, 734b of the litter mounting device 720 is carried out manually, as noted above, the user will need to advance the litter 422 longitudinally relative to the base 424 to continue with loading the litter 422 onto the base 424. Here, in some embodiments, in addition to ceasing operation of actuators, the controller 504 may also be configured to activate the indicator 762 to prompt user to advance the litter 422. Other configurations are contemplated.

Referring to FIGS. 16G-17H, the controller 504 detects the carrier 734a, 734b is adjacent the first end 722 of the intermediate frame 430. The controller 504 is configured to operate only the fowler actuator 662 when the user continues to actuate the second button B2. The controller 504 is configured to operate the fowler actuator 662 to pivot or otherwise articulate the fowler frame 532 relative to the seat frame 534 until the fowler frame 532 is generally parallel with the seat frame 534, shown in FIG. 16H.

Figure 16G:
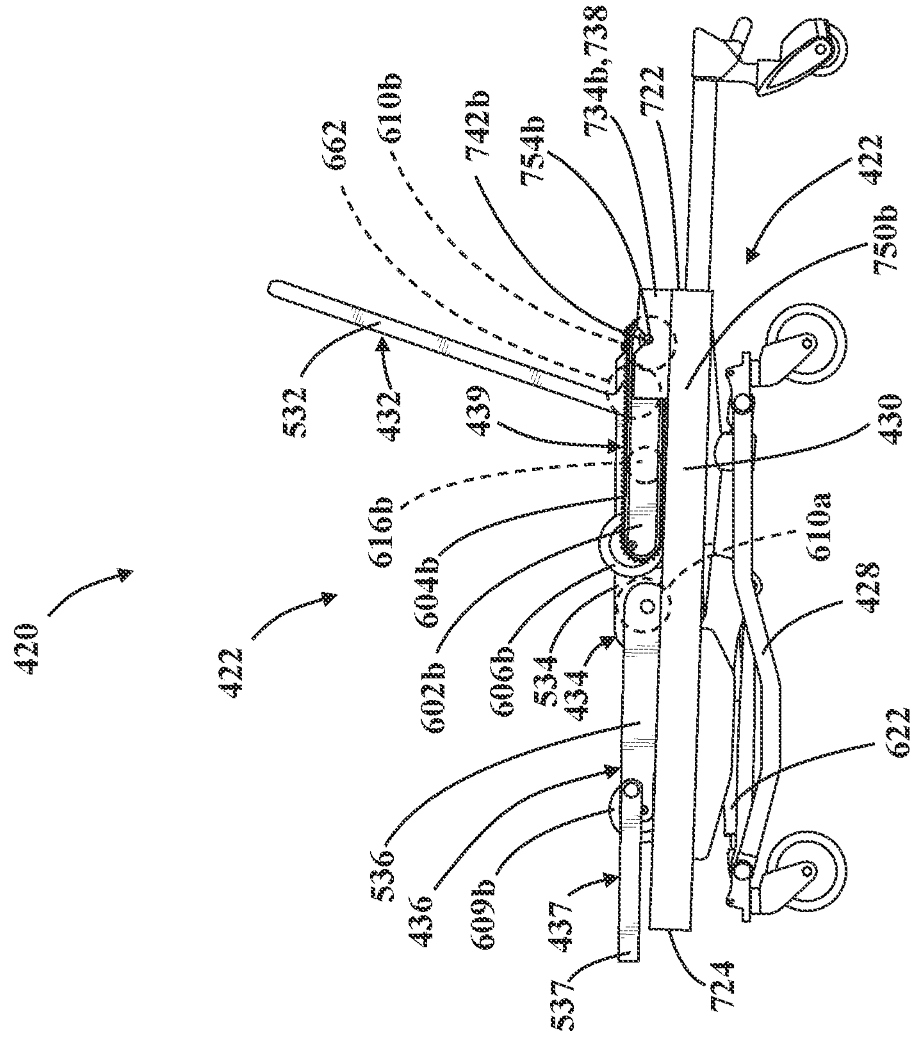
FIG. 16G is a side view of the patient support apparatus of FIGS. 16A-16F, shown with the litter in a seventh position relative to the base.
Figure 16H:
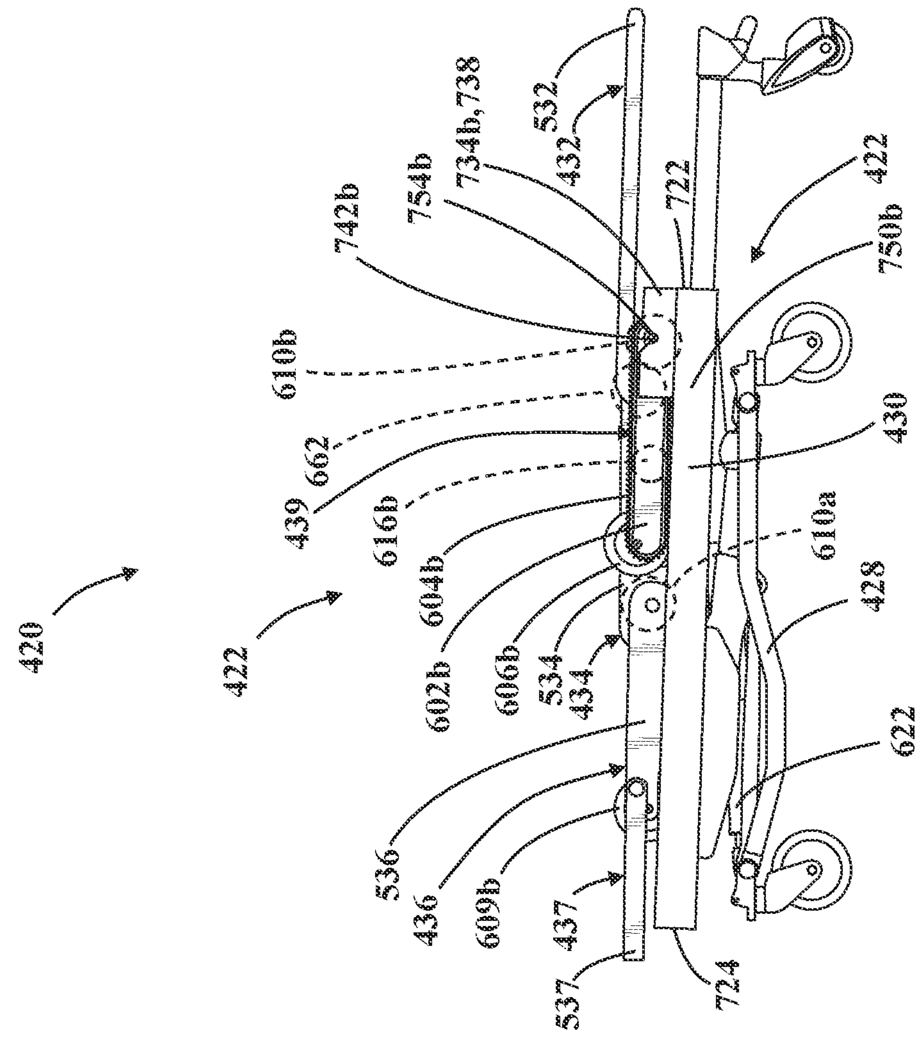
FIG. 16H is a side view of the patient support apparatus of FIGS. 16A-16G, shown with the litter in an eighth position relative to the base.
Figure 17G:
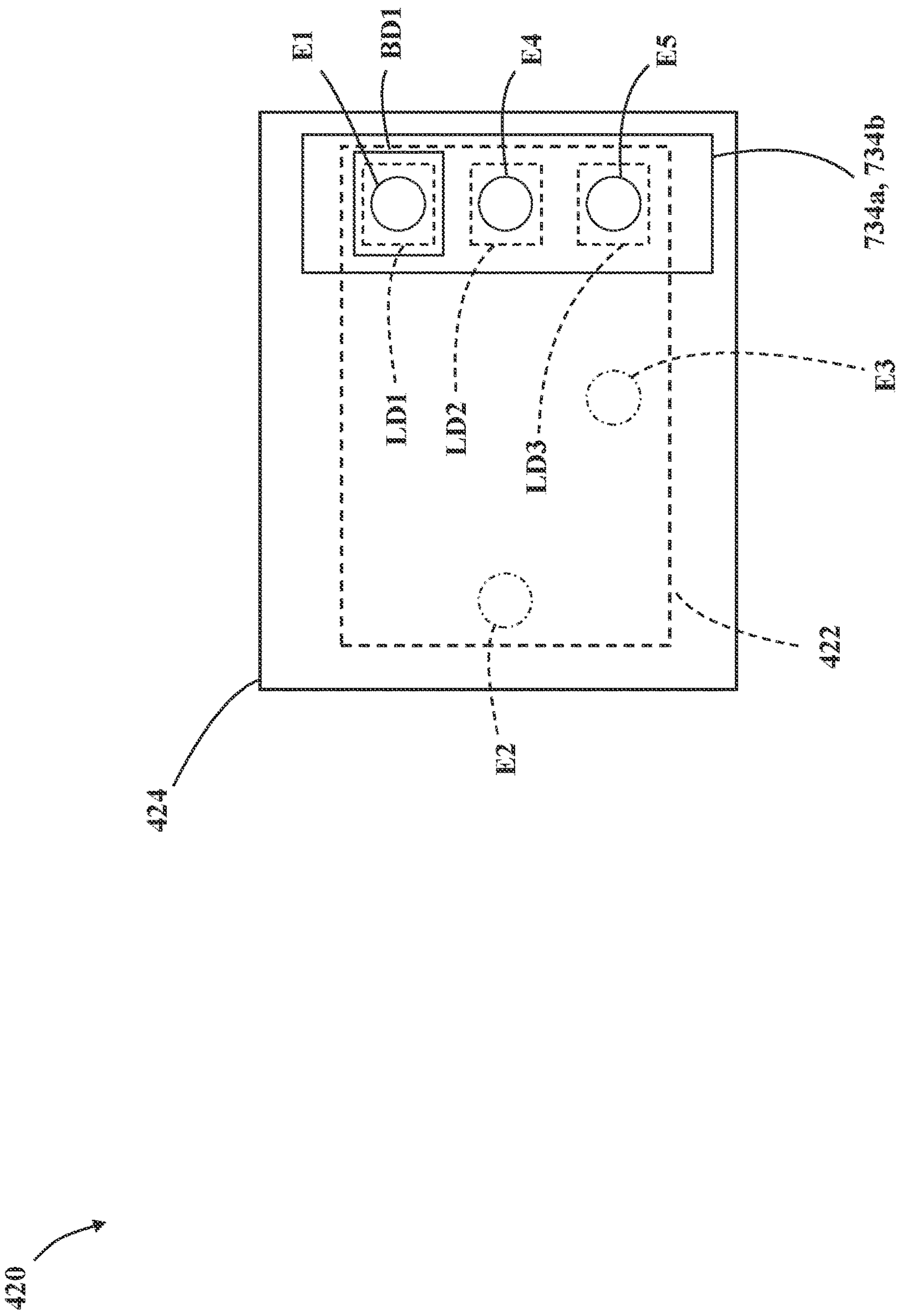
FIG. 17G is a schematic representation of the patient support apparatus of FIG. 13, shown with the litter in the seventh position relative to the base as depicted in FIG. 16G.
Figure 17H:
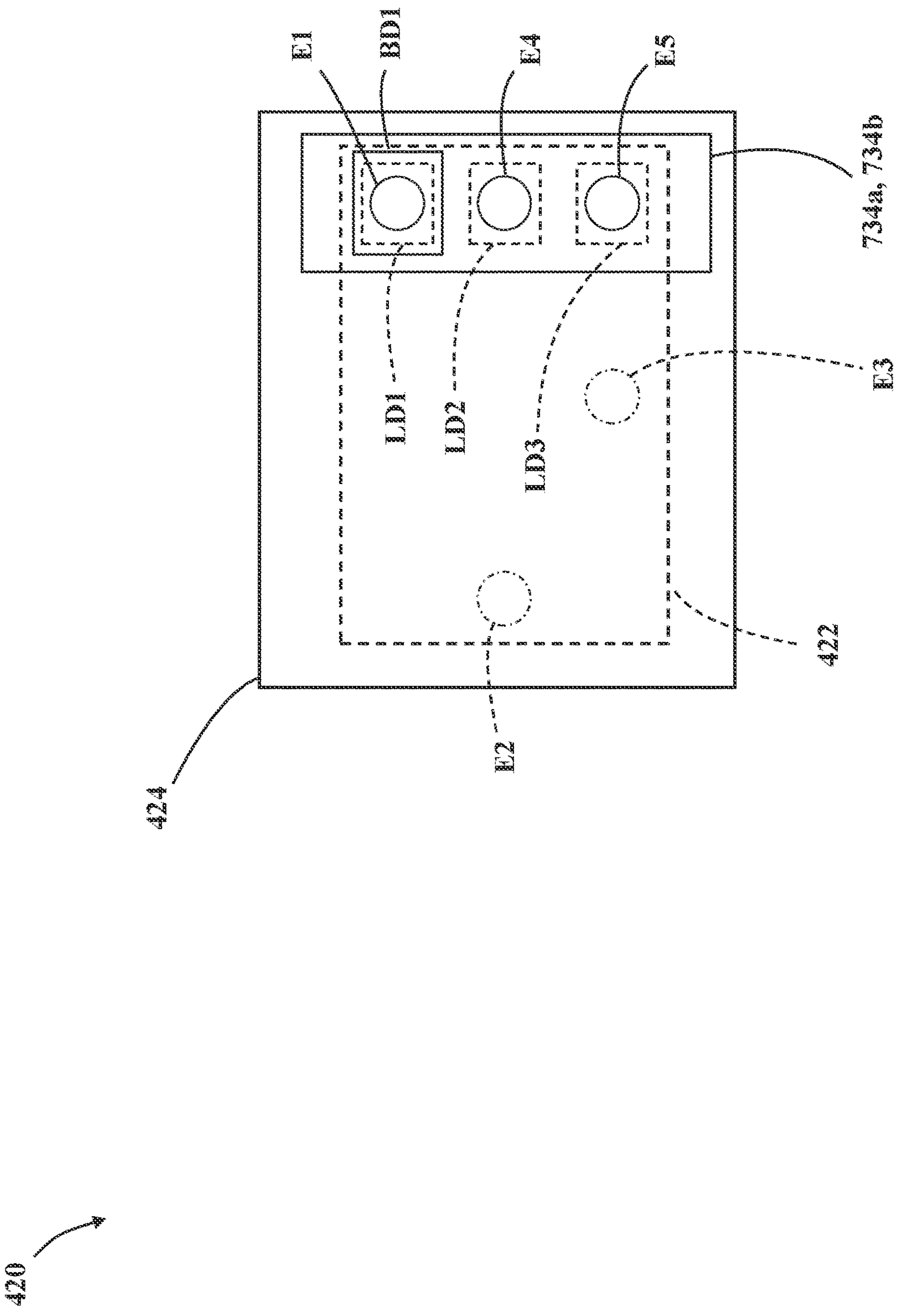
FIG. 17H is a schematic representation of the patient support apparatus of FIG. 13, shown with the litter in the eighth position relative to the base as depicted in FIG. 16H.

In the arrangement depicted in FIGS. 16G and 17G, the user has advanced (e.g., by pushing) the litter 422 (and, thus, the carriers 734a, 734b) along the base rails 750a, 750b and toward the first end 722 of the intermediate frame 430. Here, the second and third litter detectors LD2, LD3 generate signals in response to sensing the fourth and fifth emitters E4, E5 coupled to the intermediate frame 430 adjacent to the first end 722, and the base detector BD1 generates a signal in response to sensing the first emitter E1 coupled to one of the carriers 734a, 734b (see FIG. 16G). These signals allow the controller 504 to determine that the litter 422 fully supported by the base 424, and that the carrier 734a, 734b is adjacent to the first end 722 of the intermediate frame 430. At this point, and continuing to the arrangement depicted in FIGS. 16G and 17G, when the user actuates (or continues to actuate) the second button B2, the controller 504 is configured to operate only fowler actuator 662 to pivot or otherwise articulate the fowler frame 532 relative to the seat frame 534 until the fowler frame 532 is generally parallel with the seat frame 534 (see FIG. 16H). This configuration of the litter 422 is similar to the substantially flat configuration 700 of the litter 422 shown in FIG. 15A, however, the rear legs 602*a*, 602*b* are pivoted or otherwise articulated in the opposite direction. When in the configuration depicted in FIG. 16H, at this point, continued actuation of the second button B2 does not result in the controller 504 operating any actuators, and actuation of the first button B1 results in the controller 504 operating the fowler actuator 662 to pivot or otherwise articulate the fowler frame 532 to a raised position relative to the seat frame 534 (see FIG. 16G).

As is shown schematically in FIG. 14, the patient support apparatus 420 may comprise a carrier position lock actuator 766 coupled to one of the carriers 734*a*, 734*b* and to the controller 504. Here, the controller 504 may be configured to operate the carrier position lock actuator 766 to interrupt or otherwise restrict movement of the carriers 734*a*, 734*b* relative to the base rails 750*a*, 750*b* of the base 424 in certain situations. For instance, the controller 504 may be configured to operate the carrier position lock actuator 766 when the carriers 734*a*, 734*b* are adjacent to the first end 722 of the intermediate frame 430 in order to lock the litter 422 to the base 424 in a fully loaded position 738 (see FIGS. 16G-16H). In some embodiments, the controller 504 may be configured to operate the carrier position lock actuator 766 when movement of the carriers 734*a*, 734*b* could cause the front leg 536 and/or the rear legs 602*a*, 602*b* to contact the base 424 or otherwise inhibit loading of the litter 422 on the base 424 (see FIGS. 16C-16F). In some embodiments, the controller 504 may be configured to operate the carrier position lock actuator 766 when the litter 422 is being initially loaded onto or subsequently unloaded from the base 424 and the front leg 536 is not yet in contact with the floor surface to partially support the litter 422 above the floor surface. Other situations where the controller 504 operates the carrier position lock actuator 766 to prevent movement of the carriers 734*a*, 734*b* along the base rails 750*a*, 750*b* are contemplated.

In this way, the embodiments of the present disclosure afford significant opportunities for enhancing the functionality and operation of user interfaces 110, 112, 510, 512, 760 employed by patient support apparatuses 20, 420. Specifically, the patient support apparatus 20, 420 can be utilized with or without the litter 22, 422 loaded onto the base 24, 424 while affording intuitive, straightforward operation of powered devices 102, 502 via the same user interfaces 110, 112, 510, 512, 760. Thus, the patient support apparatus 20, 420 can be manufactured in a cost-effective manner while, at the same time, affording opportunities for improved functionality, features, and usability.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention is intended to be defined in the independent claims, with specific features laid out in the dependent claims, wherein the subject-matter of a claim dependent from one independent claim can also be implemented in connection with another independent claim.

What is claimed is:

1. A patient support system for use with an ambulance, the patient support system comprising:

a patient support apparatus for supporting a patient, the patient support apparatus including:

a base arranged for free movement relative to the ambulance about a floor surface, the base comprising a base frame, an intermediate frame, and a base lift device connected to the base frame and the intermediate frame, the base lift device movable between a plurality of positions to move the base between a raised state and a lowered state, a litter defining a patient support surface to support the patient and configured for releasable attachment to the base in a docked mode, the litter including a plurality of sections defining the patient support surface to support the patient in the docked mode, with the plurality of sections being movable to support the patient in a chair configuration when the litter is separated from the base in an undocked mobility mode, a state detection device adapted to generate a state signal defining operation of the litter between the docked mode and the undocked mobility mode, a user interface positioned on the litter to generate an input signal in response to actuation by a user, one or more powered devices selectively operable to perform a first function associated with the litter in the docked mode, and a second function associated with the litter in the undocked mobility mode, and a controller coupled to the state detection device, the user interface, and the one or more powered devices, with the controller configured to receive the input signal and the state signal, and to generate an output signal based on the input signal and the state signal such that the user interface has a first functionality to operate the one or more powered devices to perform the first function upon actuation of the user interface by the user when the litter is in the docked mode and a second functionality to operate the one or more powered devices to perform the second function upon actuation of the user interface by the user when the litter is in the undocked mobility mode.

2. The patient support system of claim 1, wherein the one or more powered devices comprises a first powered device selectively operable to perform the first function, and a second powered device selectively operable to perform the second function.

3. The patient support system of claim 2, wherein the litter comprises a litter lift device, separate from the base lift device, to raise and lower the patient support surface relative to the floor surface when the litter is separated from the base, and a track driving device with a continuous track to provide mobility to the litter when the litter is separated from the base in the undocked mobility mode; and wherein the first powered device comprises one of the base lift device, the litter lift device, and the track driving device, and the second powered device comprises a different one of the base lift device, the litter lift device, and the track driving device.

4. The patient support system of claim 3, wherein the plurality of sections of the litter includes a seat section and a fowler section, and the litter further includes a fowler section adjustment device arranged to move the fowler section relative to the seat section; and wherein the first powered device comprises one of the base lift device, the litter lift device, the track driving device, and the fowler section adjustment device, and the second powered device comprises a different one of the base lift device, the litter lift device, the track driving device, and the fowler section adjustment device.

5. The patient support system of claim 2, wherein the intermediate frame and the litter are secured in the docked mode; and wherein the first powered device comprises the base lift device having a base lift actuator to raise and lower the intermediate frame relative to the floor surface, and the first functionality of the user interface comprises raising and lowering the intermediate frame when the litter is supported on the intermediate frame of the base in the docked mode.

6. The patient support system of claim 5, further comprising a load detection device configured to detect a load on the base, and wherein the base lift actuator is configured to move the litter at a first rate when the controller determines that the load is less than a load threshold and at a second rate slower than the first rate when the controller determines that the load is at or above the load threshold.

7. The patient support system of claim 1, wherein the one or more powered devices includes a track driving device to move the litter along stairs in the undocked mobility mode; and wherein the track driving device comprises a track actuator coupled to the controller and a continuous track driven by the track actuator for ascending and descending stairs, and the first functionality of the user interface comprises moving the litter along the stairs in the undocked mobility mode.

8. The patient support system of claim 7, further comprising a sensor coupled to the user interface and the controller, with the sensor configured to generate a signal responsive to user engagement adjacent to the user interface; and wherein the controller is configured to operate the track actuator of the track driving device to inhibit movement of the continuous track in response to the signal from the sensor indicating an absence of user engagement adjacent to the user interface, and to operate the track actuator of the track driving device to permit movement of the continuous track in response to the signal from the sensor indicating user engagement adjacent to the user interface.

9. The patient support system of claim 1, wherein the plurality of sections of the litter includes a seat section and a fowler section; and wherein the one or more powered devices includes a fowler section adjustment device having a fowler actuator coupled to the fowler section and to the controller to move the fowler section relative to the seat section.

10. The patient support system of claim 1, wherein the one or more powered devices includes a litter lift device having a litter lift actuator coupled to the controller to raise and lower the patient support surface relative to the floor surface when the litter is separated from the base in the undocked mobility mode.

11. The patient support system of claim 1, further comprising a progress indicator coupled to the litter to display one of the modes of the litter and the functionalities of the user interface.

12. The patient support system of claim 1, further comprising a track driving device coupled to the litter to provide mobility to the litter when the litter is removed from the base in the undocked mobility mode, the track driving device including a continuous track configured to engage stairs and supported by a frame member, and a wheel coupled to the frame member and configured to rotationally engage the floor surface, wherein the track driving device is configured to articulate relative to the patient support surface to engage stairs in the undocked mobility mode.

13. The patient support system of claim 12, wherein the base further comprises a base rail extending between a first end and a second end, and a carrier coupled to the base rail and defining a slot, with the carrier configured to move along the base rail between the first end and the second end; and and wherein the litter comprises a pin arranged to be spaced from the carrier in the undocked mobility mode and to be releasably received in the slot of the carrier in the docked mode, with the litter configured to move with the carrier along at least a portion of the base rail between the first end and the second end in the docked mode, and with the carrier configured to at least partially support the litter on the base above the floor surface when the litter is in the docked mode.

14. The patient support system of claim 13, wherein the litter comprises:

a litter frame;

a first support leg comprising a proximal end and a distal end, with the proximal end coupled to the litter frame; and a second support leg comprising a proximal end and a distal end, with the proximal end coupled to the litter frame;

wherein the first and second support legs are configured to at least partially support the litter frame above the floor surface.

15. The patient support system of claim 14, wherein the one or more powered devices comprises a first powered device selectively operable to perform the first function, and a second powered device selectively operable to perform the second function;

wherein the first powered device comprises a first lift actuator coupled to the litter frame and to the first support leg, with the controller being configured to operate the first lift actuator to move the distal end of the first support leg relative to the litter frame for adjusting at least one of a height and a tilt of the litter frame relative to the floor surface during operation in the undocked mobility mode; and wherein the second powered device comprises a second lift actuator coupled to the litter frame and to the second support leg, with the controller being configured to move the distal end of the second support leg relative to the litter frame for adjusting at least one of the height and the tilt of the litter frame relative to the floor surface during operation in the undocked mobility mode.

16. The patient support system of claim 15, wherein the state detection device comprises a sensor coupled to one of the litter frame and the carrier to generate the state signal responsive to releasable coupling of the litter to the carrier;

wherein the controller operates the first and second lift actuators to move the respective distal ends of the first and second support legs relative to the litter frame in response to actuation of the user interface by the user when the litter is in the undocked mobility mode; and wherein the controller operates one of the first and second lift actuators to move the respective distal end of one of the first and second support legs relative to the litter frame in response to actuation of the user interface by the user when the litter is in the docked mode while the other of the first and second lift actuators retains a position of the respective distal end of the other of the first and second support legs relative to the litter frame.

17. The patient support system of claim 16, wherein the carrier is moveable to a first position along the base rail adjacent the first end of the base rail and to a second position adjacent the second end of the base rail; and further comprising a sensor coupled to the controller and one of the base and the litter to generate a carrier position signal responsive to a position of the carrier relative to the base rail; and wherein the controller is configured to operate the first lift actuator to move the distal end of the first support leg in response to actuation of the user interface by the user when the carrier is in the first position and the litter is in the docked mode, and to operate the second lift actuator to move the distal end of the second support leg in response to actuation of the user interface by the user when the carrier is in the second position and the litter is in the docked mode.

18. The patient support system of claim 1, further comprising a power load device for loading and unloading the patient support apparatus relative to a cargo area of the ambulance, the power load device including:

a rail configured for coupling to the ambulance, a trolley movably coupled to the rail, and one or more arms pivotably coupled to the trolley to support the patient support apparatus when at least one of the litter and the base are coupled to the trolley.

* * * * *